United States Patent
Hauser et al.

(10) Patent No.: US 8,393,236 B1
(45) Date of Patent: Mar. 12, 2013

(54) MODULAR POWER DISTRIBUTION AND DRIVE SYSTEM

(75) Inventors: Raymond Hauser, Sullivan, IL (US); Nathan W. Bonny, Shelbyville, IL (US); Michael L. Bennett, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 416 days.

(21) Appl. No.: 12/825,038

(22) Filed: Jun. 28, 2010

Related U.S. Application Data

(60) Provisional application No. 61/220,795, filed on Jun. 26, 2009, provisional application No. 61/243,097, filed on Sep. 16, 2009, provisional application No. 61/258,764, filed on Nov. 6, 2009.

(51) Int. Cl.
*F16H 37/00* (2006.01)

(52) U.S. Cl. .............................. 74/15.4; 74/11; 74/15.86

(58) Field of Classification Search ............. 74/11, 15.2, 74/15.4, 15.86
See application file for complete search history.

(56) References Cited

U.S. PATENT DOCUMENTS

| | | | |
|---|---|---|---|
| 3,461,669 A | 8/1969 | Kanengieter | |
| 3,776,325 A | 12/1973 | Jespersen | |
| 4,570,554 A | 2/1986 | Clark | |
| 4,674,589 A | 6/1987 | Szymkowiak | |
| 5,697,264 A | 12/1997 | Andrews et al. | |
| 6,382,339 B1* | 5/2002 | Nemoto | 180/248 |
| 6,487,857 B1 | 12/2002 | Poplawski et al. | |
| 6,988,580 B2* | 1/2006 | Ohashi et al. | 180/307 |
| 7,137,250 B1 | 11/2006 | McCoy et al. | |
| 7,540,349 B2* | 6/2009 | Ohashi | 180/233 |
| 7,896,768 B2* | 3/2011 | Rauschenbach et al. | 475/72 |
| 2004/0200657 A1* | 10/2004 | Stoll et al. | 180/307 |
| 2005/0016304 A1* | 1/2005 | Ishii et al. | 74/15.4 |
| 2007/0066434 A1 | 3/2007 | Iida et al. | |
| 2008/0277188 A1* | 11/2008 | Hauser et al. | 180/422 |

* cited by examiner

*Primary Examiner* — David M Fenstermacher
(74) *Attorney, Agent, or Firm* — Neal, Gerber & Eisenberg LLP

(57) ABSTRACT

A modular drive system for a zero turn radius vehicle having a central gear box with a vertical input shaft, a central drive train that powers a variety of left and right side drive mechanisms, and a power take off mechanism having a clutch and brake assembly. The vertical input shaft is a through-shaft design that allows the central gear box to be mounted with either end of the through-shaft oriented in an upward direction. A screw-on filter acts in conjunction with a charge pump to remove debris from the central gear box's hydraulic fluid.

15 Claims, 47 Drawing Sheets

MODULAR POWER DISTRIBUTION AND DRIVE SYSTEM

CROSS-REFERENCE TO RELATED APPLICATIONS

This application claims the benefit of U.S. Provisional Patent Application No. 61/220,795 filed on Jun. 26, 2009; U.S. Provisional Patent Application No. 61/243,097 filed on Sep. 16, 2009 and U.S. Provisional Patent Application No. 61/258,764 filed on Nov. 6, 2009. These prior applications are incorporated herein in their entirety by reference.

BACKGROUND OF THE INVENTION

This application is related to drive systems for zero turn radius (ZT) vehicles. In the past, such drive systems have utilized separate hydraulic pump and wheel motor combinations under individual left and right side control. Such an arrangement permitted the left and right side drive wheels to be rotated in opposite directions to execute zero radius turns about a central point. More recently, integrated transaxles having a hydraulic pump and motor, axle and/or reduction mechanism in a single housing have been used to replace the traditional pump and wheel motor combinations in ZT vehicles. These integrated transaxles have an economy of space and eliminate external closed-loop hydraulic lines. In each of these cases, a prime mover such as an internal combustion engine or electric motor powers the input shafts of the left and right side drive mechanisms through one or more belt and pulley arrangements, leading to some duplication of drive system components.

Most recently, integrated drive mechanisms have been introduced in which the independent left and right side drive mechanisms are combined to form a single drive unit having a central input shaft driven by the prime mover, whether indirectly by belt and pulley arrangement or directly by coupled shaft. Such an arrangement eliminates duplication of the input means between the prime mover and the left and right side drive mechanisms. Typically, the drive mechanisms are hydraulic, but alternative drive mechanisms such as toroidal drives have been used to motivate ZT vehicles. Integrated drive units featuring these various drive mechanisms will have unique design requirements. The rigid structures of such integrated drive units, because they typically span the width of a ZT vehicle's frame, are subject to various loads including torsional loads as the vehicle's frame twists and flexes during severe operation. There exists the need to have a more flexible drive apparatus, one that communicates with the prime mover through a central input shaft, and one, that is capable of encompassing a host of drive and output options.

SUMMARY OF THE INVENTION

A modular power distribution and drive system (modular drive system) is provided having a central gear box containing a central drive train and power take off mechanism, wherein various left and right side drive mechanisms may be powered by the central drive train in "plug-and-play" fashion. The left and right side drive mechanisms may be flexibly joined to the central gear box to negate the effect of vehicle frame flexion on the modular drive system. The left and right side drive mechanisms may be of any type requiring input from a prime mover including, but not limited to, hydraulic, toroidal, friction or mechanical drives. And depending upon the configuration of the central drive train, the left and right side drives may be identical or mirror-image units. The power take off mechanism contains a clutch that may be manual, hydraulic, or electric in design. In some embodiments, the central drive train may also be selectively engaged by a clutch. When the clutch is hydraulic in design, the central gear box may contain a gear pump or charge pump to provide pressurized hydraulic fluid to actuate the clutch. A screw-on filter may be utilized in conjunction with the charge pump to remove debris from the central gear box's hydraulic fluid. A vehicle, such as a riding lawn mower, incorporating such a modular drive system is also provided.

A better understanding of the objects, advantages, features, properties and relationships of the invention will be obtained from the following detailed description and accompanying drawings which set forth illustrative embodiments that are indicative of the various ways in which the principles of the invention may be employed.

DETAILED DESCRIPTION OF THE DRAWINGS

Figure 1:
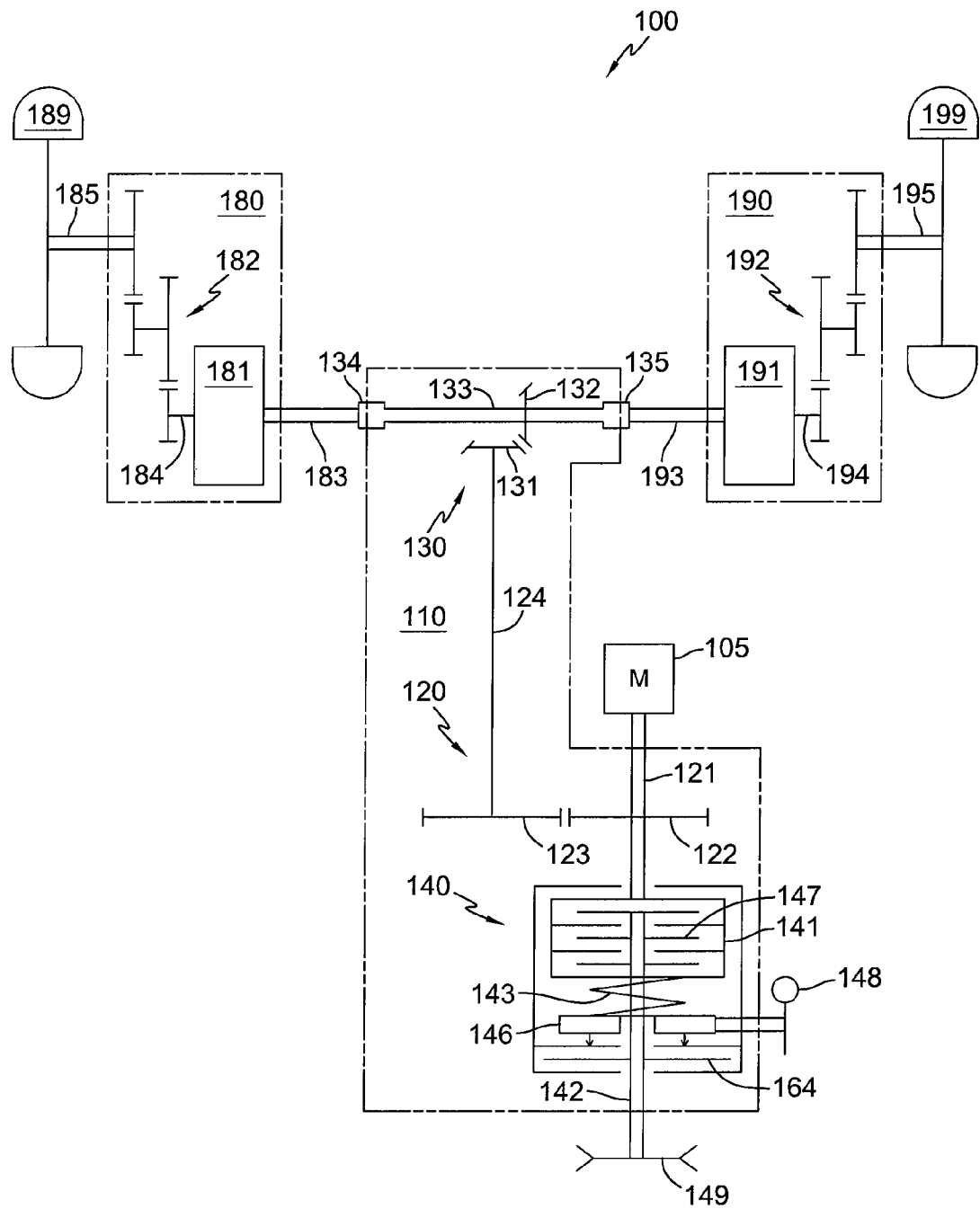
FIG. 1 is a schematic representation of a first embodiment of the modular drive system having a manual clutch and brake.

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art.

FIG. 1 illustrates a first embodiment of a modular drive system 100 in accordance with the principles of the invention. In general, modular drive system 100 comprises a central gear box 110 configured to be driven by a prime mover 105, which distributes the motive force received therefrom to a pair of independent drive mechanisms, left side drive mechanism 180 and right side drive mechanism 190 respectively. Modular drive system 100 may be powered by a prime mover 105, such as the depicted internal combustion engine M or an electric motor, through input shaft 121. Though illustrated as a direct drive configuration, it should be understood that prime mover 105 may also transfer power to input shaft 121 indirectly by a belt and pulley arrangement.

The central gear box 110 comprises a central drive train having an input shaft 121, a transmission gear set 120, an intermediate or jack shaft 124, a distribution gear set 130, and a central output shaft 133. Input shaft 121 drives transmission gear 122, which in turn drives corresponding transmission gear 123 to power jack shaft 124. Transmission gears 122 and 123 may be spur gears or helical gears depending on the relative need of the modular drive system 100 for efficiency, revolutions per minute (rpm) and noise reduction. Jack shaft 124 provides motive force to distribution gear set 130, represented here as bevel gears 131 and 132, and ultimately to central output shaft 133. It should be understood that bevel gears 131 and 132 may similarly be replaced by spiral bevel gears where higher rpm and/or greater noise reduction is needed. Central output shaft 133 is illustrated with splined female ends 134 and 135 to accommodate input shafts 183 and 193 from the left and right side drive mechanisms 180 and 190 respectively. The inverse configuration (not shown) could also be utilized, wherein input shafts 183 and 193 exhibit the female splined connection. The drive mechanisms 180 and 190 may be flexibly joined to central gear box 110 through the mating of coarse toothed shaft ends, male and female, wherein the male shaft end has a rounded or tapered profile. Such a flexible joint negates the effect of vehicle frame flexion on the modular drive system. It should be understood that other flexible joints known in the art, such as universal or Cardan joints, are contemplated within the scope of the invention. Regardless of joint configuration, central gear box 110 can accommodate a variety of drive mechanisms in "plug-and-play" fashion provided the appropriate input shaft is selected. Additionally, the length of input shafts 183 and 193 can be varied to accommodate differences in vehicle frame widths.

Left and right side drive mechanisms 180 and 190 consist of variable speed drives 181 and 191, respectively, which are independently controlled by a vehicle operator through external linkages (not shown). As previously indicated, drives 181 and 191 may be of any type requiring input from a prime mover including, but not limited to, hydraulic, toroidal, friction or mechanical drives. Because the rotation of input shafts 183 and 193 are identical, variable speed drives 181 and 191 are preferably mirror-image units to translate the same rotation to output shafts 184 and 194 respectively, if the external left and right side linkages (not shown) are to move the respective actuators (not shown) of the variable speed drives 181 and 191 in the same rotational direction (e.g. toward the forward end of a vehicle to move forward). While such symmetric control motions are desirable, it is to be understood that identical variable speed drives may be utilized on the left and right sides to produce the same rotation at output shafts 184 and 194, with actuators being moved in opposite rotational directions, if the variable speed drives are capable of both forward and reverse stroking, such as with hydraulic drives for example. Reduction gear sets 182 and 192 multiply the torque and reduce the speed of the output to drive axles 185 and 195, providing power to drive wheels 189 and 199 respectively. Though illustrated as two-stage, spur gear reductions, it should be understood that reduction gear sets 182 and 192 may include any reduction mechanisms known in the art, including but not limited to single or double stage planetary reductions.

Central gear box 110 further comprises a power take off mechanism having a manual clutch and brake assembly 140 which is also powered by input shaft 121. Spring 143 normally biases the brake to the engaged position, wherein brake plates 164 are brought into frictional engagement by action of a cam plate 146 or pins (not shown). An operator engages the clutch through actuation of lever 148 which disengages the brake and brings the clutch plates 147 of cage 141, which rotate in unison with input shaft 121, and power take off output shaft 142 into frictional engagement. As a result, input shaft 121 and power take off output shaft 142 rotate as a unit to drive an output device such as pulley 149. On a ZT vehicle, pulley 149 may be used to drive auxiliary devices such as a mowing deck or snow thrower. While the inclusion of a brake on the power take mechanism has safety advantages for the vehicle operator and will be discussed with respect to the embodiments herein, it is to be understood that the invention contemplates a power take off mechanism having a clutch alone.

Figure 1A:
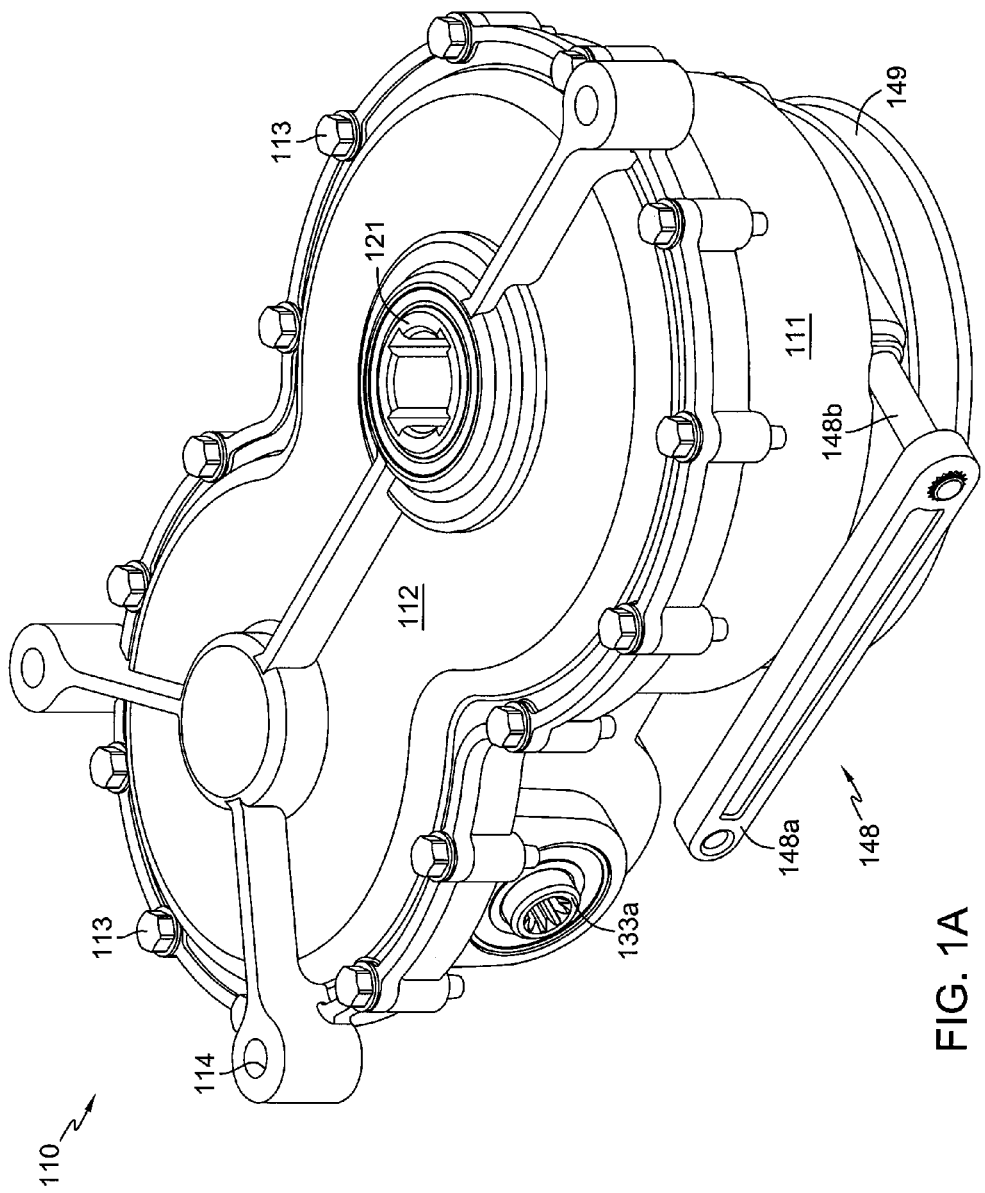
FIG. 1A is an isometric view of a representative central gear box in accordance with the first embodiment of the invention.
Figure 1B:
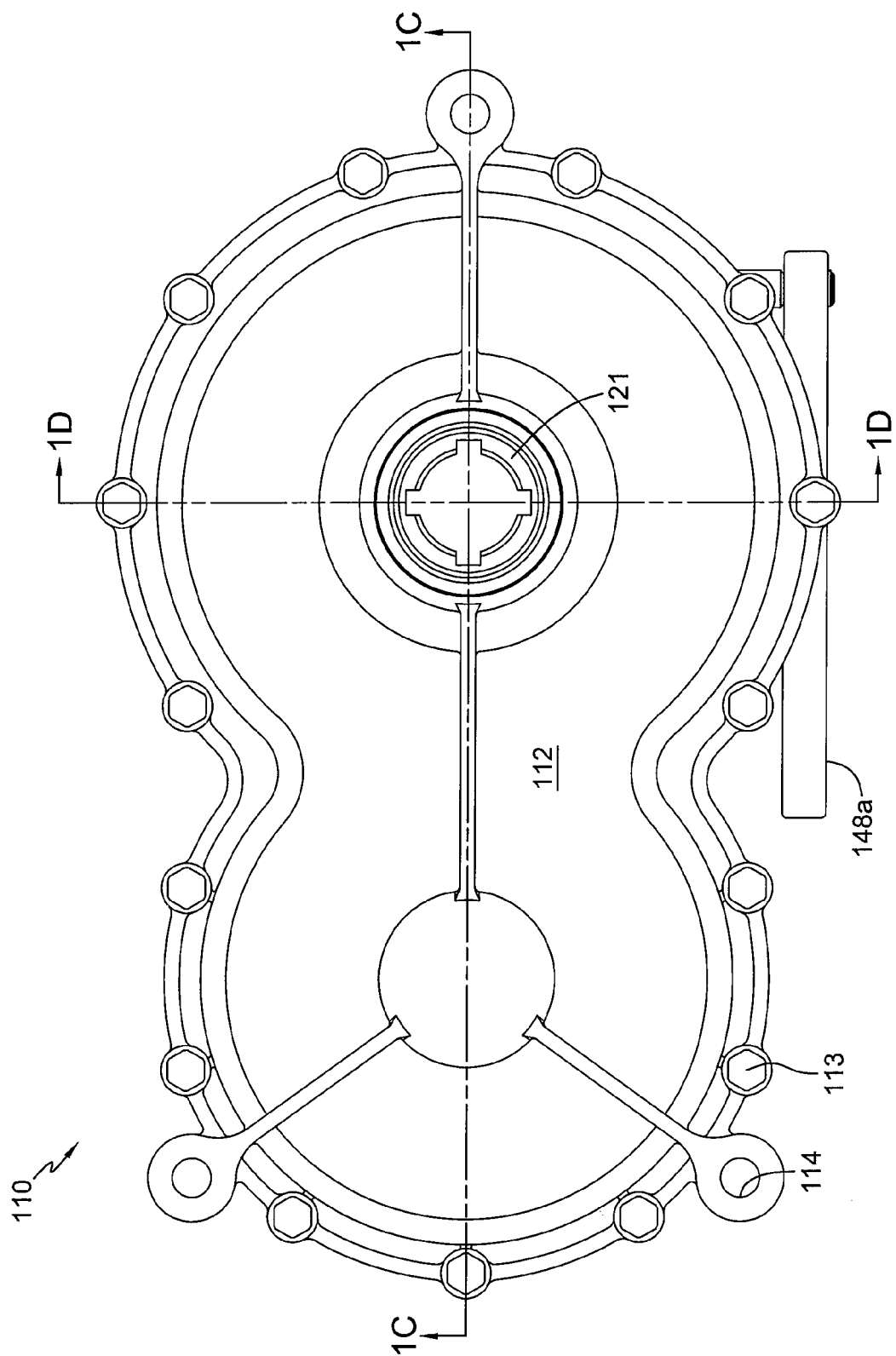
FIG. 1B is a top view of the central gear box of FIG. 1A.
Figure 40:
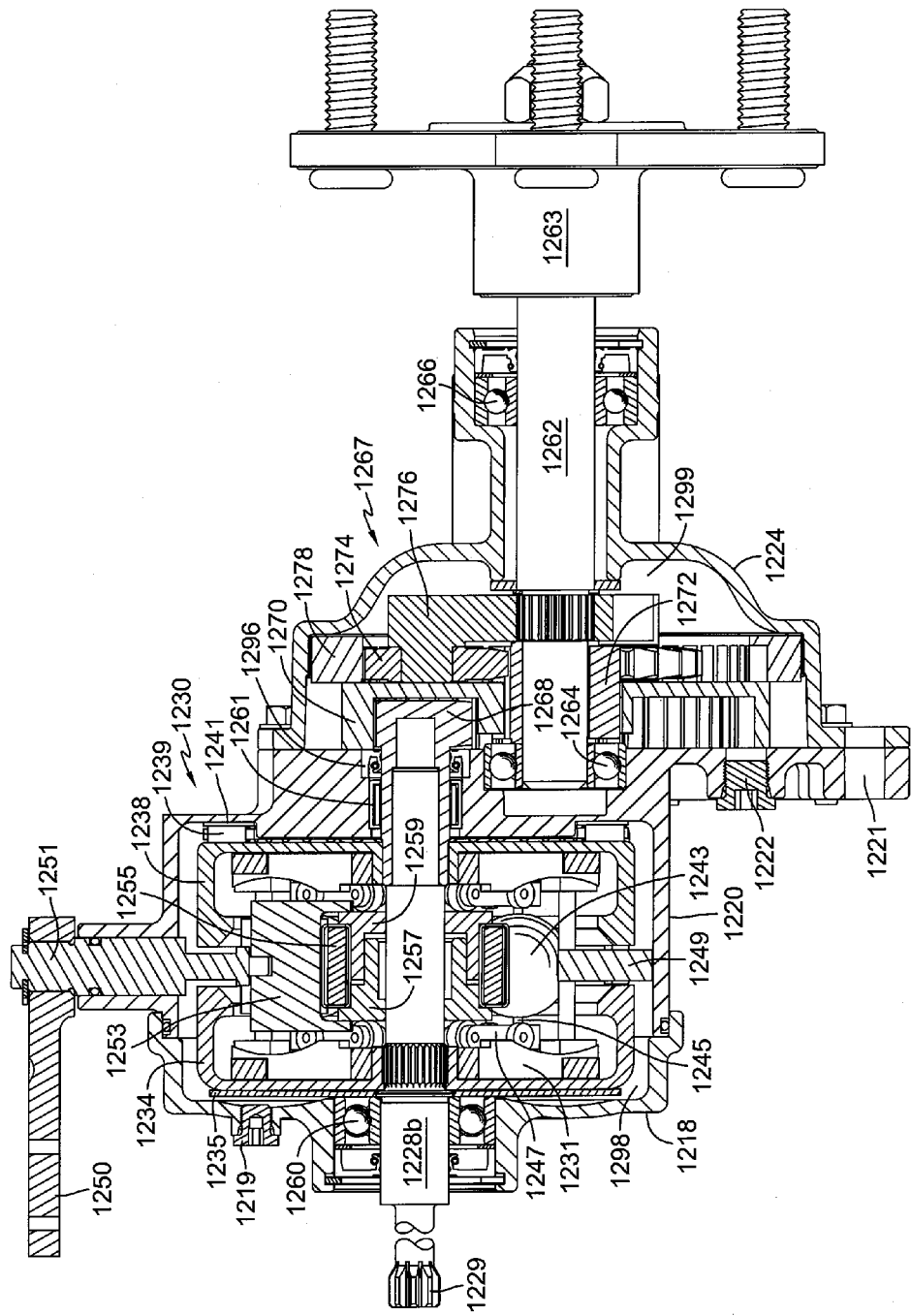
FIG. 40 is a section view of the right side drive mechanism of FIG. 39 along the line 40-40.

FIGS. 1A-1D depict a representative central gear box 110. Gear box housing 111 contains the central drive train and power take off mechanism. Gear box housing cover 112 is sealingly engaged to housing 111 by a plurality of fasteners 113 to form sump 160, which is filled with oil via a port (not shown) on the side of housing 111. Housing cover 112 is formed with a plurality of bosses 114, by which central gear box 110 may be fastened to a vehicle frame. Input shaft 121 serves as both the input shaft for the central drive train and the power take off mechanism. In FIGS. 1A and 1B, input shaft 121 is depicted as a hollow shaft with multiple slots or keyways to receive the output shaft of a prime mover, such as output shaft 1007 of internal combustion engine 1005 in FIG. 37. The output of the central drive train comprises a pair of central output shafts 133a and 133b, which rotate in opposite senses. These outputs power the left and right side drive mechanisms, respectively, of a modular drive system in accordance with the principles of the invention. It will be understood, however, that a single, central output shaft may be used to drive both the left and right side drive mechanisms in the same rotational sense. As depicted in FIG. 1A, central output shaft 133a comprises a coarse tooth, female splined end, which permits a modicum of flexibility in the driveline of the modular drive system when mated to the input shaft of an outboard drive mechanism having a corresponding structure bearing a somewhat curved or tapered profile. Such an input shaft end 1229 is best illustrated in FIG. 40. These characteristics are desirable in a utility vehicle such as a ZT mower wherein the vehicle frame is subject to flexion.

External to gear box housing 111 are portions of power take off actuator 148, comprising actuator arm 148a and actuator shaft 148b. When engaged, power take off mechanism 140 provides motive force to pulley 149, which in turn may be used to indirectly drive various mechanical implements such as a mowing deck through use of a v-belt. It be noted that the narrow width of gear box housing 111 proximate to central output shafts 133a and 133b permits routing of the v-belt adjacent thereto.

Figure 1C:
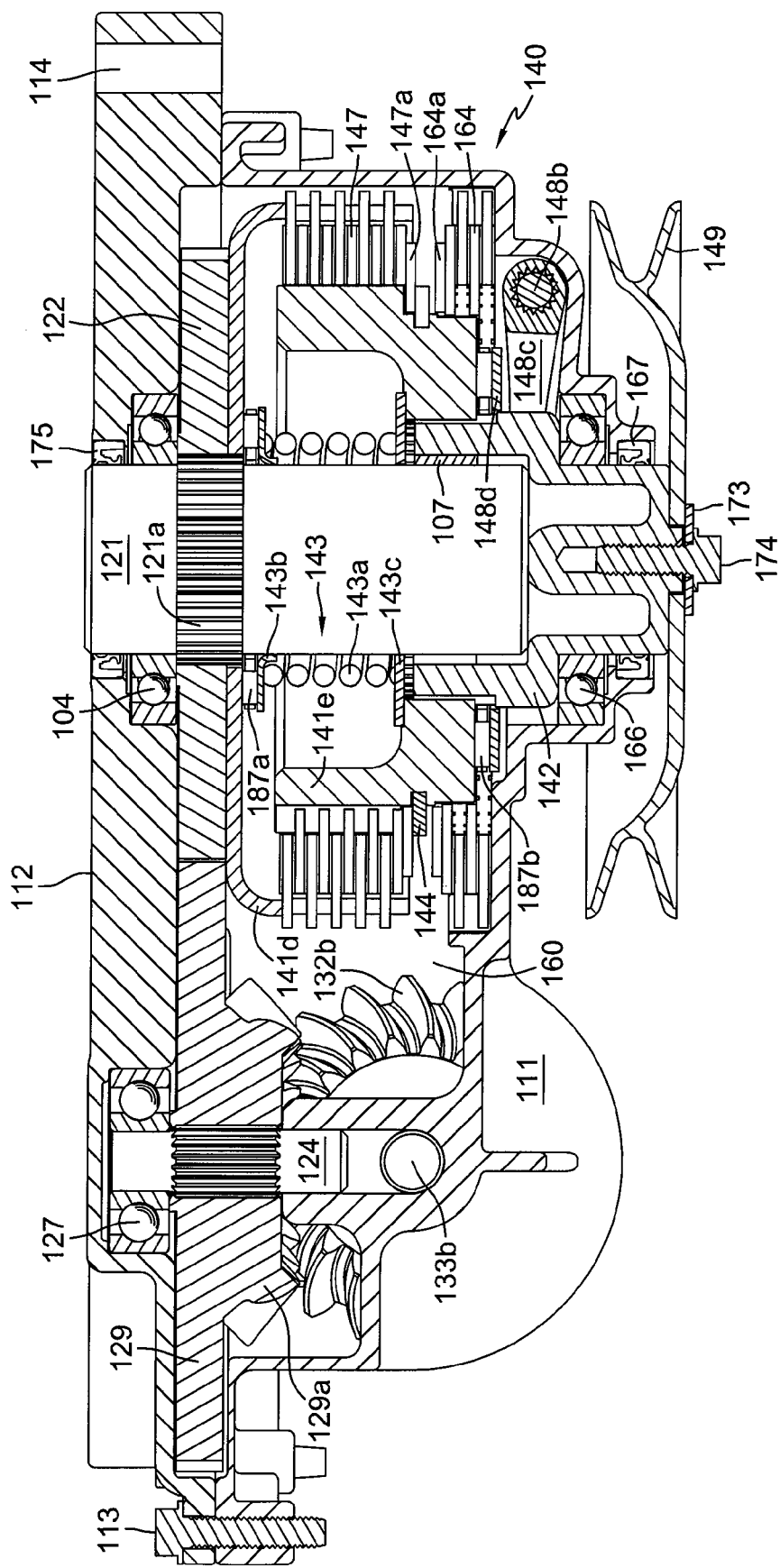
FIG. 1C is a section view of the central gear box, of FIG. 1B along the line 1C-1C.
Figure 1D:
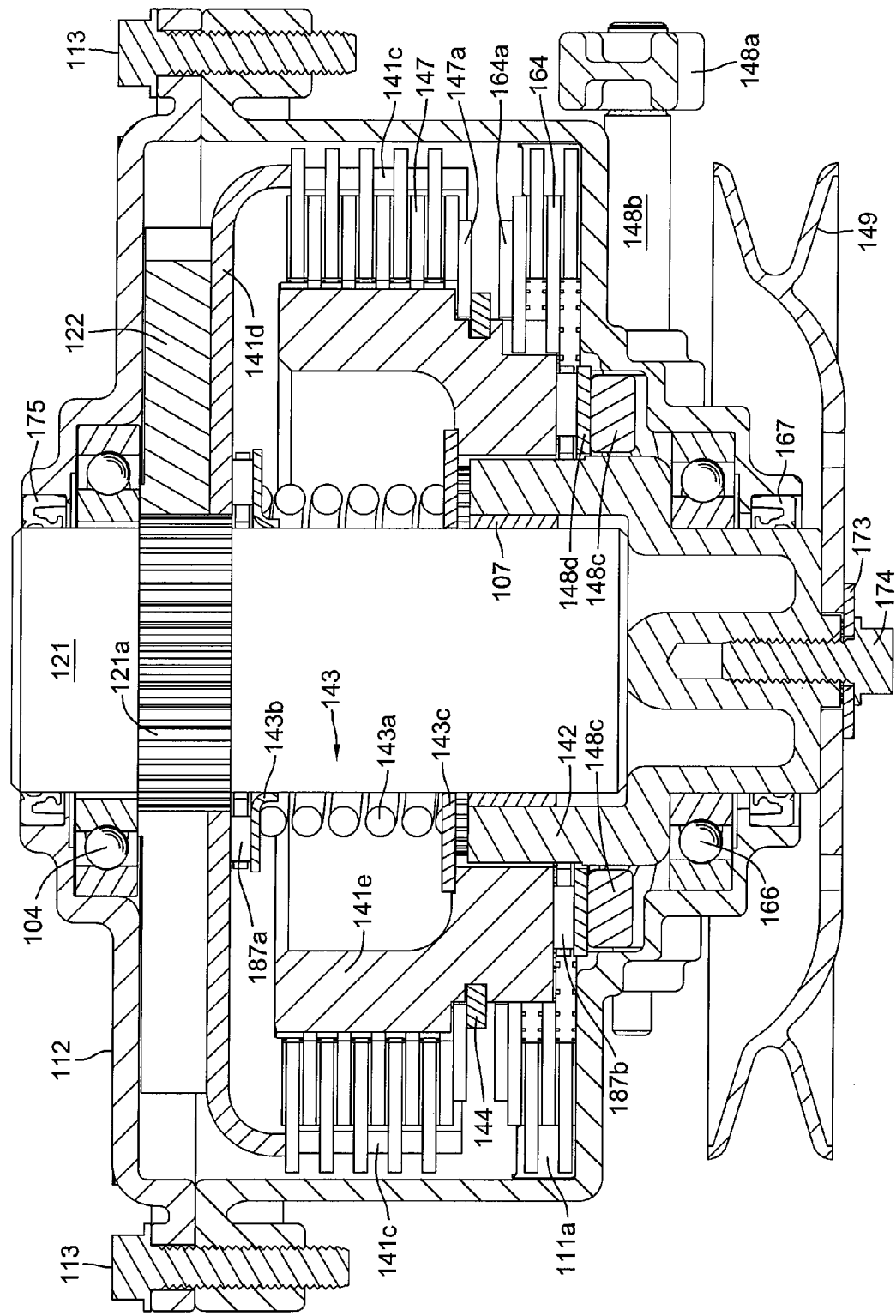
FIG. 1D is a section view of the central gear box of FIG. 1B along the line 1D-1D.

FIGS. 1C and 1D detail the inner workings of central gear box 110. Input shaft 121 is rotationally supported in central gear box 110 by bearing 104, located in gear box housing cover 112, and bushing 107 located interior to power take off output shaft 142, which in turn is supported by bearing 166 in gear box housing 111. Input shaft 121 has an external gear form or spline 121a that engages and drives both transmission gear 122 of the central drive train and the outer clutch plate carrier 141d of power take off mechanism 140.

Transmission gear 122 engages and drives transmission gear 129, which rotates upon an intermediate or jack shaft 124, which is supported at a first end by a bearing 127 located in gear box housing cover 112, and journaled at a second end by gear box housing 111. Transmission gear 129 comprises a second gear form 129a, in this instance a bevel gear form that engages a complementary bevel gear 132b to drive central output shaft 133b. This is a compact variation on the gear train depicted in FIG. 1, wherein gear form 129a replaces bevel gear 131, a second, individual gear splined to jack shaft 124. Central output shaft 133b may be journaled at a first, inboard end by gear box housing 111 and supported by an outboard bearing or the like (not shown) as known in the art. As discussed earlier, a parallel structure comprising a second bevel gear (not shown) driven by second gear form 129a is splined to central output shaft 133a, providing a second rotational output for the central drive train. As illustrated in FIG. 1C, second gear form 129a and bevel gear 132b comprise spiral bevel gear forms, which are suitable for higher revolutions per minute (rpm) and/or greater noise reduction applications as compared to standard bevel gears. It will be understood, however, that both standard and spiral bevel gears are contemplated within the scope of the invention. Similarly, transmission gears 122 and 129 may be spur gears (as illustrated) or helical gears depending on the relative need of the modular drive system for efficiency, rpm, and/or greater noise reduction.

Power take off mechanism 140 comprises both a clutch assembly and a brake assembly. Power take off actuator 148 controls both of these assemblies. When actuator arm 148a is not rotated into engagement, a spring assembly 143 biases the power take off output shaft 142 to a braked condition and prevents engagement of the clutch assembly. When actuator arm 148a is rotated into engagement against the force of spring assembly 143, the brake assembly is first released followed by engagement of the clutch assembly, whereby the rotation of input shaft 121 is imparted to power take off output shaft 142.

In FIGS. 1C and 1D, the clutch assembly is illustrated as engaged and the brake assembly is shown as disengaged. More specifically, actuator arm 148a has been rotated clockwise about the axis of actuator shaft 148b to which it is fixed. Actuator shaft 148b correspondingly rotates actuator fork 148c upward against washer 148d, which lies concentric about power take off output shaft 142. Washer 148d pushes upward against thrust bearing 187b which also lies concentric about power take off output shaft 142. Inner clutch plate carrier 141e is situated upon thrust bearing 187b and is slidably engaged to an outer gear form on power take off output shaft 142 via a corresponding gear form on the inner clutch plate carrier's inner diameter. The upward movement of thrust bearing 187b acts to push inner clutch plate carrier 141e upward against lower spring assembly washer 143c, compressing spring 143a against upper spring assembly washer 143b and thrust bearing 187a. The components of spring assembly 143 and thrust bearing 187a lie concentric to input shaft 121 and are trapped between outer clutch plate carrier 141d and power take off output shaft 142.

Engaged to a slot on the outer surface of inner clutch plate carrier 141e is a retaining ring 144 that serves to act against either thrust washer 147a to engage the clutch assembly or thrust washer 164a to engage the brake assembly as the inner clutch plate carrier 141e moves vertically up and down. A stack-up of clutch plates 147 is alternatively retained by a plurality of fingers 141c on outer clutch plate carrier 141d to rotate therewith and a gear form on the outer surface of inner clutch plate carrier 141e. An upward movement of inner clutch plate carrier 141e forces retaining ring 144 against thrust washer 147a to place clutch plates 147 into frictional engagement. Power take off output shaft 142 is thereby rotated synchronously with input shaft 121. A stack-up of brake plates 164 is alternatively retained by a plurality of fingers 111a formed in gear box housing 111 to remain stationary therewith and a gear form on the outer surface of inner clutch plate carrier 141e. As actuator arm 148a, and correspondingly actuator shaft 148b, is rotated counterclockwise, actuator fork 148c no longer acts vertically against washer 148d. Consequently, spring assembly 143 acts to move inner clutch plate carrier 141e downward bringing retaining ring 144 into engagement with thrust washer 164a, thereby placing brake plates 164 into frictional engagement. As a result, inner clutch plate carrier 141e and power take off output shaft 142 are held in a braking condition, preventing the rotation of pulley 149 which is fixedly engaged to power take off output shaft 142 via fastener 174 and washer 173.

It should be noted that shaft seals 175 and 167 are incorporated to prevent leakage of oil from sump 160 at the exterior ends of input shaft 121 and power take off output shaft 142 respectively. Similarly, shaft seals (not shown) are incorporated to prevent leakage of oil at the openings formed in gear box housing 111 for central output shafts 133a and 133b to permit external routing of actuator shaft 148b.

Successive embodiments of modular drive systems (200, 300, 400, 500, 600 and 700) in accordance with the principles of the invention are schematically depicted in FIGS. 2, 3, 8, 12, 13 and 18. In general, these embodiments differ in the type of clutch mechanism incorporated, the configuration of the distribution gear set, the incorporation of a charge pump 459 and 659, and the presence of an auxiliary pump 558. An additional embodiment of a central gear box 810 incorporating a bolt-on charge pump 859, an input shaft 821 that can receive the output shaft of a prime mover at either end, and a screw-on filter 853 is depicted in FIGS. 22 through 27. The differences among all these embodiments will be explained in detail below. It should be understood that the variation depicted among common elements may be interchangeably combined to create further embodiments in accordance with the principles of the invention. Throughout this specification, common elements among the various embodiments are numerically labeled in sequence, where possible, for easier identification and understanding (e.g. 121, 221, 321, 421, 521, 621, 721, and 821 all pertain to input shafts). Such common elements will not always be discussed for each embodiment, but will be understood to operate as described in a previous embodiment.

Figure 2:
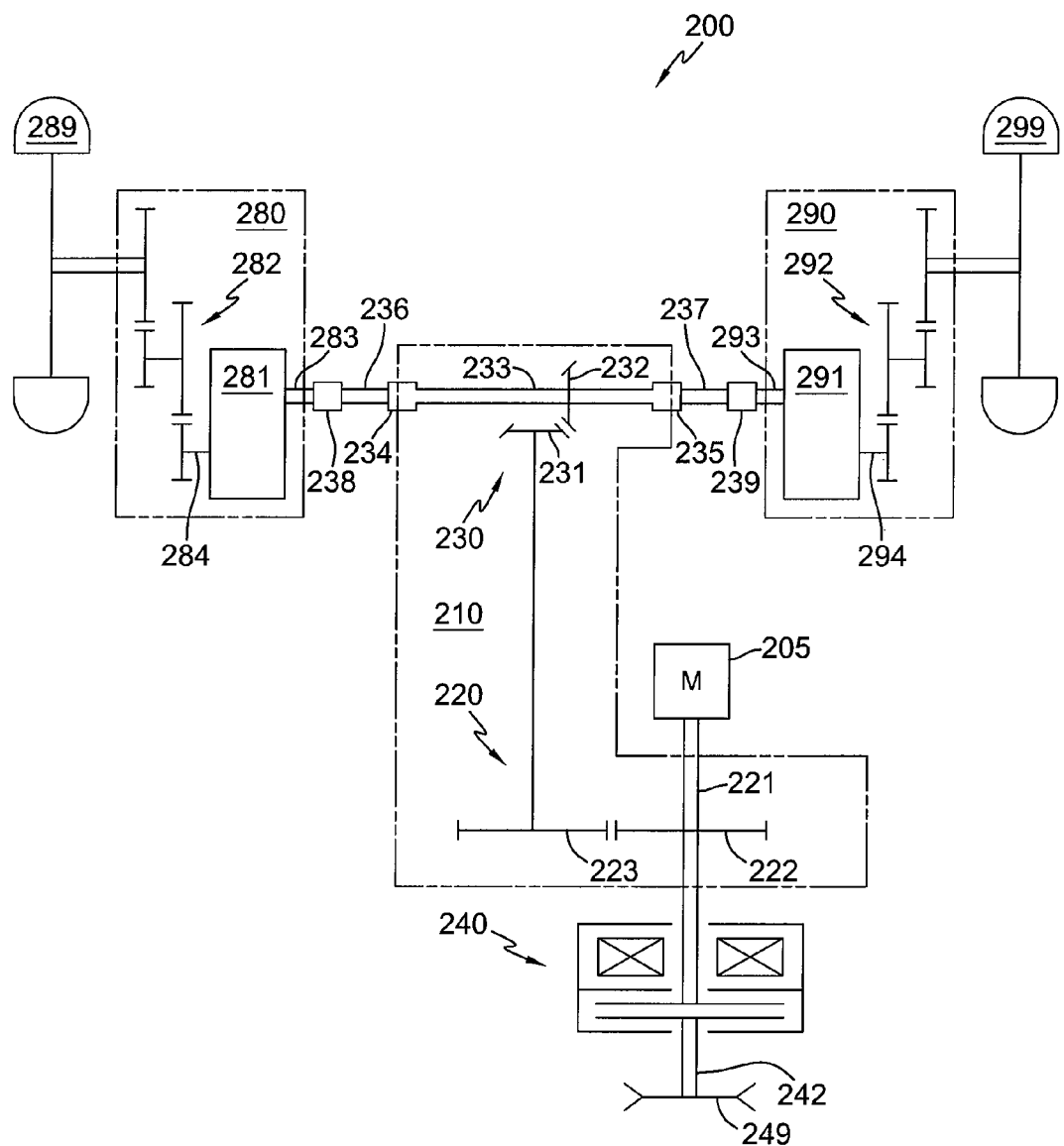
FIG. 2 is a schematic representation of a second embodiment of the modular drive system having an electric clutch and brake.

FIG. 2 illustrates a second embodiment of a modular drive system 200. Here, an electric clutch and brake assembly 240 alternately prevents rotation of power take off output shaft 242 or couples the rotation of input shaft 221 to output shaft 242. As with assembly 140, the bias of the brake in assembly 240 is toward engagement, thereby braking the rotation of output shaft 242 and pulley 249. This is a safety mechanism for use in applications where assembly 240 provides motive force to an auxiliary device such as a mower deck or snow thrower. An operator disengages the brake and engages the clutch of assembly 240 by closing a switch (not shown) conveniently mounted on the ZT vehicle. At this point, electricity from a switchable source of direct current/voltage (not shown) energizes the at least one coil of assembly 240, thereby attracting the respective armatures to the at least one coil to disengage the brake and synchronize the rotations of input shaft 221 and output shaft 242. The reverse process occurs when direct current/voltage is removed by opening the switch. This clutch and brake assembly 240, unlike those of the other embodiments described herein, is external to the oil containing central gear box 210.

Central gear box 210 contains the same central drive train configuration as that of central gear box 110 and will not be further described herein. The connections between central gear box 210 and the left and right side drive mechanisms 280 and 290 illustrate another means of attachment, wherein a coupling 238 and an intermediate shaft 236 are interposed between the input shaft 283 of left side drive mechanism 280 and the left end 234 of central output shaft 233. Similarly, coupling 239 and intermediate shaft 237 are interposed between the input shaft 293 of right side drive mechanism 290 and the right end 235 of central output shaft 233. This configuration allows more flexibility during the assembly process, permitting assemblers to mount the respective drive mechanisms to a vehicle's frame without having to form the couplings simultaneously. And similar to modular drive system 100, modular drive system 200 can be adjusted to fit various vehicle frame widths, most simply by varying the length of intermediate shafts 236 and 237.

FIG. 2 also illustrates that modular drive systems in accordance with the principles of the invention may accommodate variable speed drives having an offset configuration. The input shaft 283 and output shaft 284 of variable speed drive 281 are not coaxial as previously seen on variable speed drives 181 and 191. Similarly, input shaft 293 and output shaft 294 are not coaxial. This offset allows for the production of a more compact vehicle, reducing the overall length of the vehicle. Regardless of offset, central gear box 210 can power any drive mechanism having the appropriate input shaft configuration.

Figure 2A:
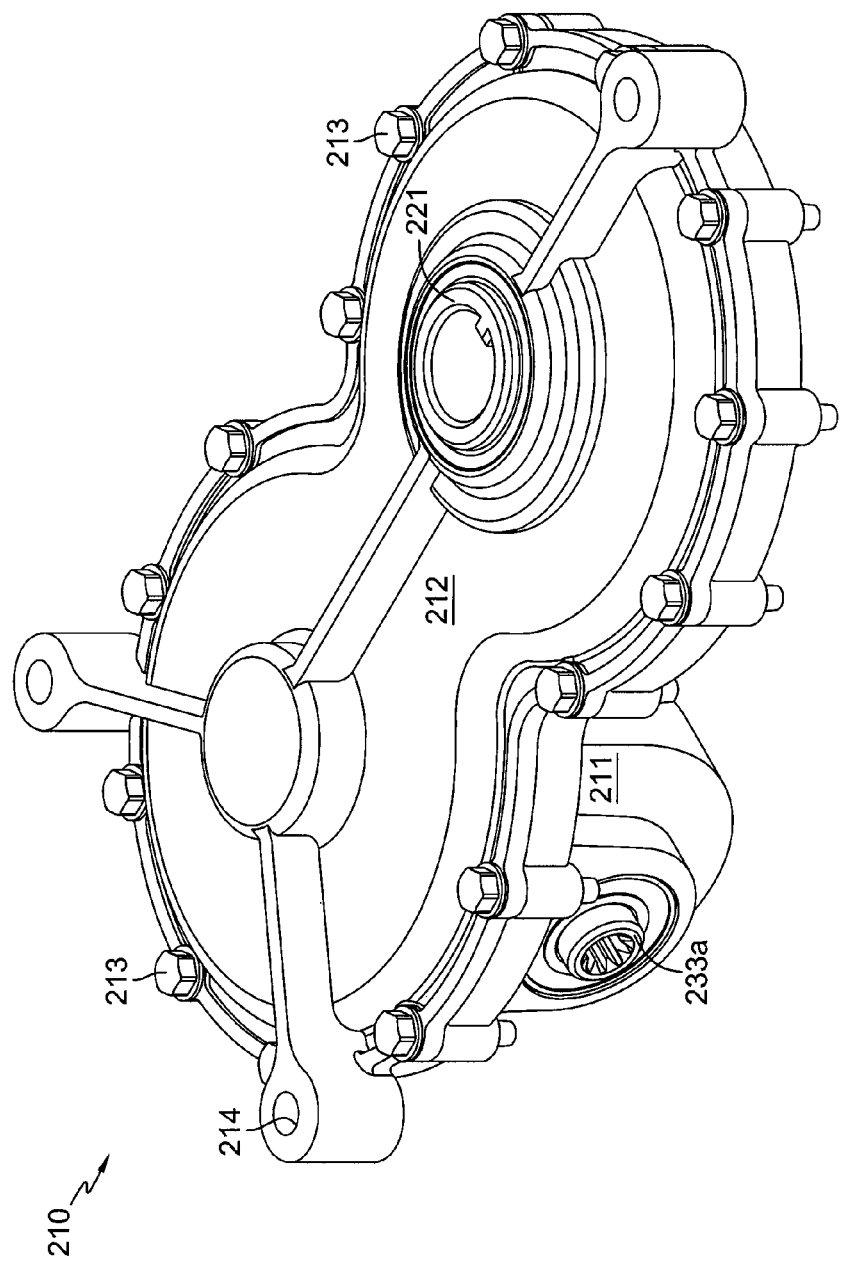
FIG. 2A is an isometric view of a central gear box in accordance with the second embodiment of the invention.
Figure 2B:
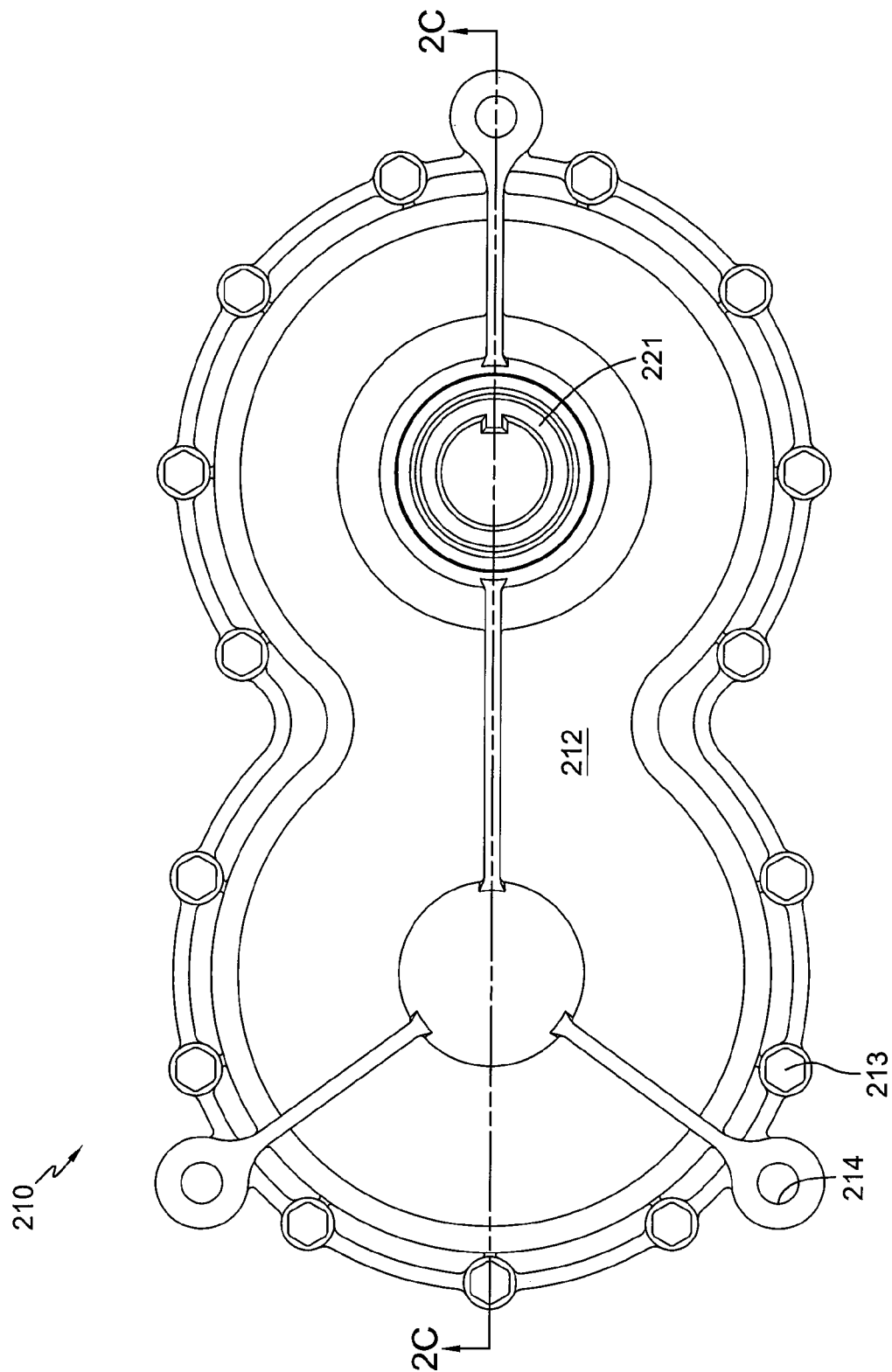
FIG. 2B is a top view of the central gear box of FIG. 2A.
Figure 2C:
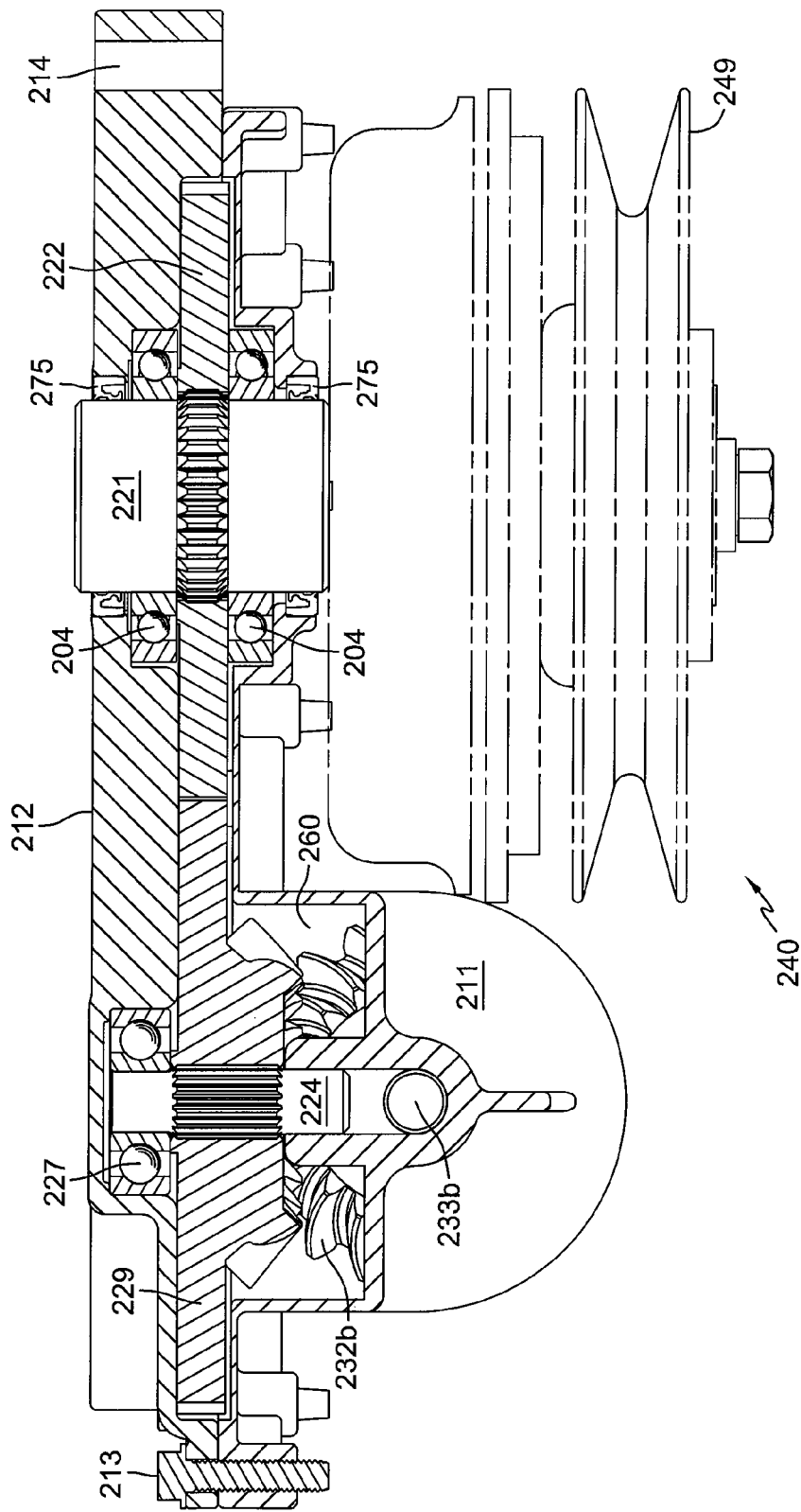
FIG. 2C is a section view of the central gear box of FIG. 2B along the line 2C-2C with a representative PTO (electric) shown in phantom.

FIGS. 2A-2C depicts central gear box 210 configured to allow a prime mover's output shaft (not shown) to pass directly through a hollow input shaft 221, permitting a variety of electric clutch and brake assemblies, generically depicted herein as electric clutch and brake assembly 240, to be mated to the prime mover's output shaft. Input shaft 221 is rotationally supported by a pair of bearings 204 located in gear box housing 211 and gear box housing cover 212 respectively. Similarly, input shaft 221 is sealed at both ends by a pair of shaft seals 275 that prevent leakage of oil from the sump 260 formed by the combination of gear box housing 211 and gear box housing cover 212. The compact length of input shaft 221 creates a narrow profile to central gear box 210 that accommodates placement of electric clutch and brake assembly 240. While the internal configuration of input shaft 221 varies from that depicted for input shaft 121 of central gear box 110, it will be understood that any combination of slots, keys and/or keyways known in the art is contemplated within the principles of the invention.

Rotation of the field back plate of electric clutch and brake assembly 240 can be restrained by any method commonly known in the art such as fixing the plate to a vehicle's frame with an additional flat piece of metal (not shown). Electric clutch and brake assembly 240 acts to engage or arrest the rotation of pulley 249 when an electric current is applied to or removed from the field assembly (not shown). The function of such electric clutch and brake assemblies is well known in the art and will not be further described herein.

The structure and function of the central drive train of central gear box 210 is identical to that previously described for central gear box 110, including the compact variation created by use of combination gear 229, and will not be further described herein.

Figure 3:
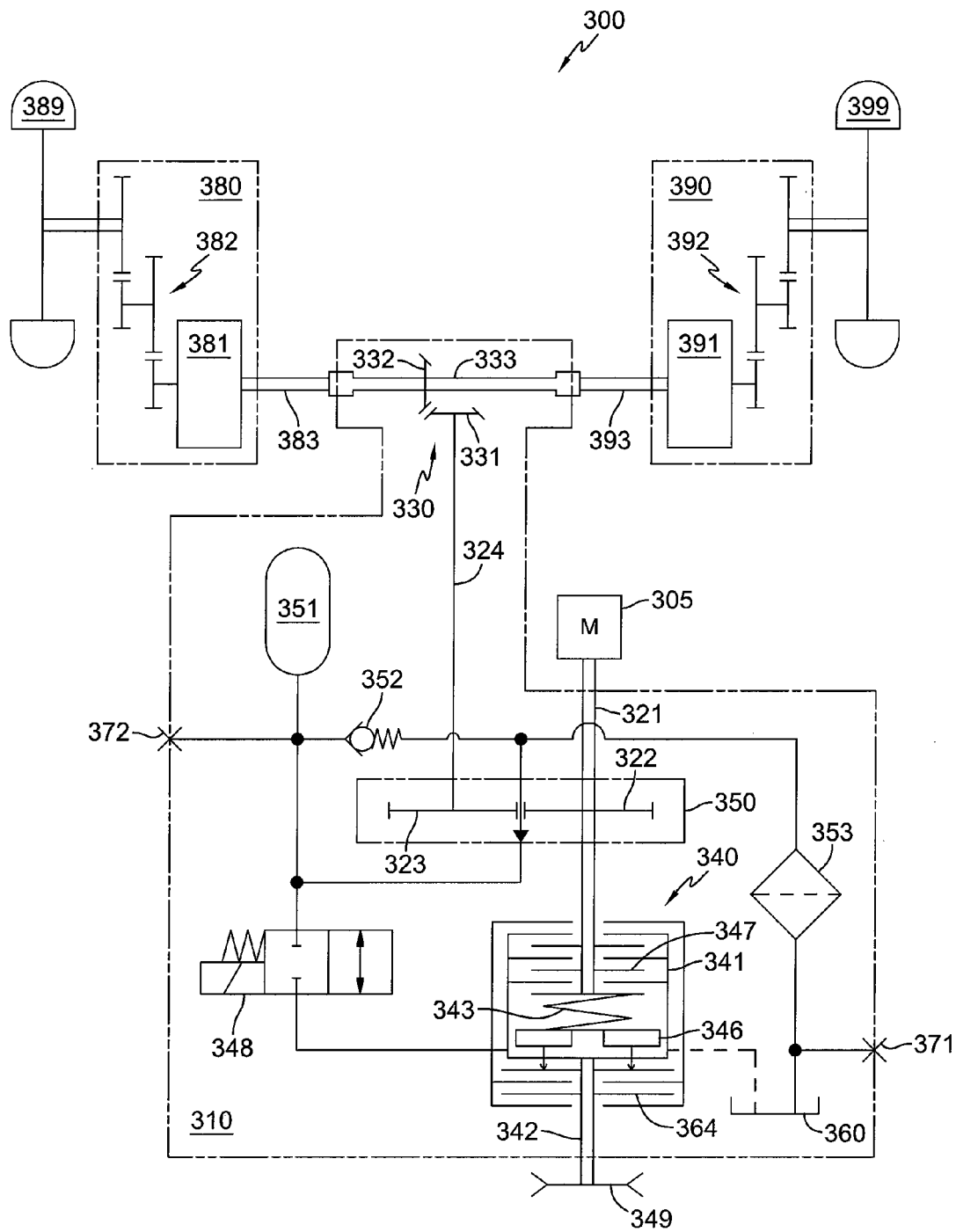
FIG. 3 is a schematic representation of a third embodiment of the modular drive system having a hydraulic clutch and brake.
Figure 4:
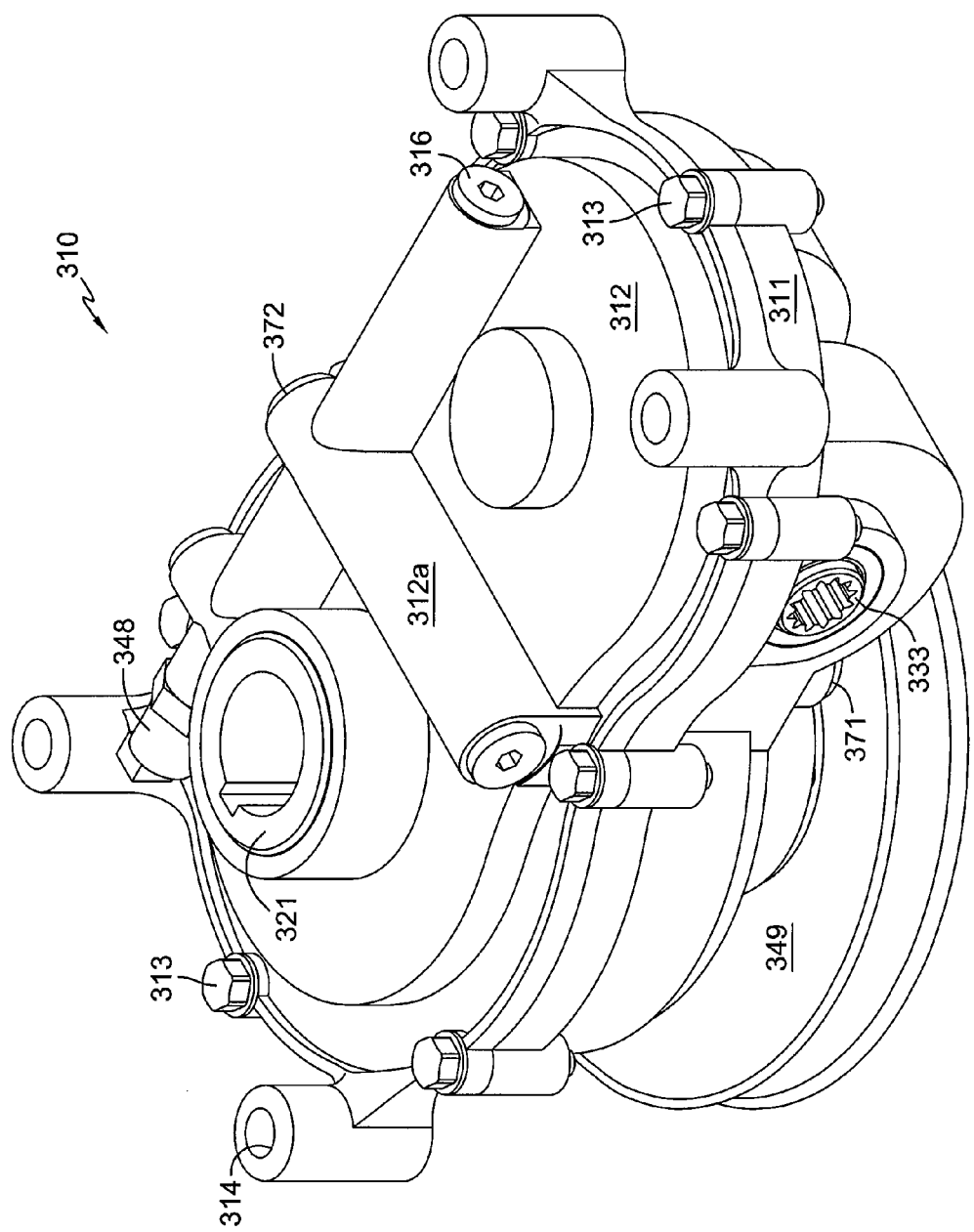
FIG. 4 is an isometric view of a representative central gear box in accordance with the teachings of FIG. 3.
Figure 5:
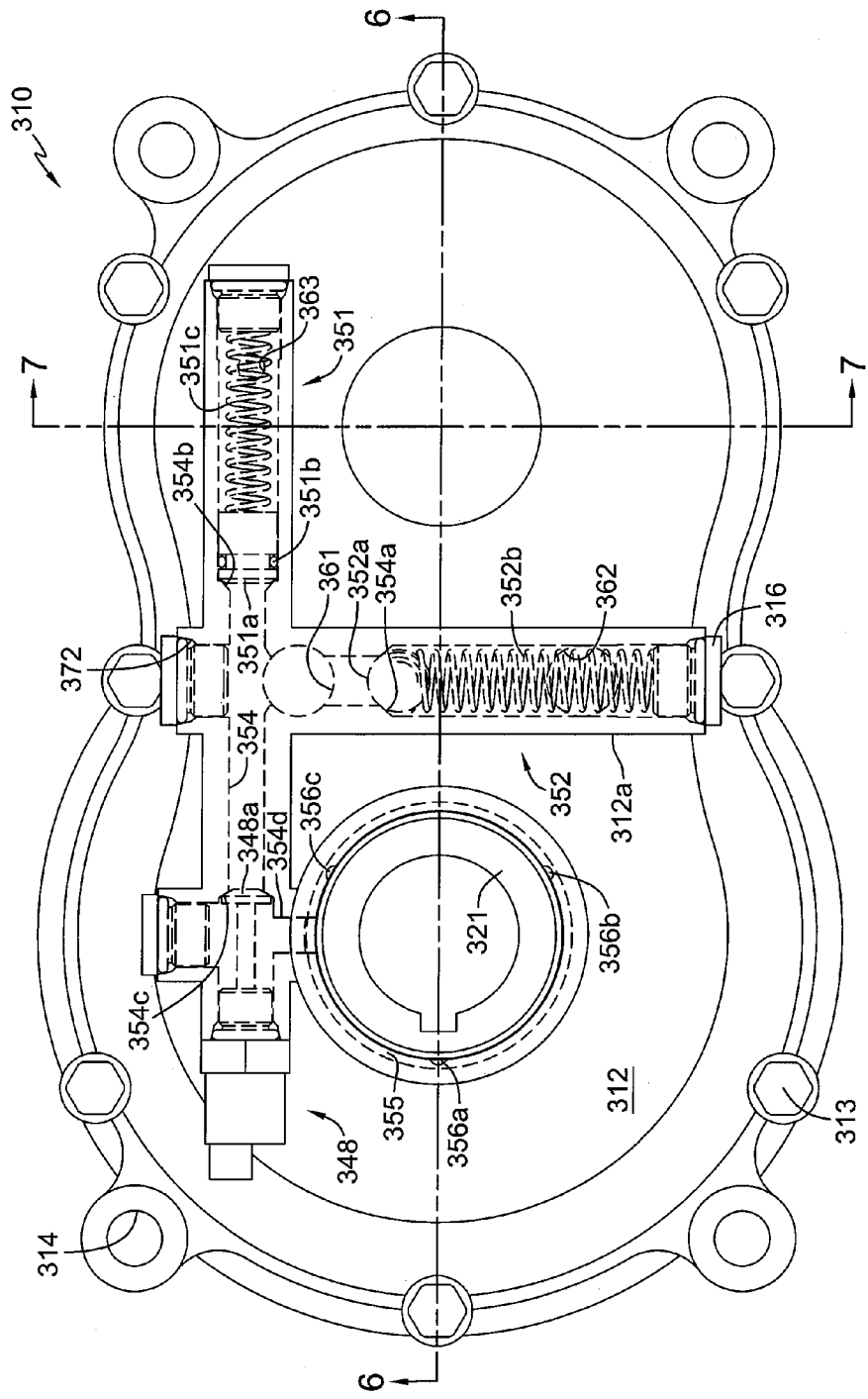
FIG. 5 is a top view of the central gear box of FIG. 4 with various elements of the charge gallery and accumulator visible.
Figure 6:
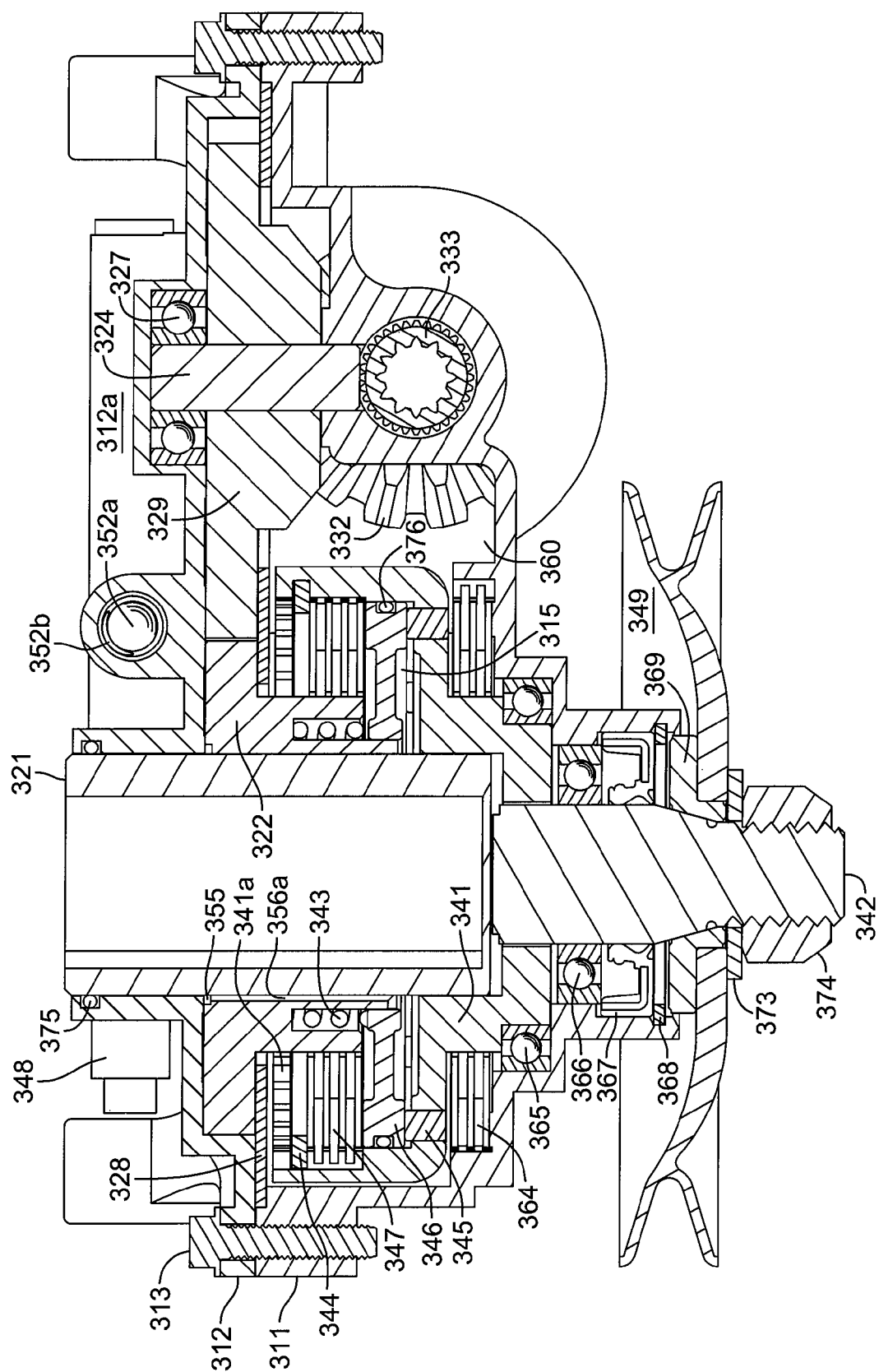
FIG. 6 is a section view of the central gear box of FIG. 5 along the lines 6-6.

FIGS. 3, 4, 5, 6 and 7 illustrate a third embodiment of a modular drive system 300 wherein transmission gears 322 and 323 form a gear pump 350. Such an arrangement requires finer machining tolerances for the gears than in previously described embodiments, but provides the benefit of supplying a source of pressurized hydraulic fluid sufficient to actuate a hydraulic clutch and brake assembly 340 in the power take off mechanism. Prime mover 305, through input shaft 321, drives gear pump 350. An o-ring 375 seals the opening for input shaft 321 in gear box housing cover 312. The intermeshing of transmission gears 322 and 323 in an appropriately configured volume separated from fluid sump 360 by a charge plate 328 (as shown in FIG. 6) provides pressurized hydraulic fluid to a charge gallery 354 (as best shown in FIG. 5) in fluid communication with an accumulator 351.

FIG. 6 further illustrates a compact variation on the central drive train illustrated in FIG. 3, whereby transmission gear 329 is formed as a combination gear that replaces transmission gear 323 and bevel gear 331. Thus, gear pump 350 acts via the pumping action of transmission gears 322 and 329, which run in tight tolerance against charge plate 328 and gear box housing cover 312. This ready supply of pressurized hydraulic fluid can be drawn upon by an operator via actuation of valve 348, here depicted as an electro-mechanical solenoid but understood to include manually actuated as well as other valve types. Should an operator not actuate valve 348 and permit fluid to accumulate in the accumulator 351 and charge gallery, a relief valve 352 is provided to allow fluid to be recycled to the intake zone of gear pump 350. Gear pump 350 normally draws fluid from sump 360 via a vertical passage (not shown) that communicates with an opening in charge plate 328 at a first end of the passage, but fluid may also be drawn from outside sources such as an external reservoir (not shown) through inlet 371. Inlet 371 is located proximate to the second, opposite end of the vertical passage (not shown) that feeds gear pump 350. In either case, the fluid feeding pump 350 may be passed through an optional filter 353 located in the vertical passage (not shown). Use of inlet 371 requires that hydraulic fluid initially be circulated outside central gear box 310 through outlet 372. By way of example, fluid may be circulated directly to an external oil cooler (not shown) or to the left and right side drive mechanisms 380 and 390 for cooling purposes before returning to inlet 371. It should be understood that circulation of hydraulic fluid through the left and right side drive mechanisms 380 and 390 is only appropriate to those portions of the drive mechanisms that are similarly filled with hydraulic fluid. For example, if variable speed drives 381 and 391 are toroidal in nature, they will sealingly contain a traction oil isolated from their respective reduction gear sets 382 and 392, which could contain hydraulic fluid. Thus, circulation of hydraulic fluid would only be appropriate to the portion of left and right side drive mechanisms 380 and 390 housing reduction gear sets 382 and 392. Where variable speed drives 381 and 391 are hydraulic in nature, circulation of hydraulic fluid through the entire left and right side drive mechanisms 380 and 390 would be appropriate. Circulated hydraulic fluid may also be used to power a deck lift in ZT vehicles adapted for mowing. The primary purpose, however, is to provide a source of hydraulic fluid to actuate the hydraulic clutch and brake assembly 340 of the power take off mechanism. The specific workings of hydraulic power take off mechanisms, such as referenced in commonly owned U.S. Pat. No. 7,137,250, the disclosure of which is incorporated herein by reference, are well known in the art and shall only be described briefly herein.

The brake in hydraulic clutch and brake assembly 340 is biased toward engagement. Spring 343 acts on a piston 346 which in turn acts on a plurality of pins 345 (as best shown in FIG. 6) to create frictional engagement of brake disks 364 which thereby hold cage 341 and power take off output shaft 342 static. Hydraulic fluid from gear pump 350 is routed to assembly 340 by opening valve 348. The hydraulic fluid acts against the piston 346 which compresses spring 343 releasing the brake force on power take off output shaft 342. The piston 346 further acts against clutch plates 347 to create frictional engagement therebetween which synchronizes the rotation of input shaft 321 with cage 341 and power take off output shaft 342. When an operator closes valve 348, cutting off the supply of pressurized hydraulic fluid to assembly 340, hydraulic fluid is bled off to fluid sump 360. In the absence of pressurized fluid, the piston can no longer overcome the spring force of spring 343. As a result, the clutch plates 347 do not remain in frictional engagement and cage 341 (and the associated power take off output shaft 342) is disengaged from input shaft 321. Concurrently, spring 343 compresses the brake disks 364 into frictional engagement to stop rotation of cage 341 and the associated power take off output shaft 342.

Figure 7:
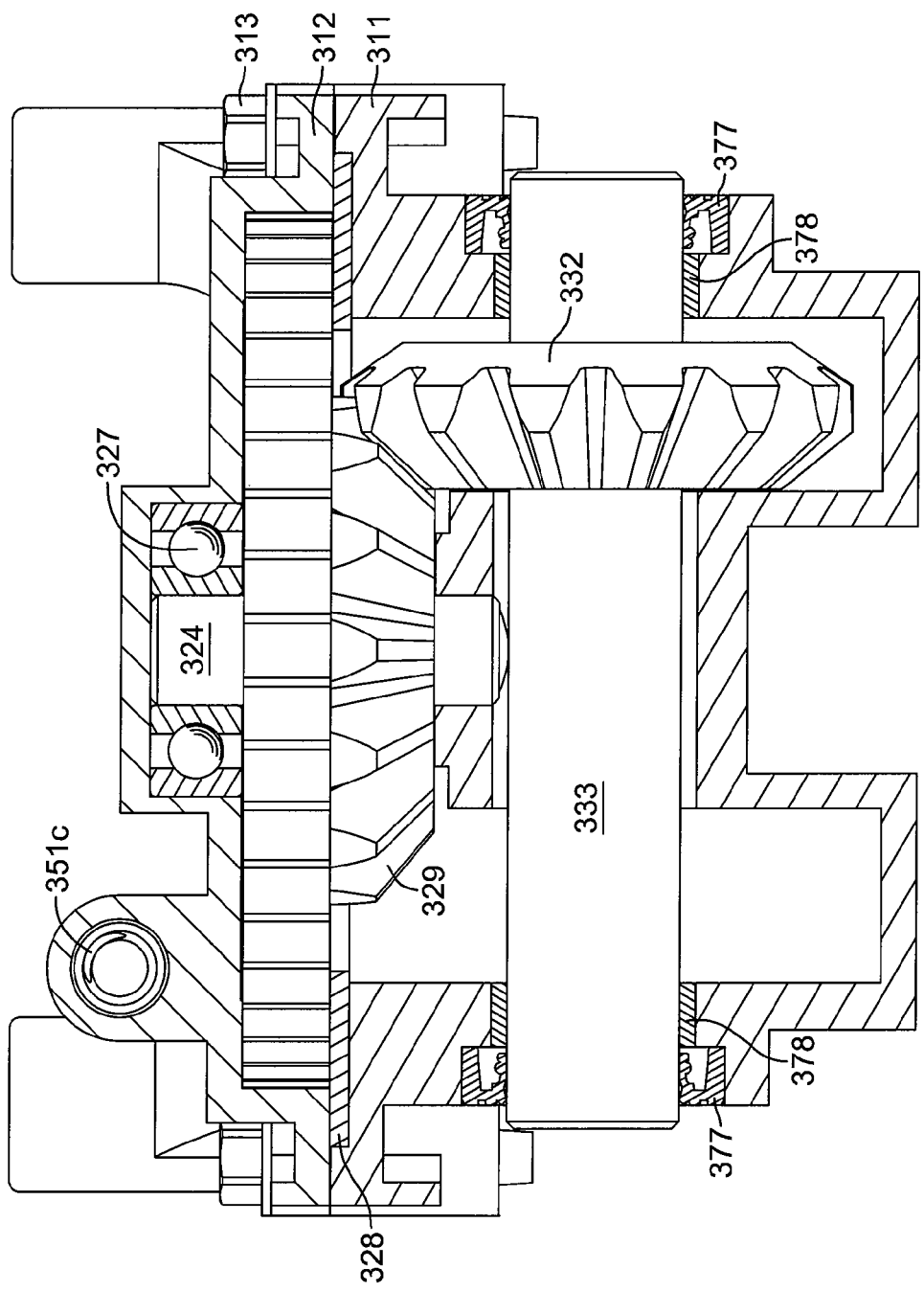
FIG. 7 is a partial section view of the central gear box of FIG. 5 along the lines 7-7 rotated 90° counterclockwise with some elements shown whole for clarity.

FIG. 3 further illustrates that the bevel gears 331 and 332 of distribution gear set 330 may be oriented in an opposite sense to reverse the rotation of central output shaft 333 from that previously observed in distribution gear sets 130 and 230 respectively. This variability creates flexibility in the manner in which left and right side drive mechanisms 380 and 390 may be applied. Jack shaft 324 is engaged to and drives bevel gear 331. As shown in FIGS. 6 and 7, bearing 327 rotationally supports jack shaft 324 in gear box housing cover 312

FIGS. 4, 5 and 6 depict a representative central gear box 310 in accordance with the principles of the invention outlined above in the description of the third embodiment of FIG. 3, with the minor variation in FIG. 6 as previously described herein. Gear box housing 311 contains the central drive train and power take off mechanism. Gear box housing cover 312 is sealingly engaged to housing 311 by a plurality of fasteners 313 to form sump 360. Housing cover 312 is formed with a plurality of bosses 314 by which central gear box 310 may be fastened to a vehicle frame. Housing cover 312 is also formed with a feature 312a containing an internal volume which accommodates the charge gallery 354, accumulator 351, relief valve 352, and clutch actuation valve 348. Various features of the internal volume will require machining and consequently the passageways of the internal volume are sealed with plugs 316. Charge outlet 372, for example, is so sealed, as is the charge inlet 371 of housing 311. Input shaft 321 is depicted as a hollow shaft with keyway, but it may take any necessary form known in the art to mate with an output shaft from the prime mover 305. Central output shaft 333 is depicted as having the splined female configuration previously described.

FIG. 5 best illustrates the details of the internal volume of housing cover 312, and the functionality of components disposed therein. Pressurized fluid from gear pump 350 enters charge gallery 354 through passage 361. As fluid volume builds in charge gallery 354, accumulator 351 reacts to accommodate the increasing volume. Accumulator 351 comprises a piston 351a having an o-ring 351b and spring 351c, wherein the piston 351a is in sealing engagement with seat 354b of charge gallery 354. As fluid volume and pressure builds, piston 351a is forced off seat 354b and spring 351c is compressed. An equilibration passage 363 is provided in the accumulator volume to permit any trapped air or fluid behind piston 351a to be transferred to fluid sump 360, allowing the piston 351a to freely travel and preventing formation of a vacuum behind the piston 351a. Once piston 351a has completed its full compression travel, increasing fluid volume and pressure will act on relief valve 352, which is depicted as a ball 352a and spring 352b arrangement. It should be understood that other forms of relief valves known in the art would serve equally well and lie within the scope of the invention. Ball 352a is in sealing engagement with seat 354a of charge gallery 354. As increased fluid volume and pressure overcome the spring force of spring 352b, ball 352a is moved off seat 354a, where hydraulic fluid bypasses the ball 352a and exits the charge gallery through relief passage 362 to the intake zone of gear pump 350 located in the volume above charge plate 328 directly below relief passage 362. As fluid volume and pressure in the charge gallery decreases by cracking of relief valve 352, or alternatively, actuation of valve 348, ball 352a returns to seat 354a as the spring force of spring 352b overcomes the opposing fluid force in charge gallery 354.

Valve 348, depicted herein as an electro-mechanical solenoid valve, is under operator control and permits pressurized hydraulic fluid from charge gallery 354 to actuate hydraulic clutch and brake assembly 340 when opened. The valve 348 comprises an electromagnet (not shown) and a valve body 348a which is shown in sealing engagement with seat 354c of charge gallery 354. Actuation of valve 348 results in valve body 348a being moved off seat 354c, permitting pressurized hydraulic fluid to flow through fluid passage 354d and occupy the annular space 355 about input shaft 321. As shown in FIGS. 5 and 6, vertical passages 356a-c adjacent input shaft 321 communicate with annular space 355 to provide pressurized hydraulic fluid to volume 315 below piston 346, which is sealed by o-ring 376. In the absence of pressurized fluid, clutch spring 343 acts against piston 346 to force a plurality of pins 345 into contact with piston 346, thereby compressing brake disks 364 into frictional engagement with each other, arresting any rotation of cage 341 and power take off output shaft 342. One set of the brake disks 364 is fixed to gear box housing 311, and the intervening set of brake disks 364 is fixed to cage 341 by a gear form native to cage 341. As pressurized fluid fills volume 315, piston 346 acts against and overcomes the spring force of clutch spring 343. Consequently, pins 345 no longer act to compress brake disks 364 into frictional engagement, permitting cage 341 and power take off output shaft 342 to rotate freely. As pressurized fluid continues to fill volume 315, piston 346 begins to act against clutch plates 347, compressing the clutch plates 347 into frictional engagement. The stack-up of clutch plates 347 consists of one set that is captured by a gear form 341a native to the cage 341 and an interwoven set that is captured by a gear form native to transmission gear 322, turning continuously therewith. The movement of the clutch plates are restricted vertically by retaining ring 344, permitting frictional engagement to occur. As the engagement of the clutch plates 347 reaches maximum effect, with transmission gear 322 being splined to input shaft 321, the rotation of input shaft 321 is imparted to cage 341 and power take off output shaft 342 which is splined thereto. The rotation of cage 341 is supported by bearing 365, and the rotation of output shaft 342 is supported by bearing 366. Hydraulic fluid is retained by a seal 367 and retaining ring 368 about output shaft 342. To produce useful work, a pulley 349 may be affixed to output shaft 342 through means of a hub 369, washer 373, and hub nut 374.

When valve 348 is closed, the flow of pressurized hydraulic fluid to the clutch is curtailed and the fluid accumulated in volume 315 returns to sump 360 through various spaces associated with component tolerances. As a result, the brake arrests movement of cage 341 and output shaft 342 as described above.

FIG. 7 provides a partial section view of the distribution gear set 330 which illustrates that space is available for distribution gear 332 to be mounted at either end of central output shaft 333 to achieve a particular rotational direction. Central output shaft 333 is rotationally supported by a bushing 378 at each end, and the gear box housing 311 is sealed at each end of central output shaft 333 by a lip seal 377.

Figure 8:
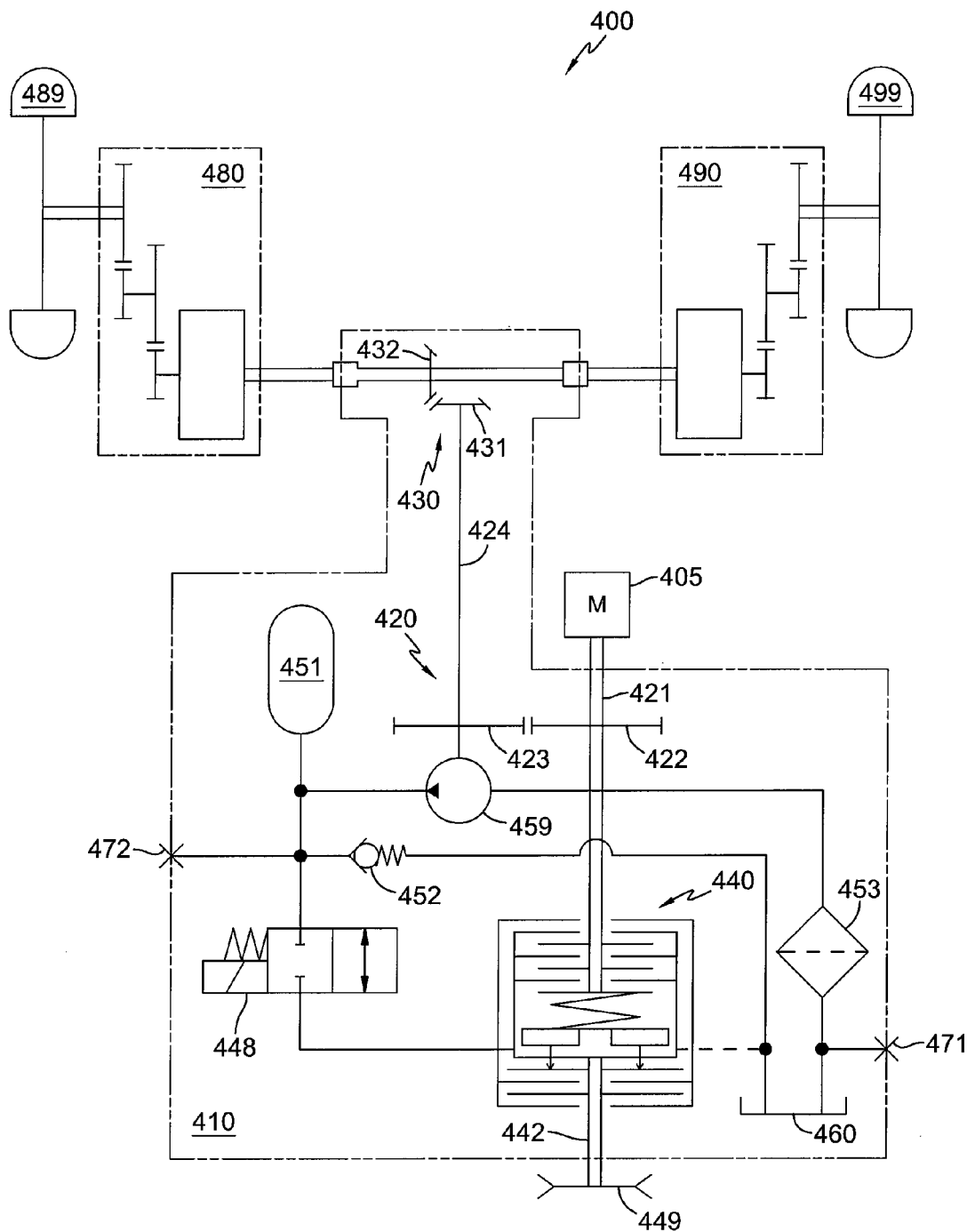
FIG. 8 is a schematic representation of a fourth embodiment of the modular drive system, having a dedicated charge pump to provide pressurized hydraulic fluid to the hydraulic clutch and brake.

FIG. 8 illustrates a fourth embodiment of a modular drive system 400 which introduces a dedicated charge pump 459 to provide a source of pressurized hydraulic fluid for the hydraulic clutch and brake assembly 440 of the power take off mechanism. Charge pump 459 may be of any known design such as a gerotor or geroller pump. The use of such a charge pump eases manufacturing tolerances for the transmissions gear set 420 as compared to that previously described for the transmission gear set 320 of the third embodiment. Jack shaft 424 extends through transmission gear 423 to drive charge pump 459 in addition to driving distribution gear set 430. As previously described for gear pump 350, charge pump 459 draws hydraulic fluid from fluid sump 460 through optional filter 453. Pressurized hydraulic fluid is discharged to a charge gallery 454 (as best shown in the FIG. 10) in fluid communication with an accumulator 451, a relief valve 452 and hydraulic clutch actuation valve 448. The workings of the hydraulic clutch and brake assembly 440 and the related hydraulic circuit are as previously described for the third embodiment. It should also be recognized that charge pump 459, with its greater efficiency, is more suited to providing hydraulic fluid for external circulation via outlet 472 and inlet 471 than gear pump 350.

Figure 9:
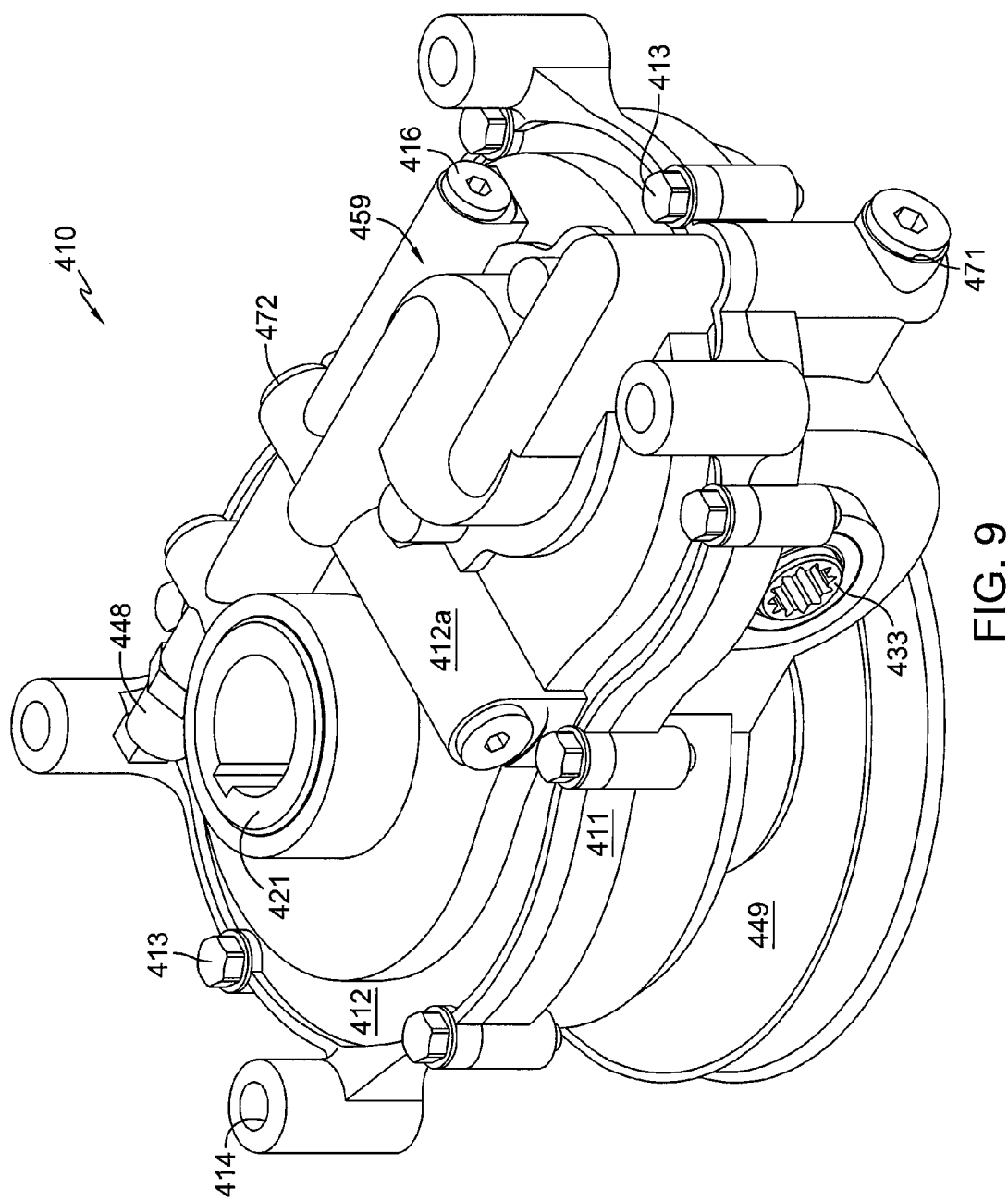
FIG. 9 is an isometric view of a representative central gear box in accordance with the teachings of FIG. 8.
Figure 10:
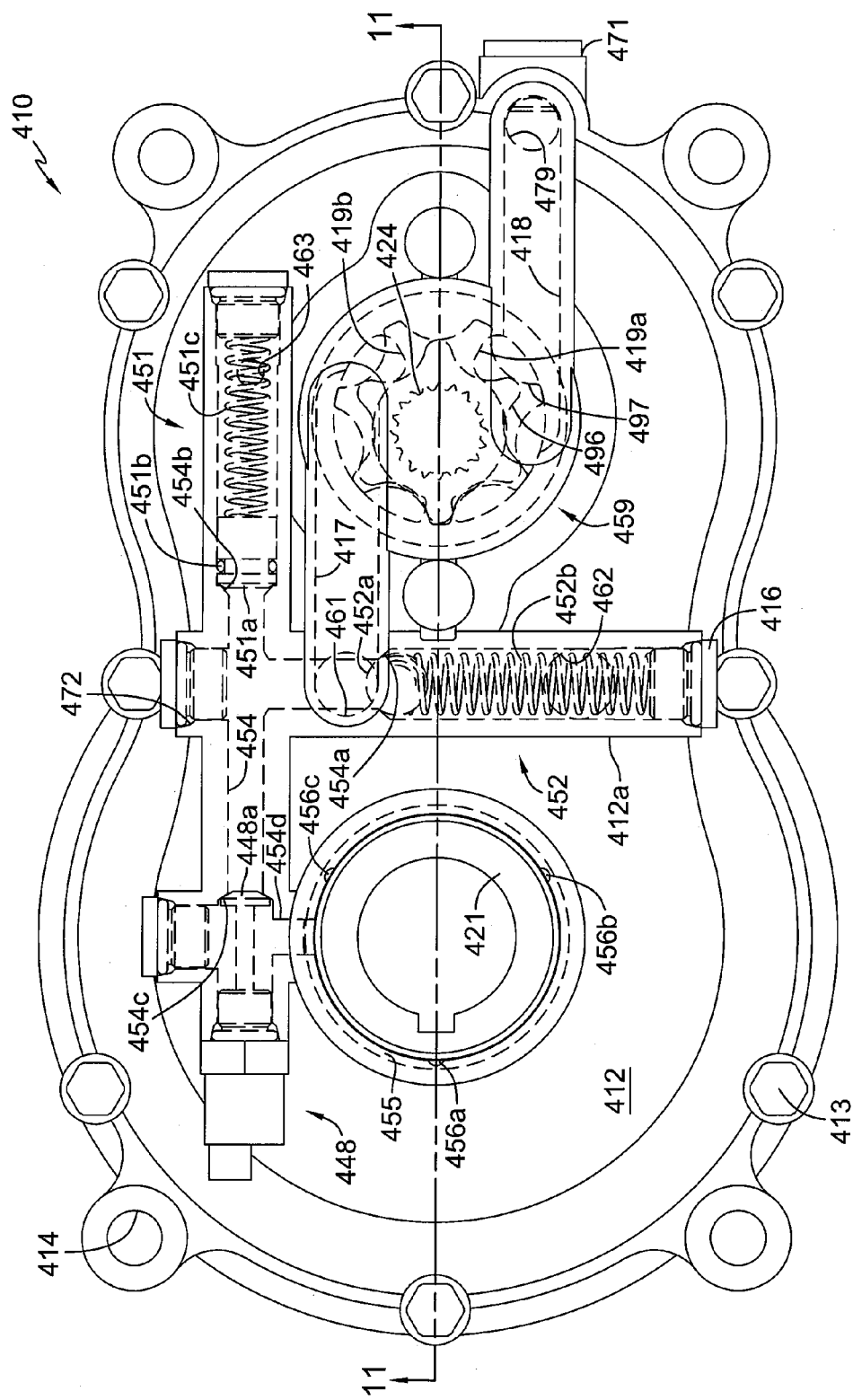
FIG. 10 is a top view of the central gear box of FIG. 9 with various elements of the charge gallery and accumulator visible.
Figure 11:
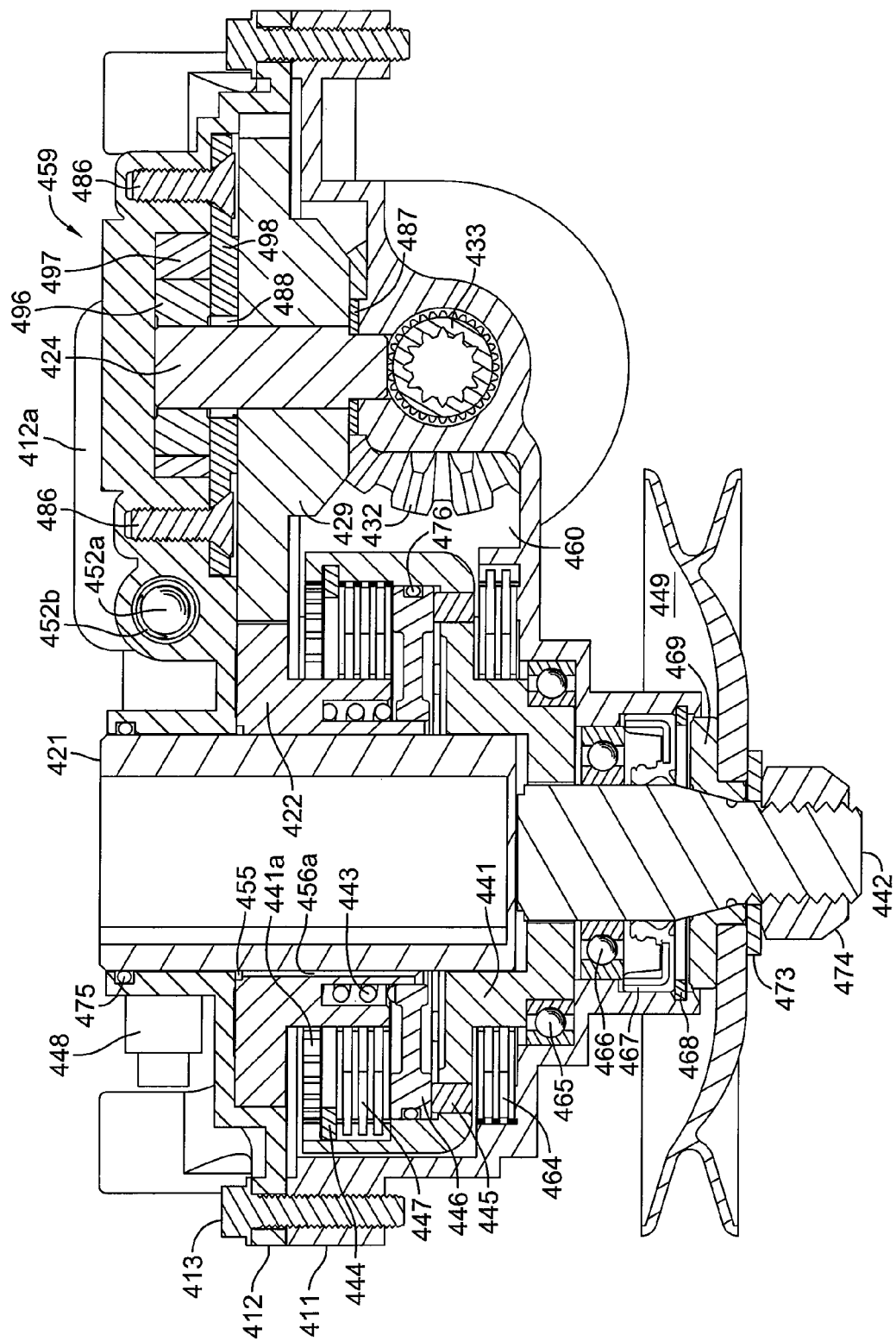
FIG. 11 is a section view of the central gear box of FIG. 10 along the lines 11-11.

FIGS. 9, 10 and 11 depict a representative central gear box 410 in accordance with the principles of the invention outlined above in the description of the fourth embodiment, as shown in FIG. 8. Similar to central gear box 310, FIG. 11 illustrates a compact variation on the central drive train illustrated in FIG. 8, whereby transmission gear 429 is a combination gear that replaces transmission gear 423 and bevel gear 431. The differences in the structure and function of central gear box 410 as compared to that just described for central gear box 310 will now be addressed. Central gear box housing 411 and housing cover 412 have been altered to accommodate a charge pump 459 and the requisite fluid inlet passage 418 and fluid discharge passage 417. These requisite passages predominately occupy feature 412a of housing cover 412.

Charge pump 459 is depicted herein as a gerotor pump, but other known pump types such as a geroller pump are contemplated by the invention. Notably, inlet 471 has been moved to the perimeter of housing 411 away from any potential interference with pulley 449 in recognition of the capacity of charge pump 459 to do more than provide fluid for hydraulic clutch and brake assembly 440. Outlet 472 can be utilized to circulate pressurized hydraulic fluid outside central gear box 410 for various purposes prior to intake at inlet 471.

Charge pump 459 draws hydraulic fluid from either fluid sump 460 or inlet 471 through a series of passages beginning with vertical inlet passage 479. Vertical inlet passage 479 consists of an upper portion formed in gear box housing cover 412 and a lower portion formed in gear box housing 411. The joint between the upper and lower portions may be sealed with an o-ring (not shown), or a tube insert with an o-ring at both ends of the tube (not shown). Hydraulic fluid then passes through inlet passage 418 which communicates with the arcuate port 419a to feed charge pump 459. The inner rotor 496 is fixed to jack shaft 424 and works in combination with outer rotor 497 to pump hydraulic fluid out arcuate port 419b and into fluid discharge passage 417. Hydraulic fluid then exits discharge passage 417 at opening 461 to fill charge gallery 454. Inner rotor 496 and outer rotor 497 utilize charge plate 498 as a running surface. Charge plate 498 is mounted to housing cover 412 using fasteners 486 and features a fluid annulus 488 to provide lubrication to the gears of the central drive train. The additional loading imparted to jack shaft 424 by charge pump 459 is mediated by the addition of thrust washer 487.

The operation of the common elements of central gear box 410, here labeled as 400 series elements, are as described for those same elements of central gear box 310 and will not be further discussed. One distinction should be noted in the operation of relief valve 452, which here exhausts directly to sump 460 in the absence of an equivalent to charge plate 328 directly below the gears of the central drive train.

Figure 12:
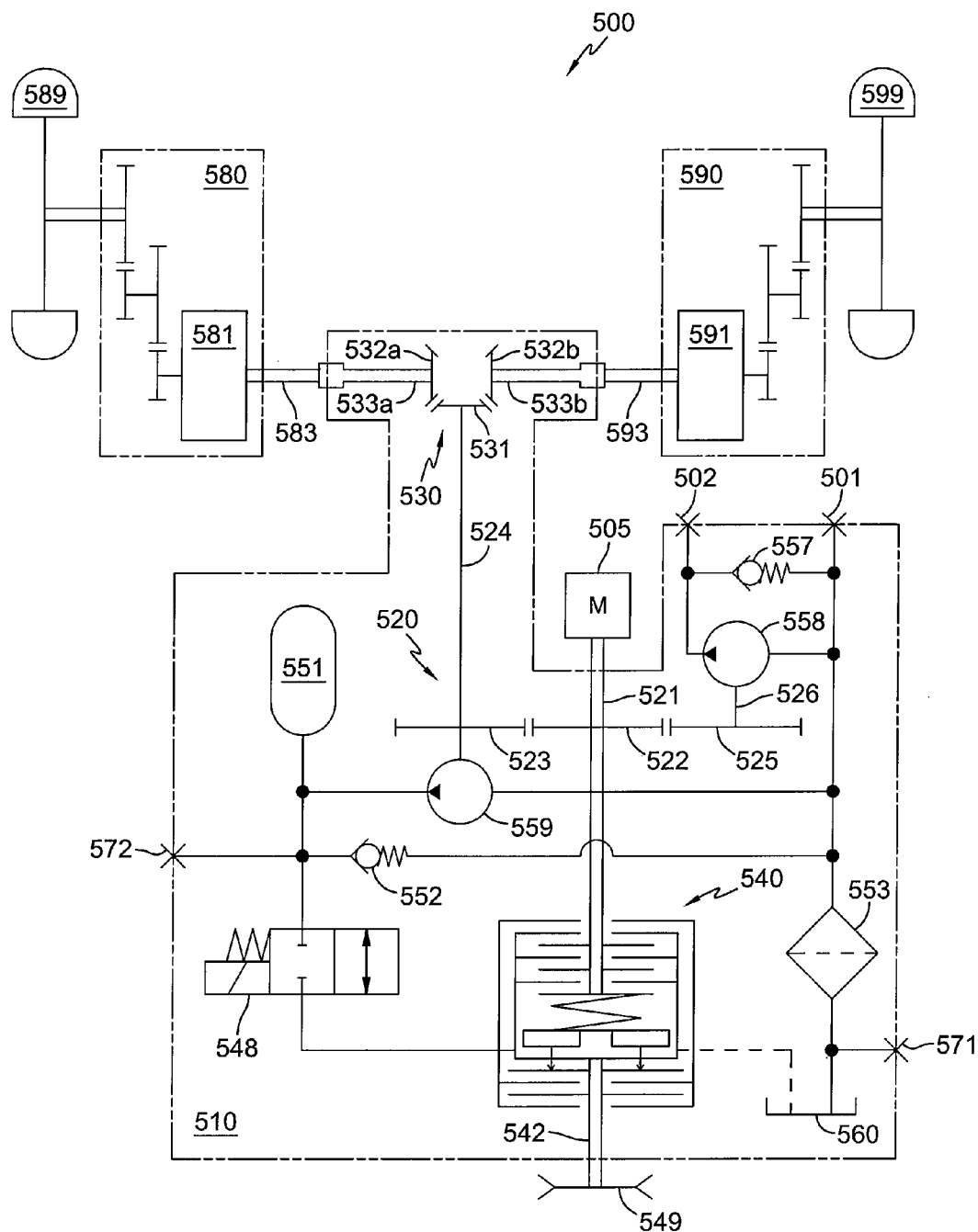
FIG. 12 is a schematic representation of a fifth embodiment of the modular drive system, similar to that of FIG. 8, having an auxiliary pump.

FIG. 12 illustrates a fifth embodiment of a modular drive system 500 which differs from the fourth embodiment in two primary ways, namely, the addition of an auxiliary pump 558 and a new configuration for the distribution gear set 530. Prime mover 505 provides motive force to input shaft 521 which powers transmission gear set 520. More specifically, transmission gear 522, which is engaged to input shaft 521, powers both transmission gears 523 and 525 in the same rotational sense. Transmission gear 523 provides motive force to both charge pump 559 and distribution gear set 530 via jack shaft 524. Transmission gear 525 provides motive force to auxiliary pump 558 via auxiliary shaft 526. Auxiliary pump 558 may be of various types, including but not limited to, gear pumps, gerotor pumps or geroller pumps. Auxiliary pump 558 draws hydraulic fluid from fluid sump 560 to make up for any lost volume in the external loop between auxiliary outlet 502 and auxiliary inlet 501, wherein the fluid drawn from fluid sump 560 may be passed through optional filter 553 prior to intake. The pressurized fluid discharged from auxiliary pump 558 exits central gear box 510 at auxiliary outlet 502 and returns through either dedicated auxiliary inlet 501 or inlet 571 which facilitates filtering. In addition to the external uses described for pressurized fluid from gear pump 350 and charge pump 459, the pressurized fluid from auxiliary pump 558 can be used to power auxiliary devices such as trimmers or augers attached to utility vehicles. An auxiliary relief valve 557 is included in the auxiliary pump's hydraulic circuit to relieve fluid that is not being utilized by an external device. It should also be noted that the charge relief valve 552 provided for the fifth embodiment differs from charge relief valve 452 in that it exhausts to the intake of charge pump 559, as opposed to discharging directly to sump 560.

Distribution gear set 530 illustrates a further drive train variant intended to permit the input shafts 583 and 593 to the left and right side drive assemblies, 580 and 590 respectively, to be driven in opposite rotational directions. The purpose is to allow variable drive mechanisms 581 and 591 to be identical units, not minor-image units; thus, providing a cost advantage during manufacture. Jack shaft 524 is engaged to and drives bevel gear 531 which drives corresponding left and right side bevel gears 532a and 532b respectively. The latter gears are each engaged to and drive a corresponding central output shaft 533a and 533b respectively. Each central output shaft is thereafter engaged to a corresponding input shaft 583 or 593 for the left and right side drive mechanisms, providing motive force thereto to ultimately propel wheels 589 and 599.

Figure 13:
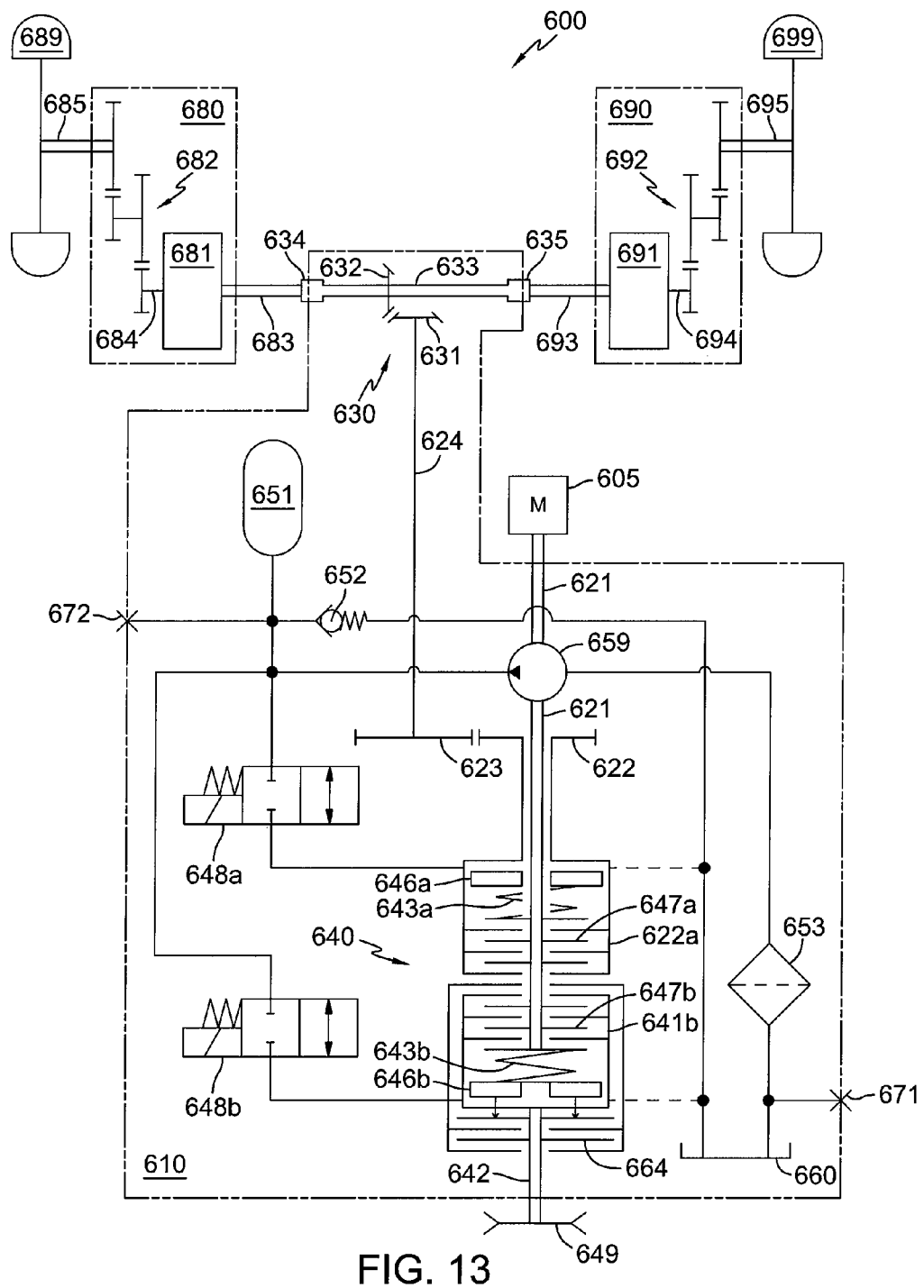
FIG. 13 is a schematic representation of a sixth embodiment of the modular drive system having two hydraulic clutches.
Figure 14:
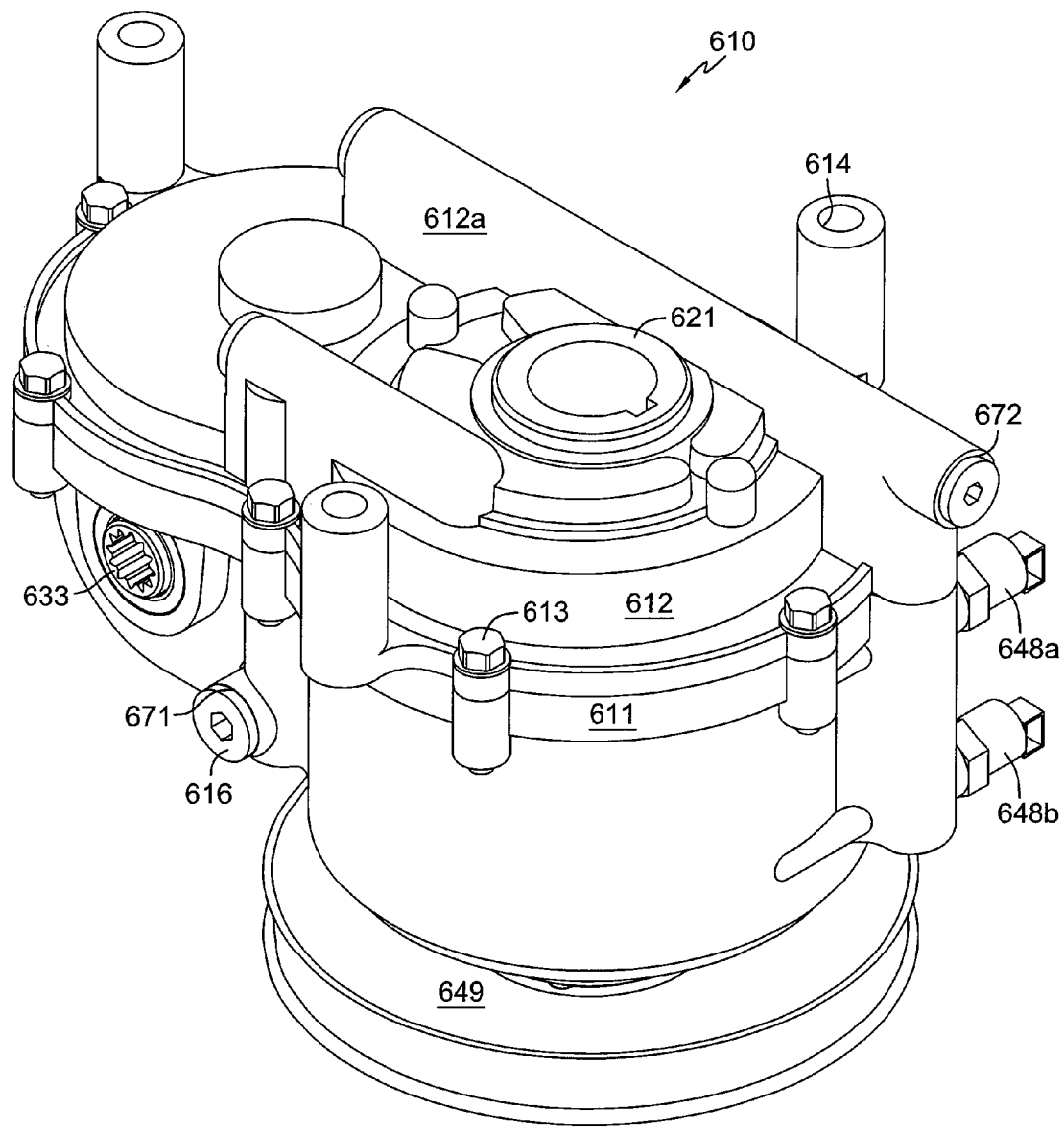
FIG. 14 is an isometric view of a representative central gear box in accordance with the teachings of FIG. 13.
Figure 15:
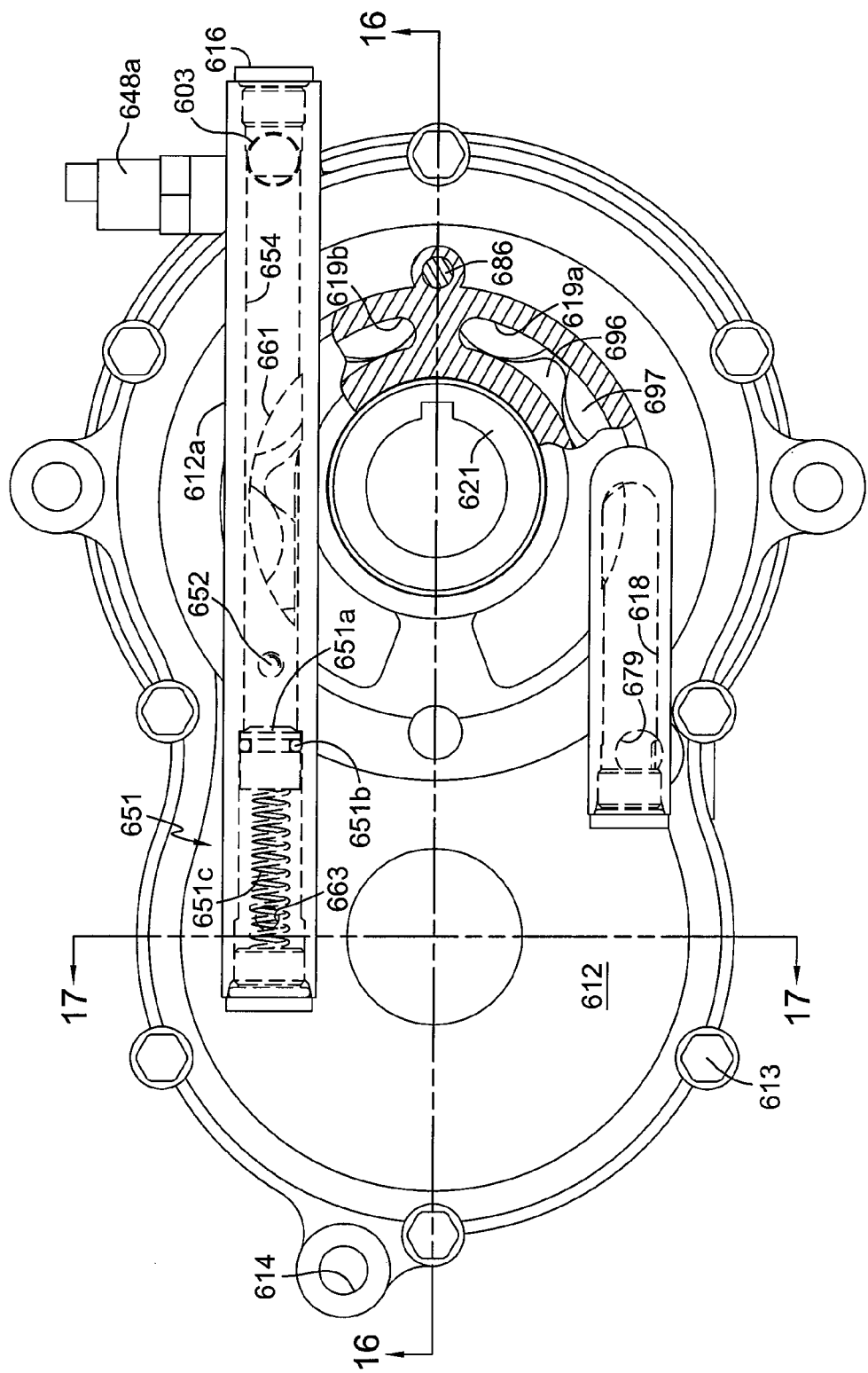
FIG. 15 is a top view of the central gear box of FIG. 14 with various elements of the charge gallery and accumulator visible.

FIG. 13 illustrates a sixth embodiment of a modular drive system 600 which also uses a dedicated charge pump 659 to provide a source of pressurized hydraulic fluid for a dual hydraulic clutch and brake assembly 640, where both clutches are disposed on the input shaft 621 to selectively engage the central drive train and the power take off mechanism respectively. Many of the elements in this embodiment that may be substantially identical to those previously described and which differ only in the initial numeral in this description will not be described in detail herein.

Figure 16:
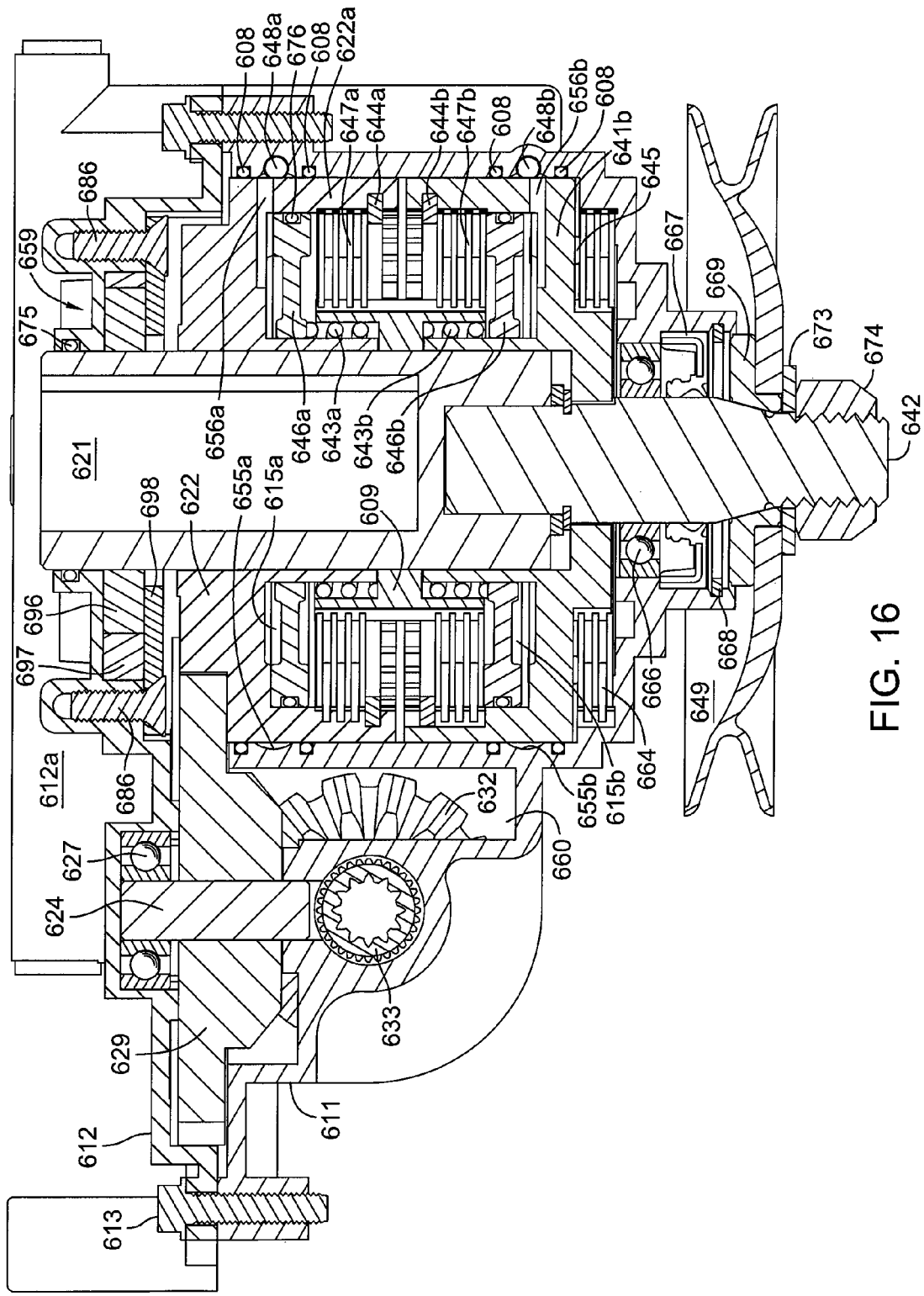
FIG. 16 is a section view of the central gear box of FIG. 15 along the lines 16-16
Figure 17:
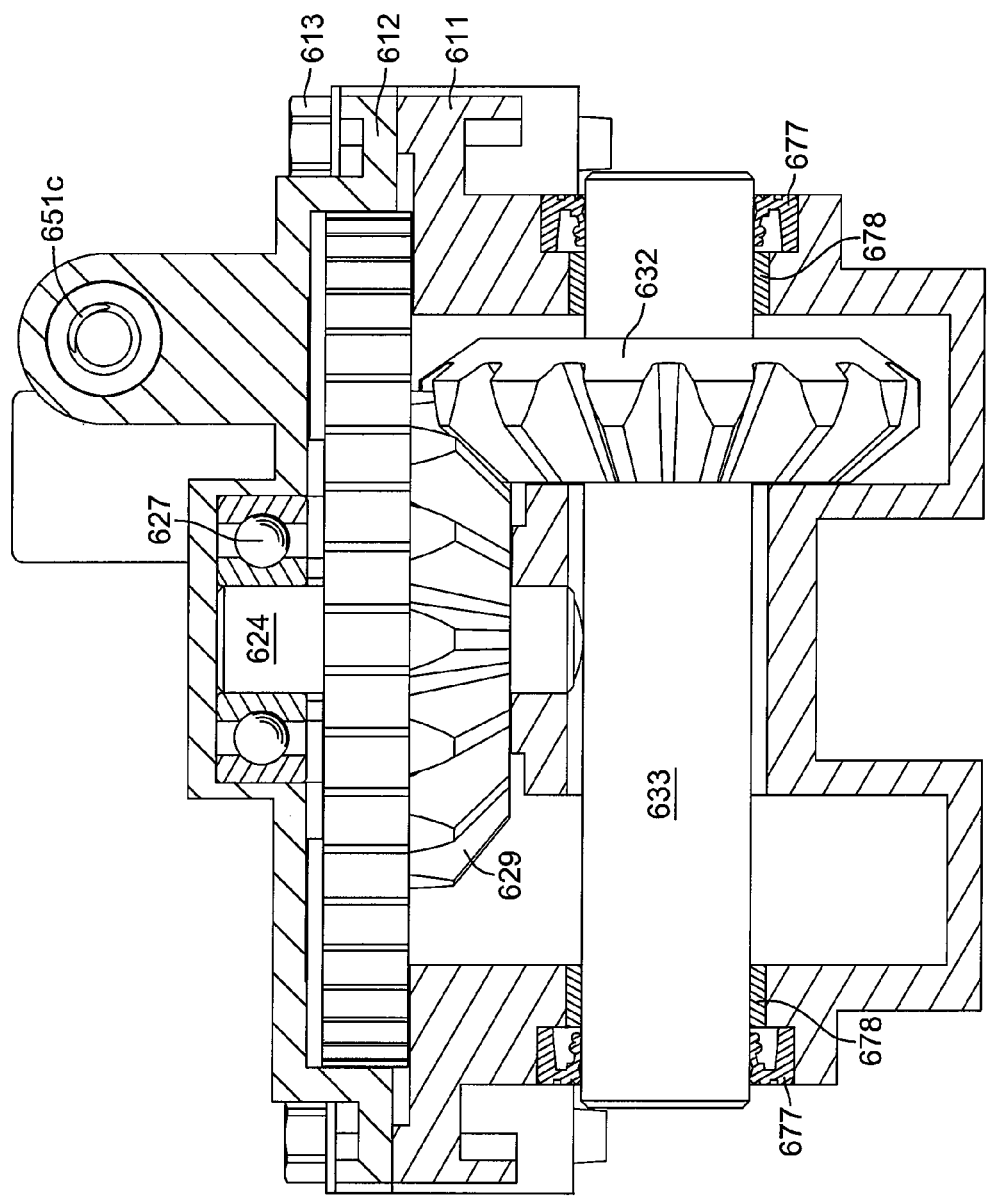
FIG. 17 is a partial section view of the central gear box of FIG. 15 along the lines 17-17 rotated 90° clockwise with certain elements shown whole for clarity.

FIGS. 14, 15, 16 and 17 depict a representative central gear box 610 in accordance with the principles of the invention outlined above in the description of the sixth embodiment, as shown in FIG. 13. Similar to central gear boxes 110, 210, 310 and 410, FIG. 16 illustrates a compact variation on the central drive train illustrated in FIG. 13, whereby transmission gear 629 is a combination gear that replaces transmission gear 623 and bevel gear 631. FIG. 17 provides a further view of transmission gear 629 and its integration with distribution gear 632 and central output shaft 633. The form and function of the distribution gear set 630 is as described for the third embodiment in FIG. 7 and will not be further detailed herein. The differences in the structure and function of central gear box 610 as compared to that previously described for central gear box 410 will now be addressed. Central gear box housing 611 and housing cover 612 have been altered to accommodate certain changes in this embodiment, such as the use of the dual hydraulic clutch and brake assembly 640, a pair of hydraulic clutch actuation valves 648a and 648b to individually control the two clutch mechanisms, a charge pump 659 on the input shaft 621 and the corresponding charge gallery 654 that provides hydraulic fluid to both clutch mechanisms.

Charge pump 659 is driven directly by input shaft 621 and pressurized hydraulic fluid is discharged to a charge gallery 654 in fluid communication with an accumulator 651, a relief valve 652 and a pair of hydraulic clutch actuation valves 648a and 648b. Charge pump 659 draws hydraulic fluid from either fluid sump 660 or inlet 671 through a series of passages beginning with vertical inlet passage 679. Hydraulic fluid then passes through inlet passage 618 which communicates with the arcuate port 619a to feed charge pump 659. The inner rotor 696 is fixed to input shaft 621 and works in combination with outer rotor 697 to pump hydraulic fluid out arcuate port 619b and into charge gallery 654 through the opening 661 formed by the intersection of arcuate port 619b and charge gallery 654. Thus, pressurized hydraulic fluid is made available to charge accumulator 651 and selectively actuate the dual clutches upon demand. A vertical passage 603 leading from charge gallery 654 to the hydraulic clutch actuation valves 648a and 648b provides the necessary fluid communication. Charge relief valve 652, whose ball and spring are now vertically oriented below charge gallery 654, exhausts fluid directly to sump 660 via a vertical passage (not shown) through charge plate 698, and not to an intake passage for the charge pump 659.

This embodiment provides a dual clutch and brake assembly 640 having two sets of clutch plates 647a, 647b and a pair of corresponding hydraulic clutch actuation valves 648a, 648b. The addition of a clutch mechanism to selectively engage the drive train reduces wear on drive train components and maximizes power transmission to the power take off mechanism when the power take off mechanism is operated with the vehicle stationary, such as when powering an auger for digging post holes. Both of the clutches share a common clutch plate carrier 609 that is fixed to and rotates with input shaft 621. Half of each set of the clutch plates (647a for the drive train clutch and 647b for the power take off clutch) are fixed to the common clutch plate carrier 609 by corresponding gear forms and rotate therewith. It should be understood that the specific shape of the interface between input shaft 621 and the clutch plates 647a and 647b is not critical provided they interlock and rotate together. Transmission gear 622 is formed with a cage portion 622a of the drive train clutch which similarly captures the clutch plates 647a that are alternately interlaced with those of input shaft 621. Retaining ring 644a maintains the stack-up and permits frictional engagement of the drive train clutch plates 647a. Cage 641b of the power take off clutch captures the clutch plates 647b that are alternately interlaced with those of input shaft 621. Retaining ring 644b maintains the stack-up and permits frictional engagement of power take off clutch plates 647b.

The form and function of both these hydraulic clutches is similar to that previously described for the third and fourth embodiments. The drive train clutch and the power take off clutch each have a clutch spring (643a and 643b respectively) that acts against a piston (646a and 646b respectively) to remove compressive force from the clutch plates (647a and 647b respectively) and bias the clutches to a disengaged state. In the case of the power take off clutch, the action of clutch spring 643b further brings piston 646b into engagement with a plurality of pins 645 which in turn bring the stack-up of brake plates 664 into frictional engagement, thereby arresting any rotation of cage 641b and the affixed power take off output shaft 642. Brake plates 664 are alternately retained in their stack-up by gear box housing 611 and cage 641b. The drive train clutch and the power take off clutch are each brought into frictional engagement when a hydraulic clutch actuation valve (648a and 648b respectively) is opened to permit pressurized hydraulic fluid in the vertical passage 603 to fill an annular space (655a and 655b respectively) about the cage (622a and 641b respectively) and then traverse a passage (656a and 656b respectively) to fill the volume (615a and 615b respectively) adjacent the piston (646a and 646b respectively) and opposite the clutch spring (643a and 643b respectively). A plurality of o-rings 608 helps to retain fluid in the annular spaces 655a and 655b. The pressurized hydraulic fluid acts against the piston (646a and 646b respectively) and the opposing clutch spring forces to bring the clutch plates (647a and 647b respectively) into frictional engagement, their movement arrested against the retaining ring (644a and 644b respectively). Thus, transmission gear 622 is brought into rotational synchronization with input shaft 621 to power transmission gear 629 and ultimately central output shaft 633. The movement of piston 646b against the power take off clutch plates 647b correspondingly removed the transmitted spring forces from the plurality of pins 645 and brake plates 664. Thus, cage 641b and the affixed power take off output shaft 642 become rotationally free to synchronize with the rotation of input shaft 621 as the frictional engagement of the power take off clutch plates 647b comes into full effect. The clutches are disengaged when the hydraulic clutch actuation valves 648a and 648b are closed, removing the hydraulic force from pistons 646a and 646b, which then come under the influence of the clutch springs 643a and 643b, taking the clutch plates 647a and 647b out of frictional engagement. Excess hydraulic fluid from volumes 615a and 615b migrates to sump 660 through the various tolerances between component parts as pistons 646a and 646b move under the influence of clutch springs 643a and 643b.

Rotational support for the various shafts and cages of central gear box 610 and hydraulic seals for the various components are similar to the scheme previously described for the third and fourth embodiments and will not be further addressed herein. As before, a pulley 649 may be fastened to power take off output shaft 642 with a hub 669, washer 673 and hub nut 674 to perform useful work.

Figure 18:
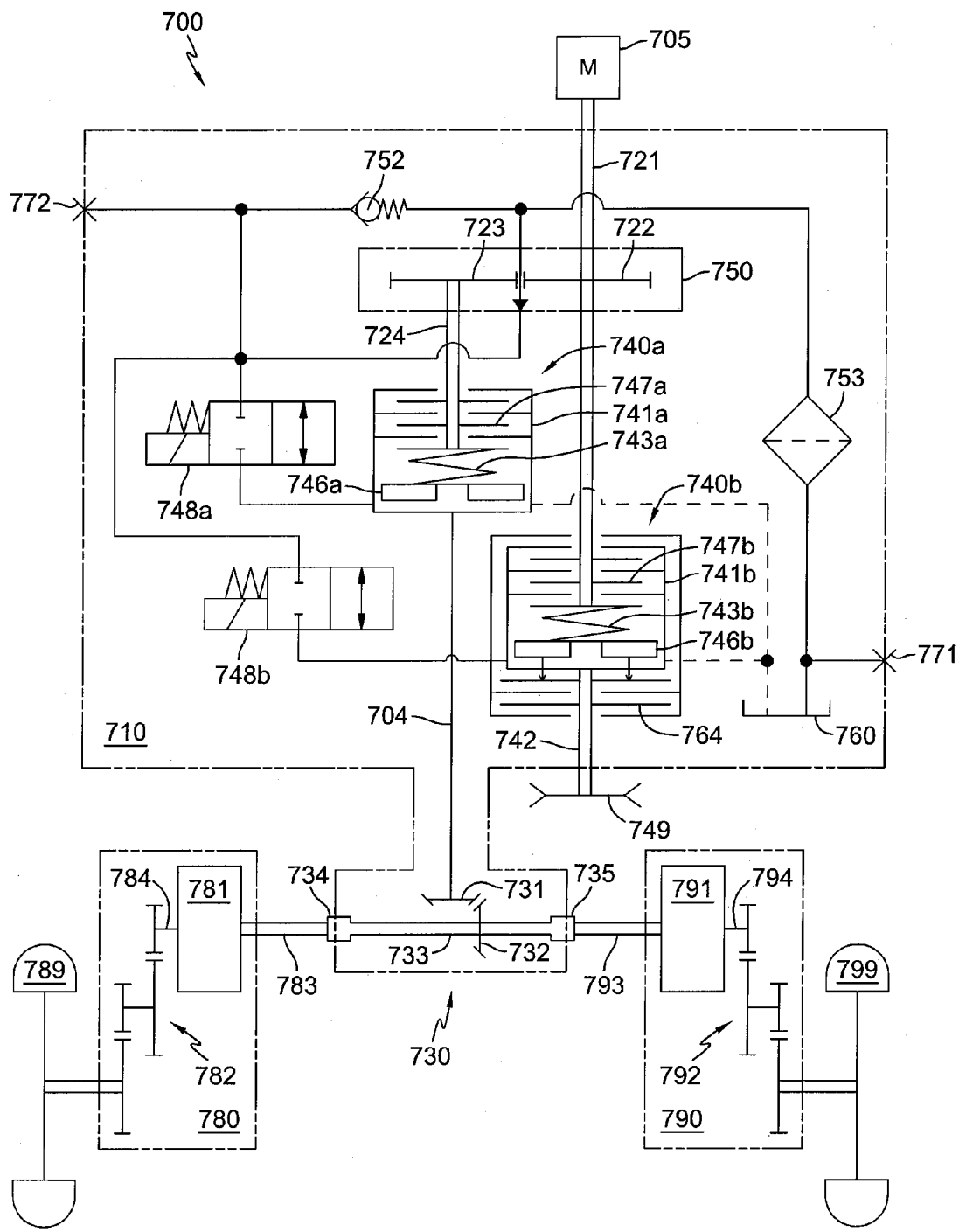
FIG. 18 is a schematic representation of a seventh embodiment of the modular drive system having dual hydraulic clutches.
Figure 20:
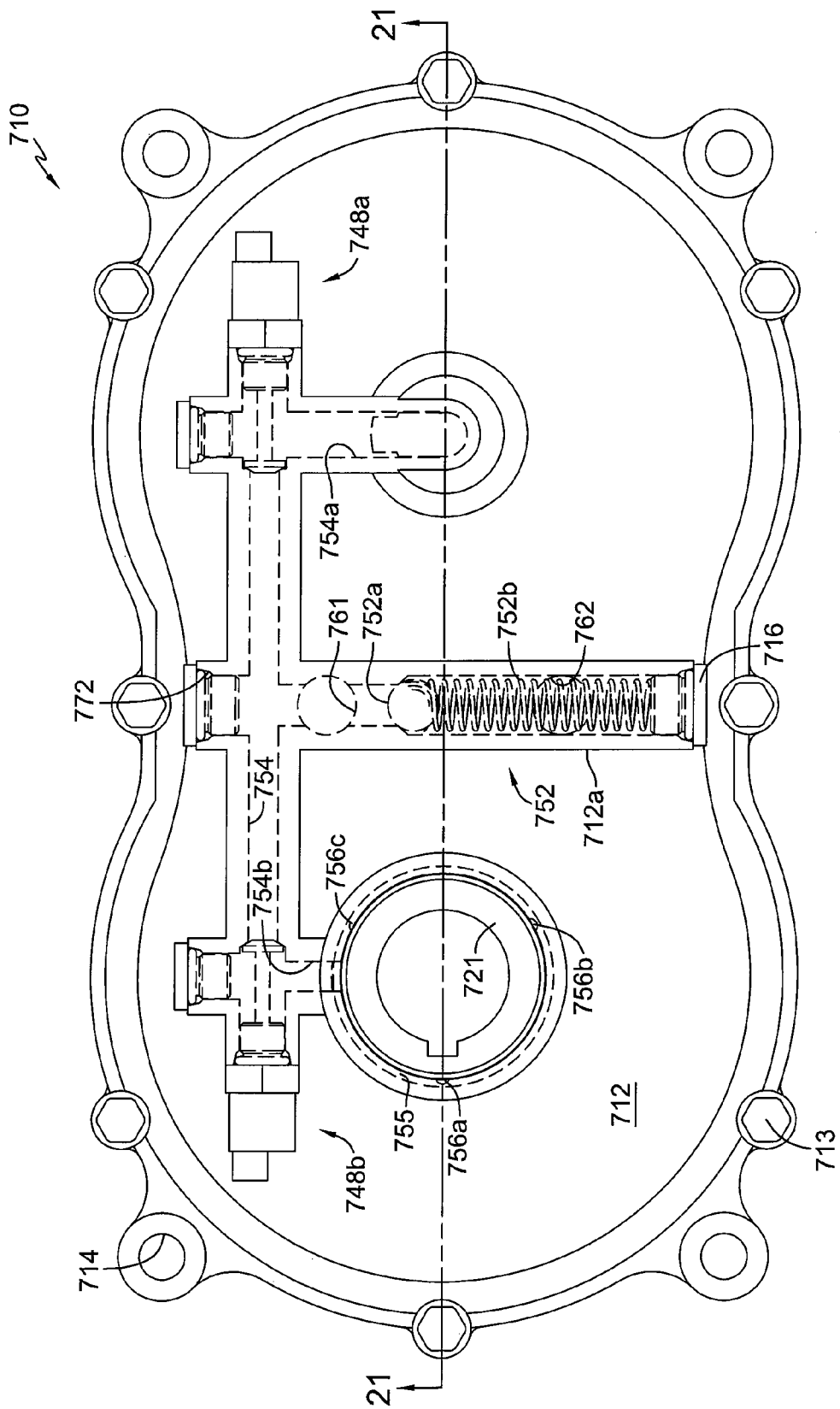
FIG. 20 is a top view of the central gear box of FIG. 19 with various elements of the charge gallery and accumulator visible.

FIG. 18 illustrates a seventh embodiment of a modular drive system 700 where a hydraulic clutch assembly 740a is disposed on jack shaft 724 to selectively drive distribution gear set 730, while a hydraulic power take off clutch and brake assembly 740b is disposed on input shaft 721 in a manner similar to that shown in FIG. 3. A gear pump 750 comprising transmission gears 722 and 723 is driven by input shaft 721 and provides pressurized hydraulic fluid to a charge gallery 754 (as best shown in FIG. 20) that serves to supply hydraulic fluid to actuate clutch assembly 740a and clutch and brake assembly 740b. A pair of clutch actuation valves 748a and 748b permit an operator to individually control both clutch assemblies. An intermediate shaft 704 is engaged to and selectively driven by cage 741a upon actuation of clutch 740a. Intermediate shaft 704 is further engaged to and drives bevel gear 731 which drives corresponding bevel gear 732. The latter gear is engaged to and drives central output shaft 733 to power left and right side drive mechanisms 780 and 790.

Figure 19:
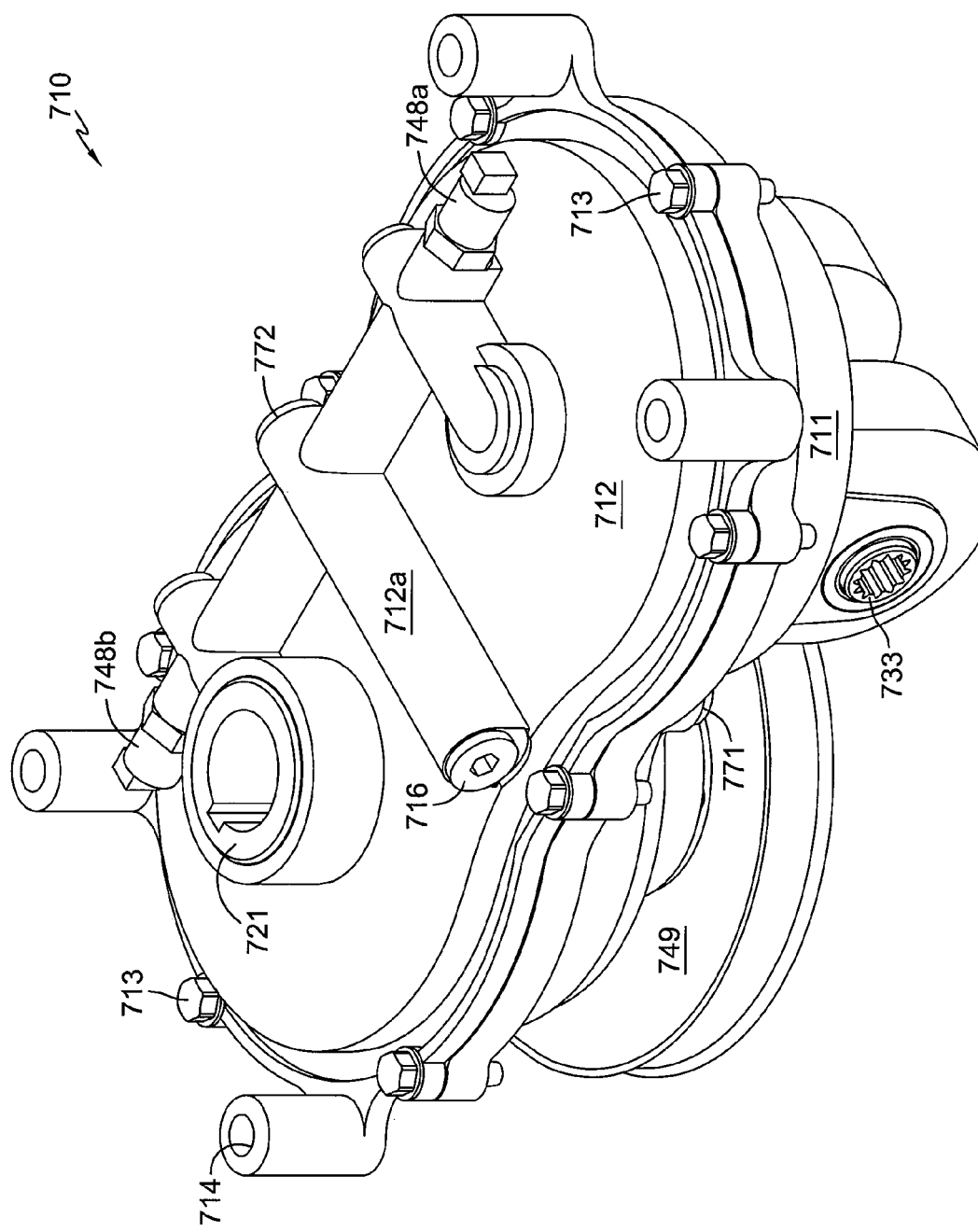
FIG. 19 is an isometric view of a representative central gear box in accordance with the teachings of FIG. 18.
Figure 21:
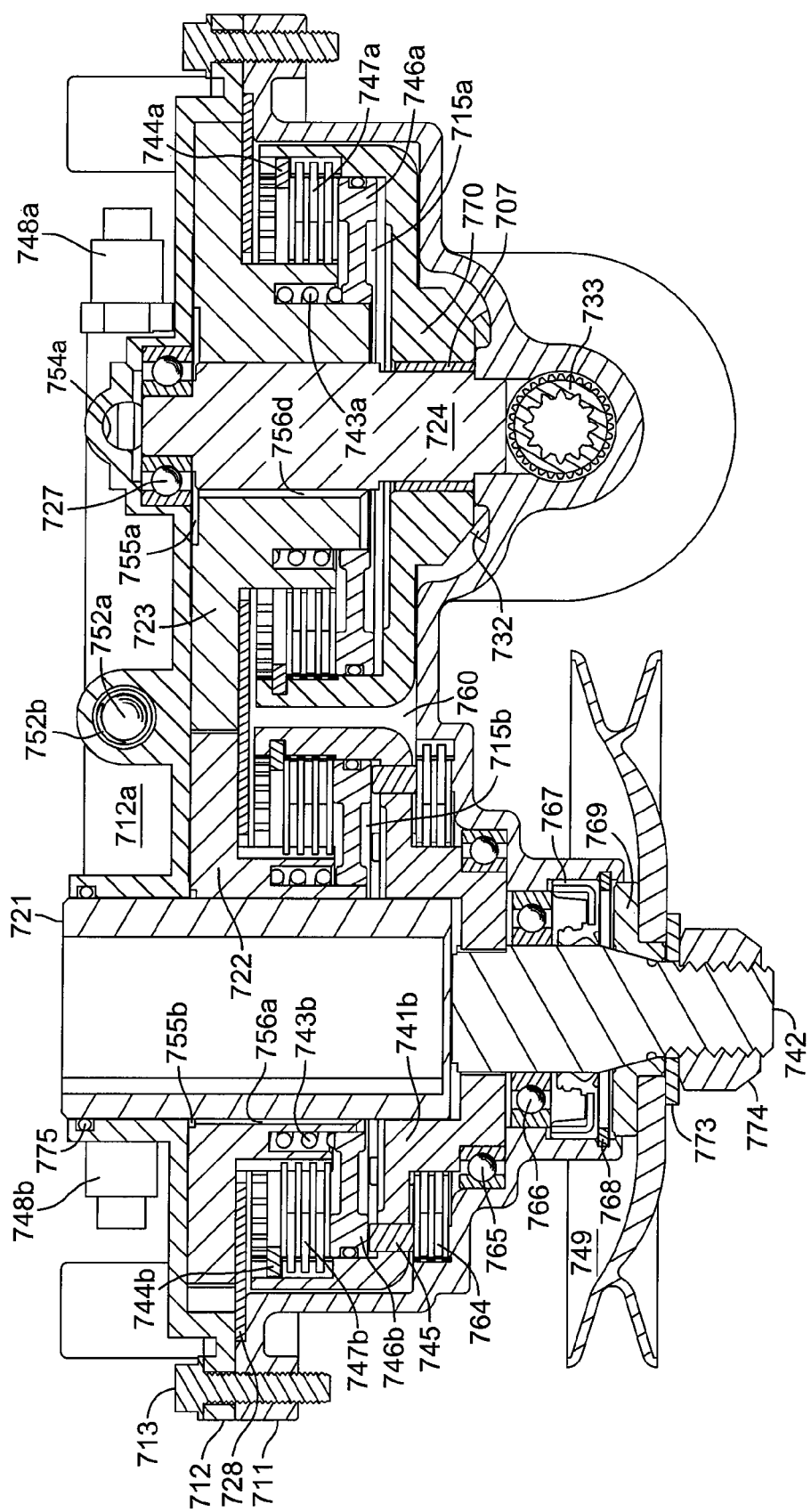
FIG. 21 is a section view of the central gear box of FIG. 20 along the lines 21-21.

FIGS. 19, 20 and 21 depict a representative central gear box 710 in accordance with the principles of the invention outlined above in the description of the embodiment of FIG. 18. Gear box housing 711 contains the central drive train and power take off mechanism. Representative central gear box 710 varies slightly from the depiction of the seventh embodiment in FIG. 18 in that cage 741a, intermediate shaft 704, and bevel gear 731 are combined as a single element, combination gear/cage 770 to conserve space and material.

FIG. 20 best illustrates the details of the internal volume of housing cover 712, and the functionality of components disposed therein. Housing cover 712 is also formed with a feature 712a containing an internal volume which accommodates the charge gallery 754, relief valve 752, both clutch actuation valves 748a and 748b and corresponding fluid passages 754a and 754b to accommodate fluid flow to the respective clutches 740a, 740b. As described for the gear pump 350 of central gear box 310, gear pump 750 acts via the pumping action of transmission gears 722 and 723, which run in tight tolerance against a charge plate 728 and gear box housing cover 712. Pressurized fluid from gear pump 750 enters charge gallery 754 through passage 761.

Valves 748a, 748b are depicted herein as electro-mechanical solenoid valves under operator control and are similar in construction to the valves described in connection with other embodiments. Valves 748a, 748b permit pressurized hydraulic fluid from charge gallery 754 to actuate respective hydraulic clutch assemblies 740a and 740b when opened.

The operation of the clutch and brake assembly 740b will be discussed first; this assembly is similar in operation to the equivalent assembly 340 discussed above. Actuation of valve 748b permits pressurized hydraulic fluid to occupy the annular space 755b about input shaft 721. As shown in FIGS. 20 and 21, vertical passages 756a-c adjacent input shaft 721 communicate with annular space 755b to provide pressurized hydraulic fluid to volume 715b below piston 746b. In the absence of pressurized fluid, clutch spring 743b acts against piston 746b which is forced into contact with a plurality of pins 745, which thereby compress brake disks 764 into frictional engagement with each other, arresting any rotation of cage 741b and the affixed power take off output shaft 742. One set of the brake disks 764 is fixed to gear box housing 711, and the intervening set of brake disks 764 is fixed to cage 741b by a gear form native to cage 741b. As pressurized fluid fills volume 715b, piston 746b acts against and overcomes the spring force of clutch spring 743b. Consequently, pins 745 no longer act to compress brake disks 764 into frictional engagement, permitting cage 741b and power take off output shaft 742 to rotate freely. As pressurized fluid continues to fill volume 715b, piston 746b begins to act against clutch plates 747b, compressing the clutch plates 747b into frictional engagement. One set of the clutch plates 747b is captured by a gear form native to cage 741, while the intervening set of clutch plates 747b is captured by a gear form native to transmission gear 722. The movement of the clutch plates 747b are restricted vertically by retaining ring 744b, permitting frictional engagement to occur. As the engagement of the clutch plates 747b reaches maximum effect, with transmission gear 722 being splined to input shaft 721, the rotation of input shaft 721 is imparted to cage 741b and power take off output shaft 742 which is splined thereto. The rotation of cage 741b is supported by bearing 765, and the rotation of output shaft 742 is supported by bearing 766. Hydraulic fluid is retained by a seal 767 and retaining ring 768 about output shaft 742. To produce useful work, a pulley 749 may be affixed to output shaft 742 through means of a hub 769, washer 773, and hub nut 774. When valve 748b is closed, the flow of pressurized hydraulic fluid to the clutch is curtailed and the fluid accumulated in volume 715b returns to sump 760 through various spaces associated with component tolerances. As a result, the brake arrests movement of cage 741b and output shaft 742 as described above.

Next, a description will be given of clutch assembly 740a mounted on jack shaft 724 and controlled by clutch actuation valve 748a. Clutch assembly 740a operates as described for the clutch portion of clutch and brake assembly 740b with two exceptions. First, when clutch actuation valve 748a is opened, pressurized hydraulic fluid flows into passage 754a and then through the support bearing 727 for the jack shaft 724 before entering annular space 755a. (Jack shaft 724 is rotationally supported at a second end by a bushing or bearing 707.) The hydraulic fluid is then distributed to the volume 715a below piston 746a by way of three vertical passages 756d (one of three shown) adjacent jack shaft 724. The flow of pressurized hydraulic fluid to volume 715a counteracts the spring force of clutch spring 743a to force piston 746a against a plurality of clutch plates 747a. The frictional engagement of the clutch plates 747a thereby attained places combination gear/cage 770 into synchronous rotation with transmission gear 723 and jack shaft 724. Bevel gear 732, which is rotationally mated to combination gear/cage 770, then drives central output shaft 733. The second difference between clutch assembly 740a and clutch and brake assembly 740b is realized by the absence of a brake on the output of clutch assembly 740a, wherein clutch spring 743a merely biases the clutch to a non-engaged state as its action on piston 746a does not result in frictional engagement of brake disks via pin displacement. When valve 748a is closed, the flow of pressurized hydraulic fluid to the clutch is curtailed and the fluid accumulated in volume 715a returns to sump 760 through various spaces associated with component tolerances. As a result, the powered rotation of central output shaft 733 is ceased.

FIGS. 22-27 illustrate another central gear box 810 in accordance with the principles of the invention; most similar to, but differing from the central gear box 410 of FIG. 8. The major differences comprise a bolt-on charge pump 859 at the end of jack shaft 824 opposite housing cover 812, rather than a charge pump set within the housing cover 812. The vertical input shaft 821 is a through-shaft design that allows the central gear box 810 to be mounted with either end of the through-shaft oriented in an upward direction. This permits flexibility in the height at which pulley 849 is utilized. The differences further comprise an electro-mechanical valve 848, illustrated here as a solenoid valve, normally open to sump 860 to discharge accumulated hydraulic fluid from the charge gallery 854, the accumulator 851, and the brake and clutch assembly 840. Electro-mechanical valve 848 is closed to actuate the clutch. Additionally, the charge gallery 854 is internal to the gear box housing 811, and not a formed feature of the housing cover 812. Central gear box 810 also has a distribution gear set 830 similar to the teachings of FIG. 12, wherein two oppositely rotating central output shafts 833a and 833b are present. Lastly, central gear box 810 comprises a screw-on filter 853 and associated passageways to remove debris from the hydraulic fluid of sump 860. The details of central gear box 810 will be discussed below.

Figure 22:
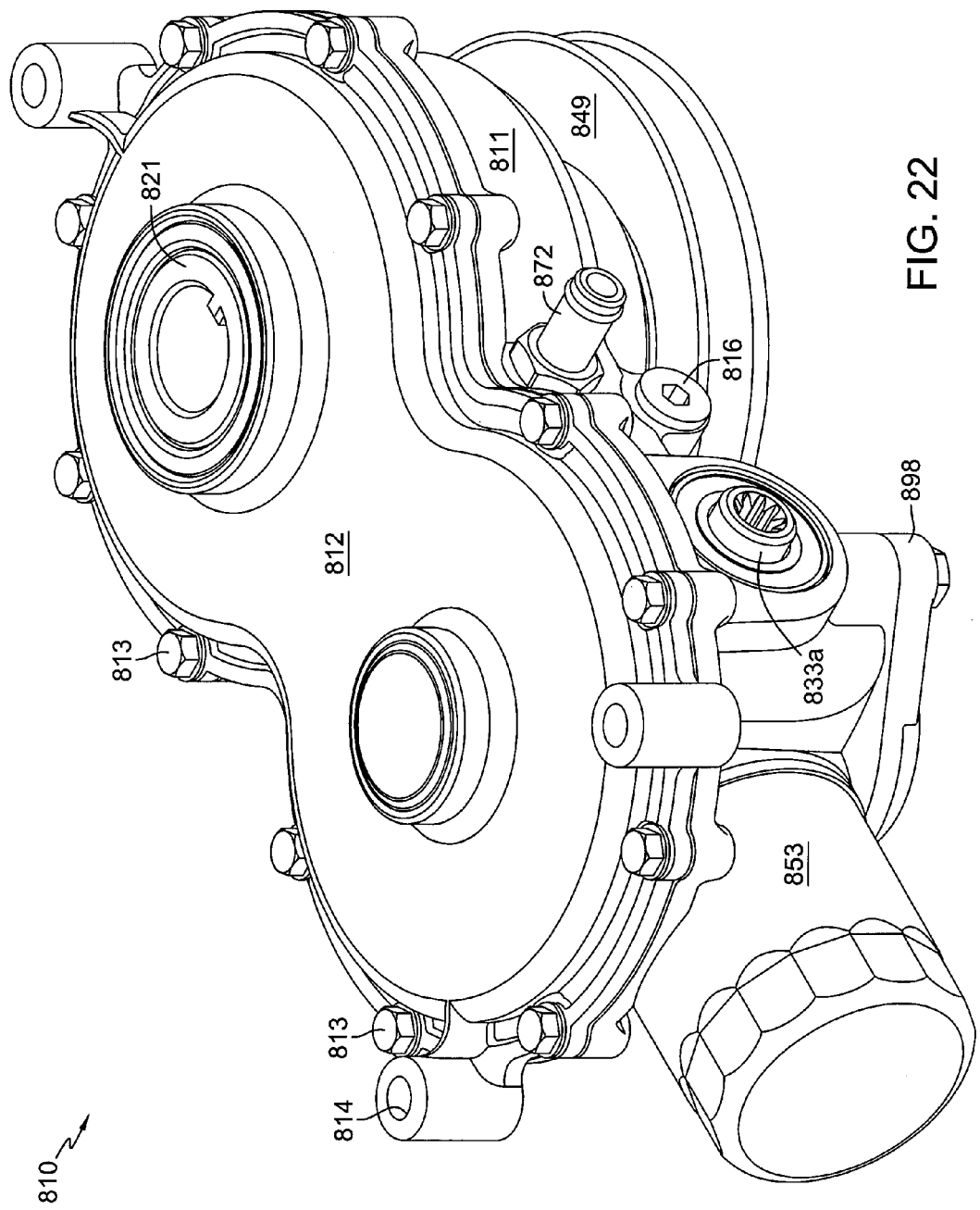
FIG. 22 is an isometric view of another representative central gear box in accordance with the principles of the invention.
Figure 23:
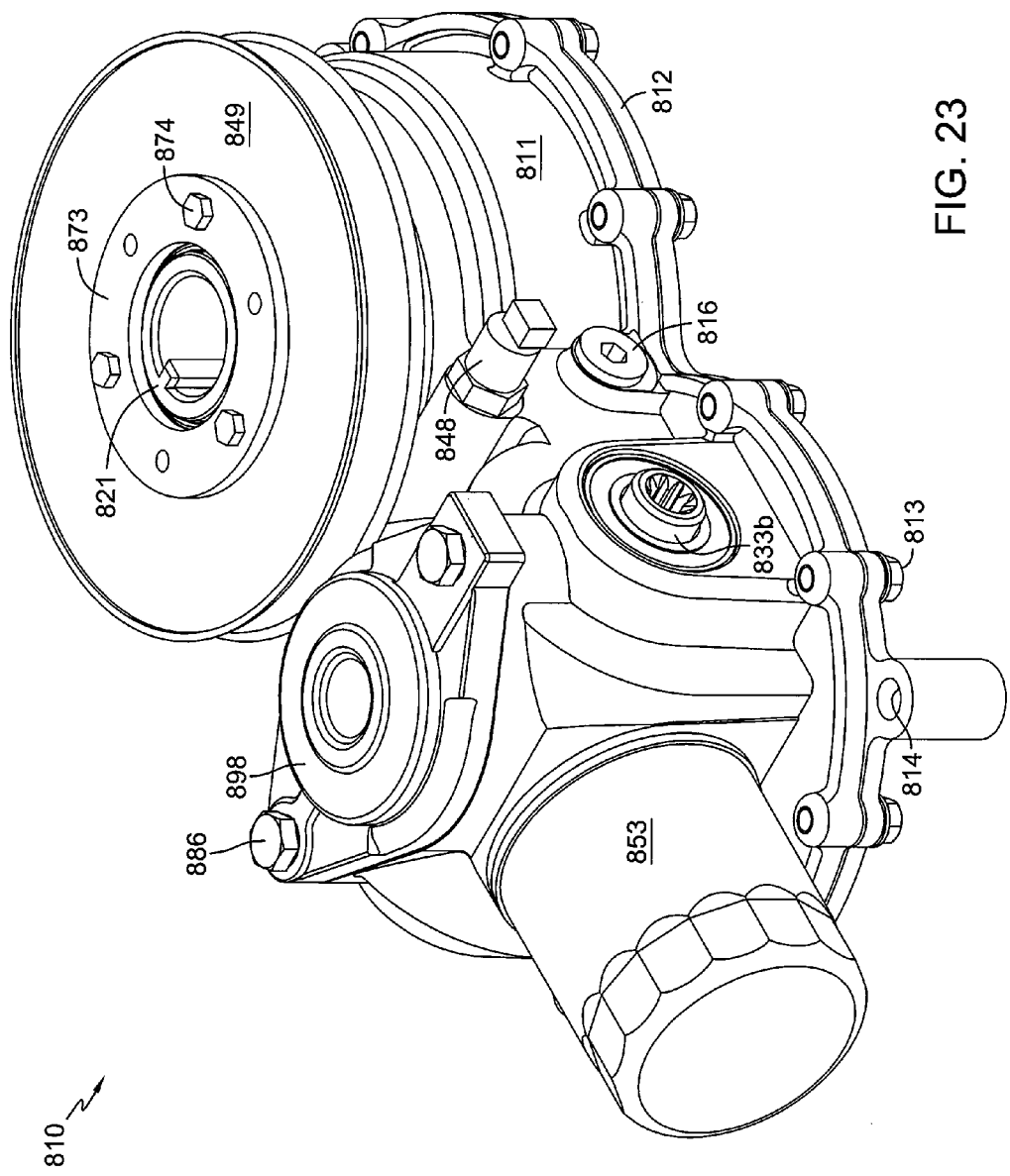
FIG. 23 is an isometric view of the central gear box of FIG. 22 rotated one hundred-eighty degrees about the axis of screw-on filter 853.
Figure 24:
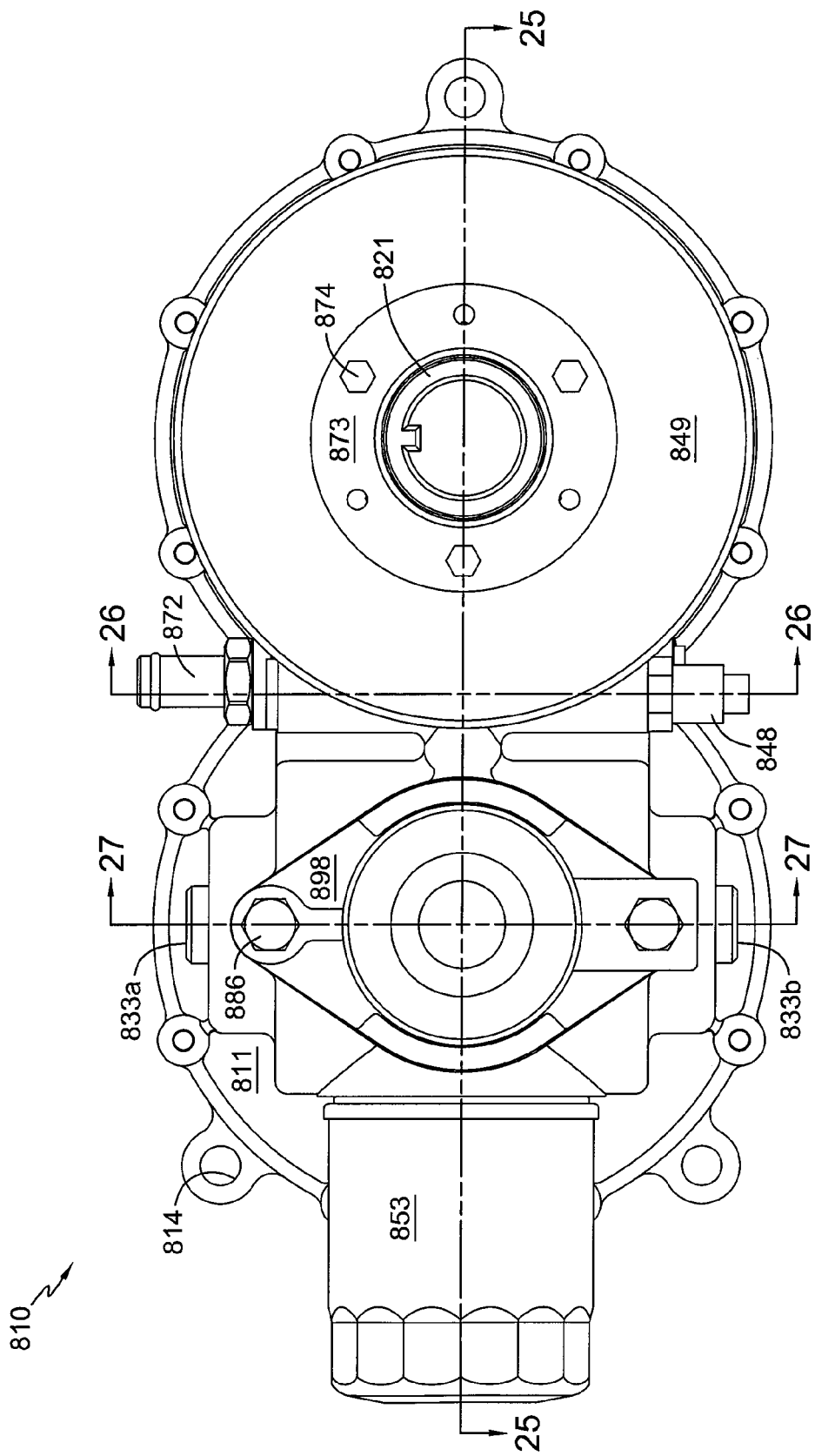
FIG. 24 is a bottom view of the central gear box of FIG. 22.
Figure 26:
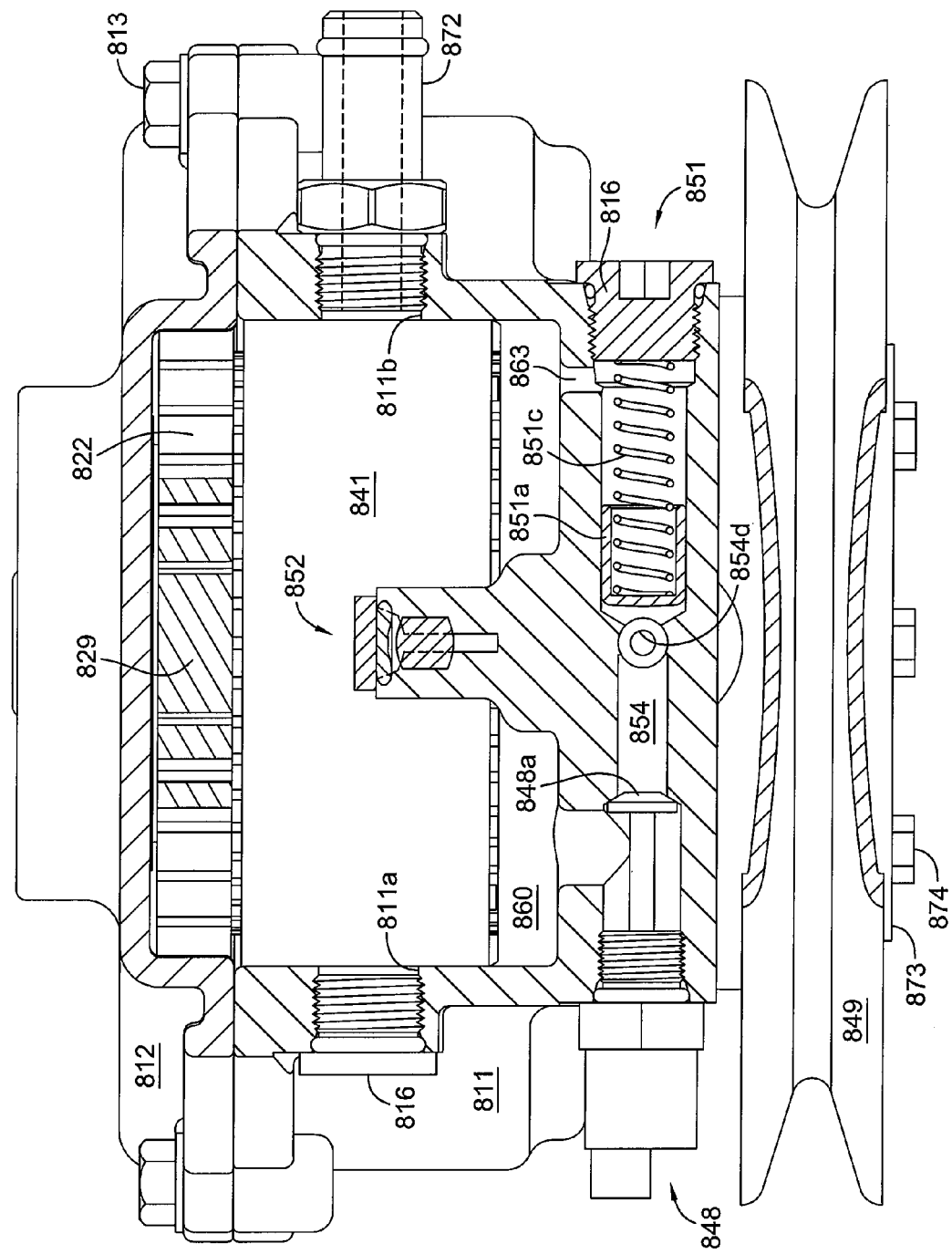
FIG. 26 is a partial section view of the central gear box of FIG. 24 along the lines 26-26 rotated 90° counterclockwise with some elements shown whole for clarity.

FIG. 22 shows central gear box 810 in a first orientation with pulley 849 below the unit. Gear box housing cover 812 is sealingly engaged to gear box housing 811 by a plurality of fasteners 813 to form sump 860. Housing cover 812 is formed with a plurality of bosses 814 by which central gear box 810 may be fastened to a vehicle frame. The width of charge pump housing 898 and the lower portion of gear box housing 811 to which it is fastened by a pair of fasteners 886 (as best shown in FIG. 23) is narrow enough to permit a v-belt (not shown) utilized by pulley 849 to freely pass adjacent to housing 811. Such a belt provides motive force to an implement such as a mowing deck (not shown) when the power take off mechanism is engaged. Screw-on filter 853, which threads onto the intake port 818 for charge pump 859 extending through an opening 811c in the side of gear box housing 811, is readily accessible for service by an operator. The screw-on filter 853 seals to housing 811 in a conventional manner. An expansion tube 872 threads to a port 811b on gear box housing 811 (as best shown in FIG. 26) that permits a hose (not shown) to place sump 860 in fluid communication with an expansion tank (not shown). Expansion tube 872 may alternatively be threaded to the opposite side of gear box housing 811 at port 811a (shown sealed with a plug 816 in FIG. 23).

FIG. 23 shows central gear box 810 in a second, inverted orientation with pulley 849 placed above the unit and the other end of through-shaft 821 clearly visible. A circular retaining plate 873 is secured by fasteners 874 to the cage 841 of the brake and clutch assembly 840, affixing the pulley 849 to the cage 841 and retaining a shaft seal 875b (as best shown in FIG. 25).

Figure 25:
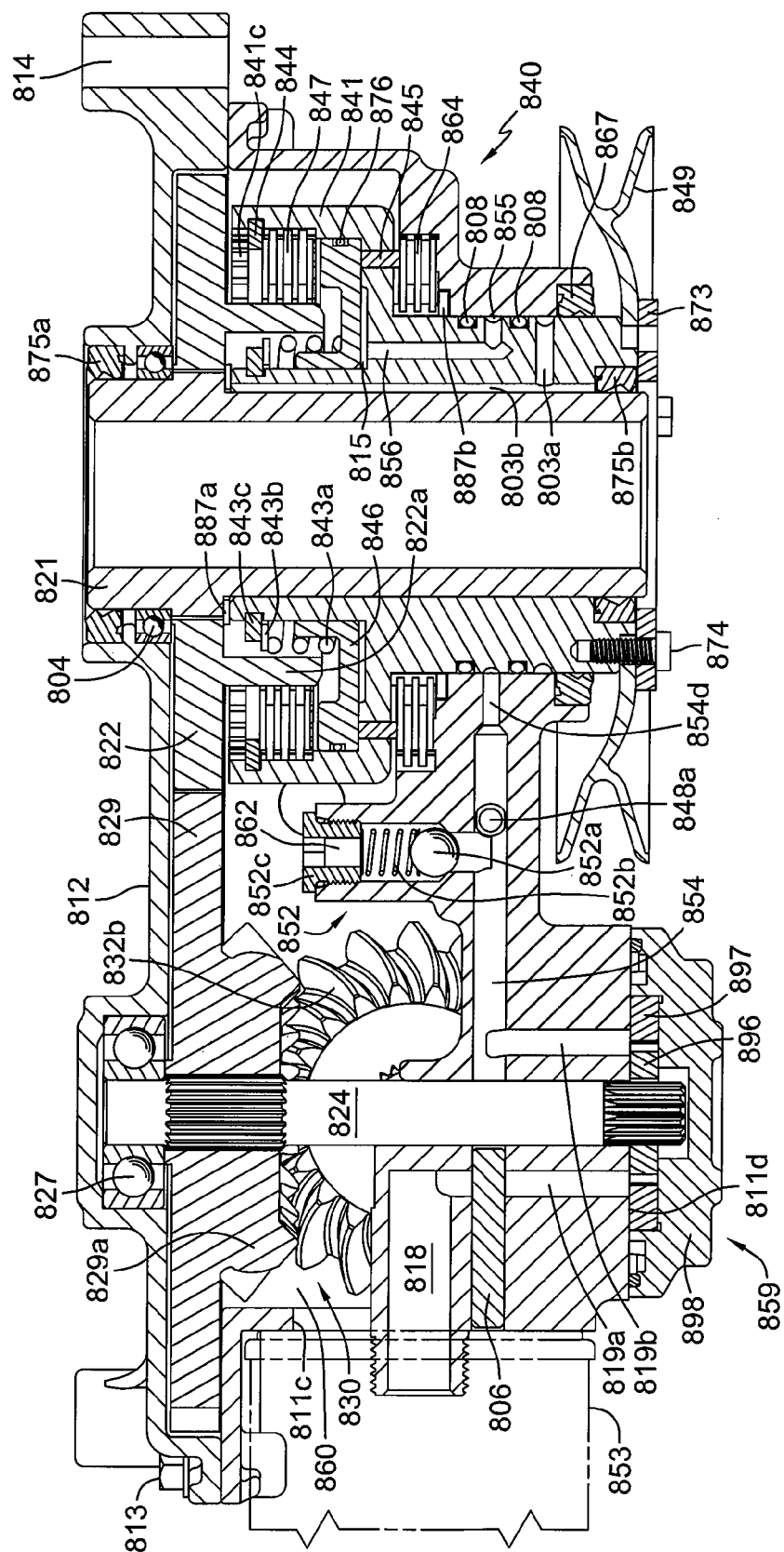
FIG. 25 is a partial section view of the central gear box of FIG. 24 along the lines 25-25 with some elements shown whole for clarity.

FIGS. 25 and 26 are useful in describing the functional differences between gear box 810 and previous embodiments. Input shaft 821 is driven by the output shaft of a prime mover (not shown), and in turn powers transmission gear 822, which is fixed to input shaft 821 by corresponding gear forms. Input shaft 821 is rotationally supported by bearing 804, shaft seal 875a seals the opening for input shaft 821 in housing cover 812, and thrust washer 887a supports input shaft 821. Transmission gear 822 drives combination gear 829, which is splined to jack shaft 824 at its proximal end. Jack shaft 824 is rotationally supported by bearing 827. The rotation imparted to jack shaft 824 is transferred to the inner rotor 896 of gerotor style charge pump 859 to which jack shaft 824 is engaged at its distal end. The pumping action of inner rotor 896 and corresponding outer rotor 897 draws hydraulic fluid from sump 860 through opening 811c and into screw-on filter 853. After passing through the various filter elements (not shown) of screw-on filter 853, hydraulic fluid enters intake port 818 and is finally drawn into charge pump 859 via kidney-shaped port 819a. The running surface 811d for inner rotor 896 and outer rotor 897 is integral to an exterior face of gear box housing 811. Pressurized hydraulic fluid exits charge pump 859 through the corresponding kidney shaped exhaust port 819b, and thereafter travels to a charge gallery 854 in fluid communication with an accumulator 851, a relief valve 852, and a clutch actuation valve 848.

Valve body 848a is normally unseated or open, permitting hydraulic fluid from the charge gallery 854 and accumulator 851 to be recirculated by charge pump 859 through sump 860 and ultimately, filter 853, wherein fine metal debris from the gear train or other contaminants may be trapped to extend the service life of key components. When valve 848 is actuated, valve body 848a is seated against the periphery of charge gallery 854, closing off the recirculation of hydraulic fluid back to sump 860. Instead, pressurized hydraulic fluid begins to accumulate in charge gallery 854, accumulator 851, and the clutch assembly 840. Accumulator 851 acts as a source of backup power for clutch assembly 840 and also dampens the action of clutch assembly 840, reducing wear on its components and those mechanically driven by the power take off assembly. Accumulator 851 consists of a piston 851a having a tight tolerance with the accumulator bore and a spring 851c retained by a plug 816. The accumulator has an equilibration passage 863 for entrained air or hydraulic fluid to prevent the piston from seizing.

Brake and clutch assembly 840 has features similar to previous embodiments described herein, including an annular passageway 855 in cage 841 that is fed by the charge gallery 854 at a narrowed portion 854d. As shown in FIG. 25, a plug 806 seals off the end of charge gallery 854 opposite narrowed portion 854d, the end being an artifact of the machining operations necessary to form charge gallery 854 and the narrowed portion 854d. Vertical passageway 856 permits hydraulic fluid from annular passageway 855 to enter the volume 815 below piston 846. O-ring 876 prevents hydraulic fluid bypassing piston 846. Any hydraulic fluid bypassing the o-ring 808 below annular passage 855 enters passageways 803a and 803b of cage 841, whereby lubrication is provided to the interface between input shaft 821 and cage 841. Seal 867 seals the opening for cage 841 in gear box housing 811. The operation of the brake and clutch assembly 840 is similar to the operation of its counterparts in the previously described third, fourth, sixth and seventh embodiments and will not be described in detail.

The spring force of clutch spring 843a, which is retained by a washer 843b and retaining ring 843c about cage 841, works against piston 846 and forces a plurality of pins 845 to act on brake disks 864, bringing the brake disks 864 into frictional engagement and arresting any rotational movement of cage 841 and the pulley 849 engaged thereto. Thrust washers 887a and 887b support any axial movement of cage 841. The accumulation of pressurized hydraulic fluid in volume 815 disengages the brake and engages the clutch of assembly 840. The spring force of clutch spring 843a is overcome by the opposing fluid force exerted on piston 846, whereby the plurality of pins 845 no longer hold the brake disks 864 in frictional engagement. Cage 841 and the engaged pulley 849 are now free to rotate in synchronization with input shaft 821 as the clutch plates 847 come into frictional engagement by action of the fluid force applied through piston 846. Retaining ring 844 serves as a stop for the clutch plates 847 to enable their engagement.

As fluid pressure continues to build with the clutch engaged, charge relief valve 852 will crack at a predetermined pressure to protect the various seals and o-rings associated with the input shaft 821 and cage 841. While shown as a simple ball 852a and spring 852b valve retained by a plug 852c having an integral relief passage 862, relief valve 852 can be of any known design in the art, such as a poppet valve.

As outlined herein, rotational support for the various shafts and cages of central gear box 810 and hydraulic seals and o-rings for the various components are similar to the scheme previously described for the third and fourth embodiments.

Figure 27:
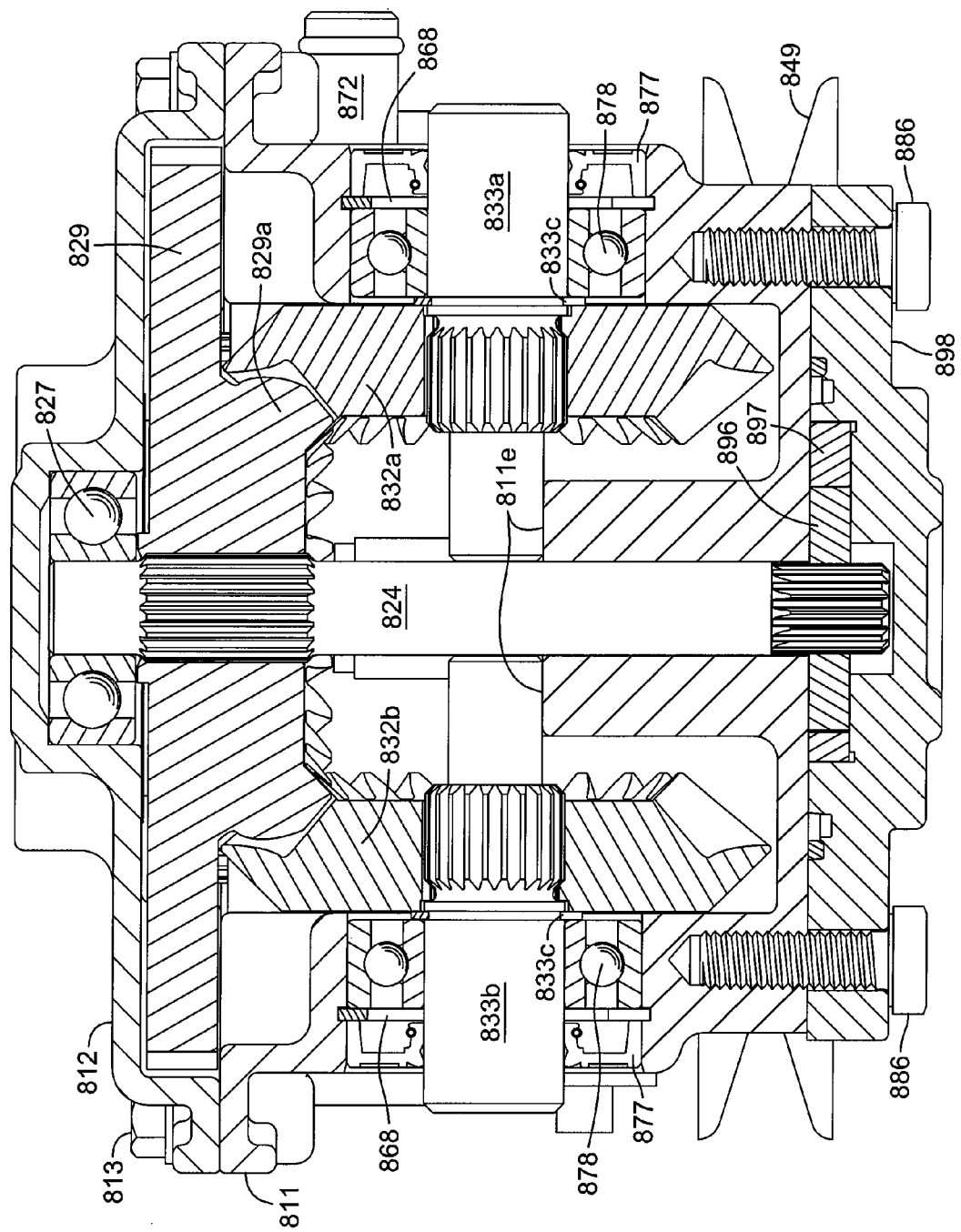
FIG. 27 is a partial section view of the central gear box of FIG. 24 along the lines 27-27 rotated 90° counterclockwise with some elements shown whole for clarity.

FIGS. 25 and 27 best illustrate the distribution gear set 830. Combination gear 829 is engaged to and driven by the rotation of transmission gear 822, which is splined to input shaft 821. Combination gear 829 has a secondary gear form 829a that engages and drives a pair of distribution gears 832a and 832b. Though depicted as spiral bevel gears with the attendant benefits of noise reduction and higher speed capacity, secondary gear form 829a and distribution gears 832a and 832b could also be generic bevel gears. Each of the distribution gears 832a and 832b are splined to independent output shafts 833a and 833b respectively. The output shafts 833a and 833b are rotationally supported at a first end by a bearing 878 retained in a pocket of the gear box housing 811 (retained therein by a retaining ring 868), and rotationally supported at a second end by cradles 811e formed in the gear box housing 811. Both output shafts 833a and 833b are retained axially by retaining rings 833c to prevent contact with jack shaft 824, and are sealed by a shaft seals 877 at their exterior ends. As noted previously, the output shafts 833a and 833b rotate in opposite directions, permitting the use of identical left and right side drive mechanisms.

Figure 28:
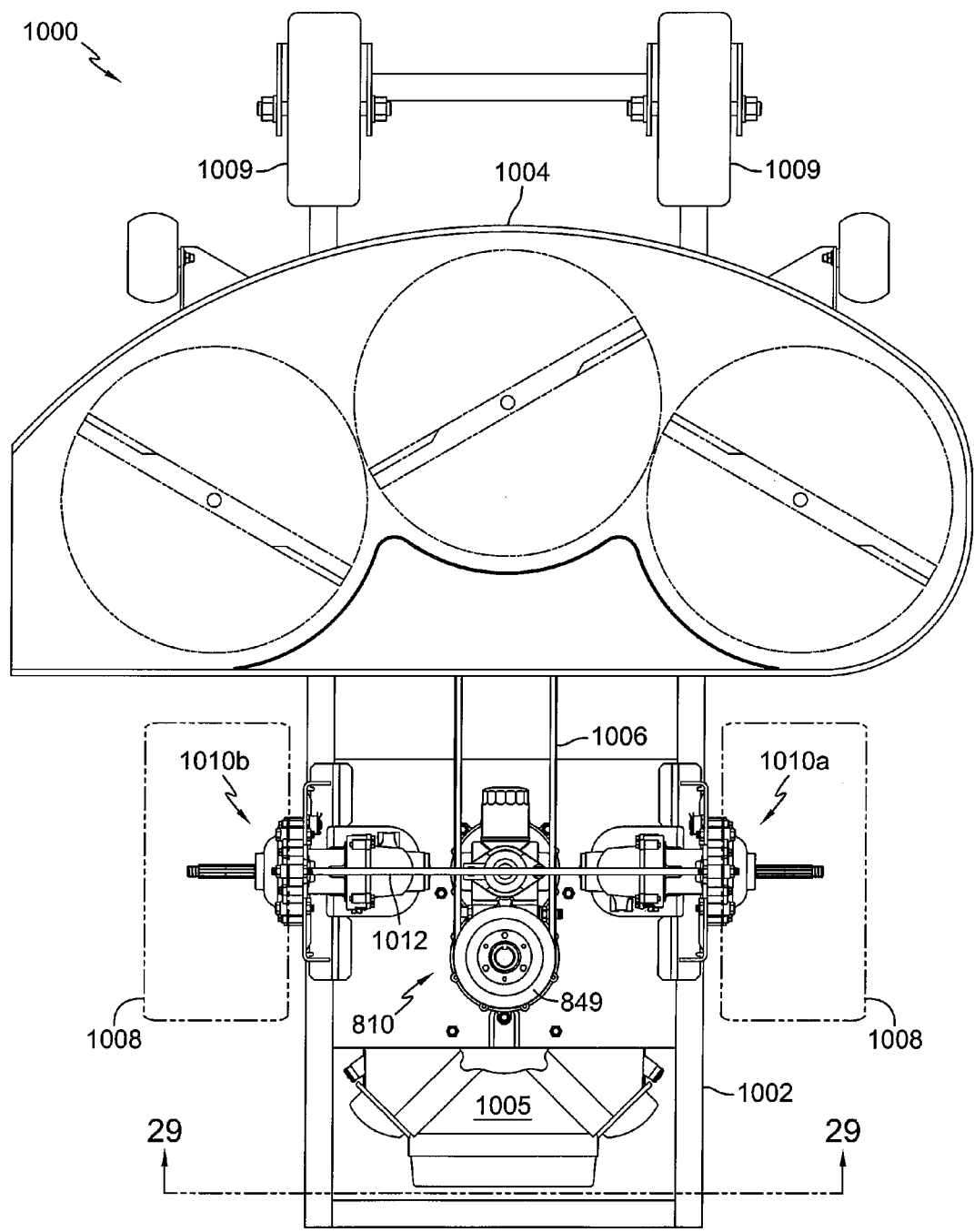
FIG. 28 is a bottom view of a vehicle integrating a representative modular drive system, shown here with the central gear box of FIGS. 22-27 and left and right side drive mechanisms similar to the hydrostatic transaxles of FIGS. 30-32.

FIG. 28 depicts the underside of a ZT vehicle 1000 integrating the central gear box 810 of FIGS. 22-27 and left and right side transaxles 1010a and 1010b, in this instance hydrostatic transaxles, which will be described in more detail below. It should be noted that transaxles 1010a and 1010b are just one example of "plug and play" drive mechanisms that integrate with central gear box 810 to form a modular drive system. Vehicle 1000 comprises engine/prime mover 1005 mounted on vehicle frame 1002. Deck drive belt 1006 couples the output pulley 849 of the power take off mechanism with mowing deck 1004. Front wheels 1009, typically caster wheels, are attached to vehicle frame 1002 in front of mowing deck 1004. Rear wheels 1008 are mounted to the left and right side transaxles 1010a and 1010b behind mowing deck 1004. In addition, cross brace 1012 is mounted between the housings of transaxles 1010a and 1010b to provide additional rigidity and limit driveline flexion.

Figure 29:
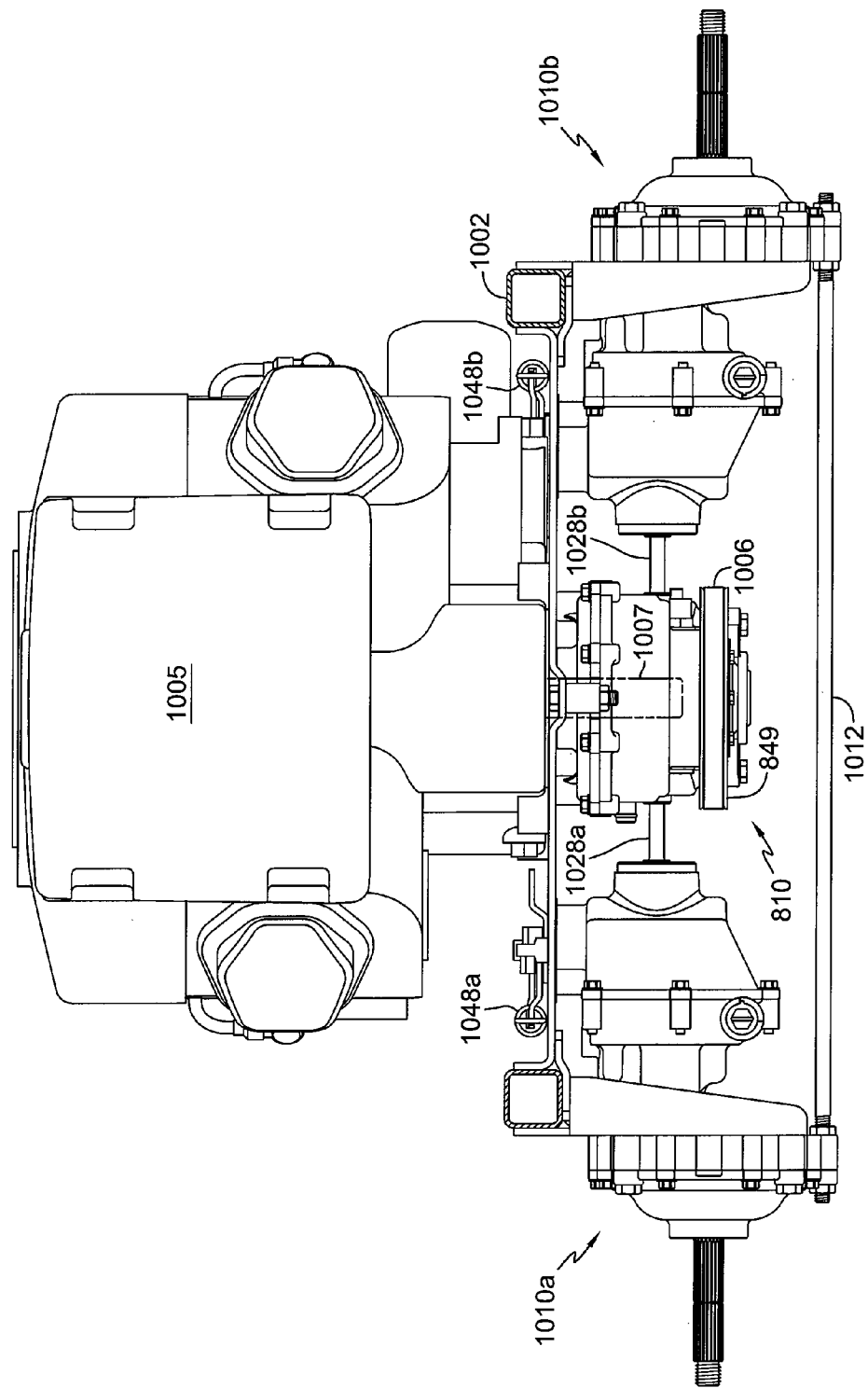
FIG. 29 is a rear elevation view of the vehicle of FIG. 28 (with its frame sectioned and elements removed for clarity).

FIG. 29 shows output shaft 1007 of engine/prime mover 1005 extending through vehicle frame 1002 to mate with the input shaft 821 (not shown) of gear box 810 and further shows input shafts 1028a and 1028b extending out of transaxles 1010a and 1010b, respectively. Return to neutral assemblies 1048a and 1048b are shown mounted on transaxles 1010a and 1010b and extending through vehicle frame 1002 for protection from ground debris.

Figure 30:
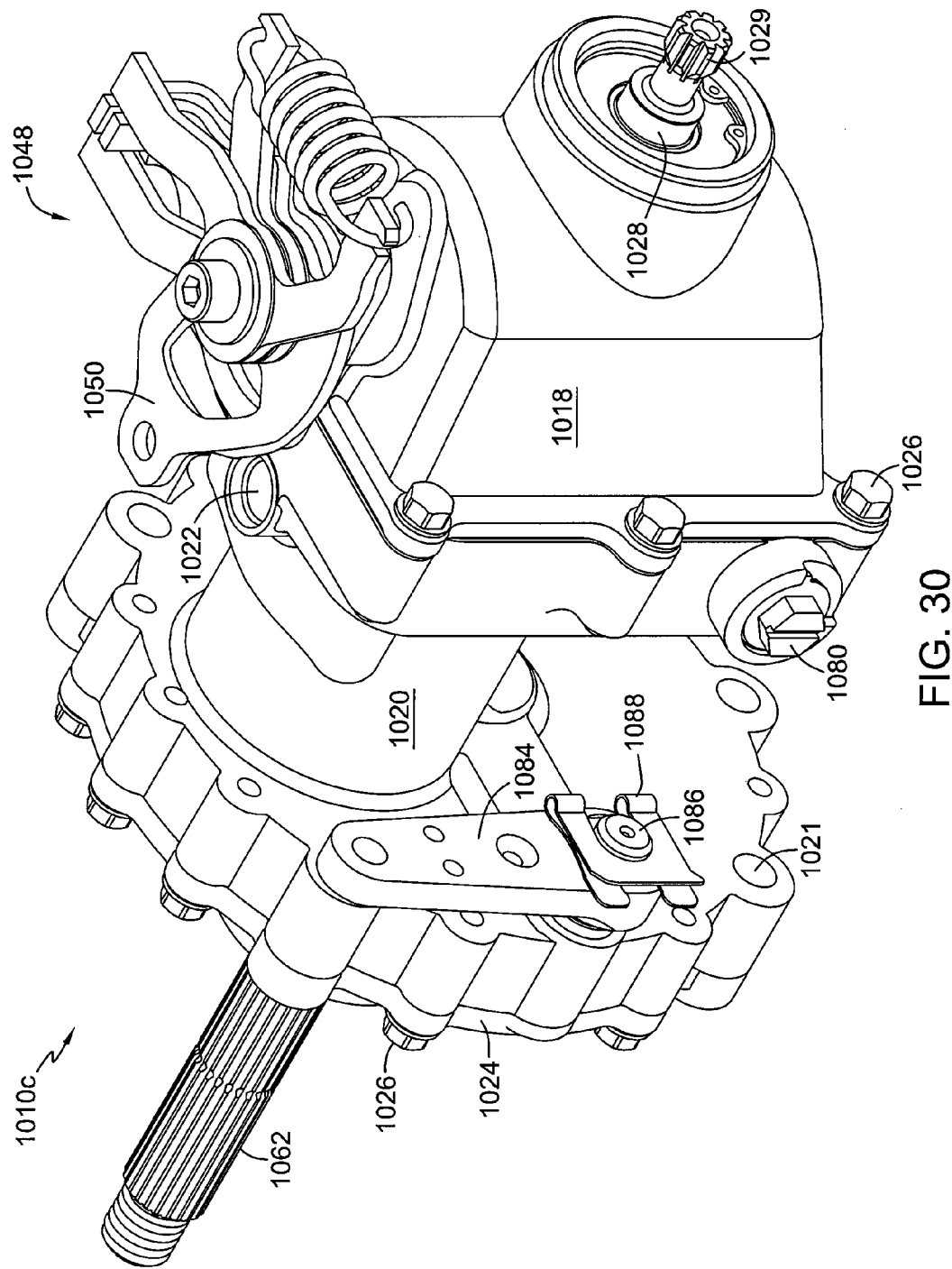
FIG. 30 is an isometric view of a hydrostatic transaxle similar to the right side drive mechanism of the representative modular drive system of FIGS. 28 and 29.
Figure 31:
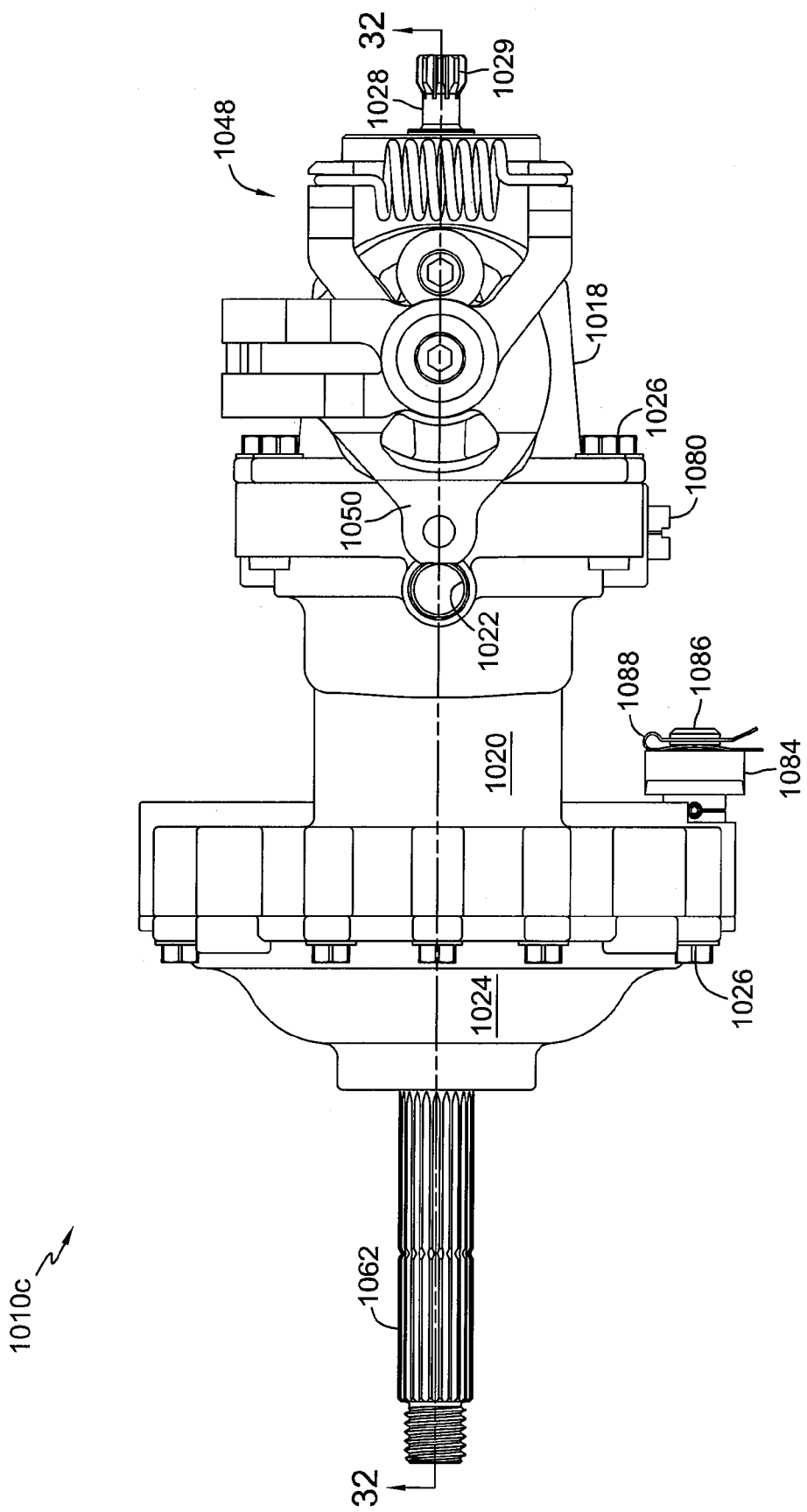
FIG. 31 is a top view of the hydrostatic transaxle of FIG. 30.
Figure 32:
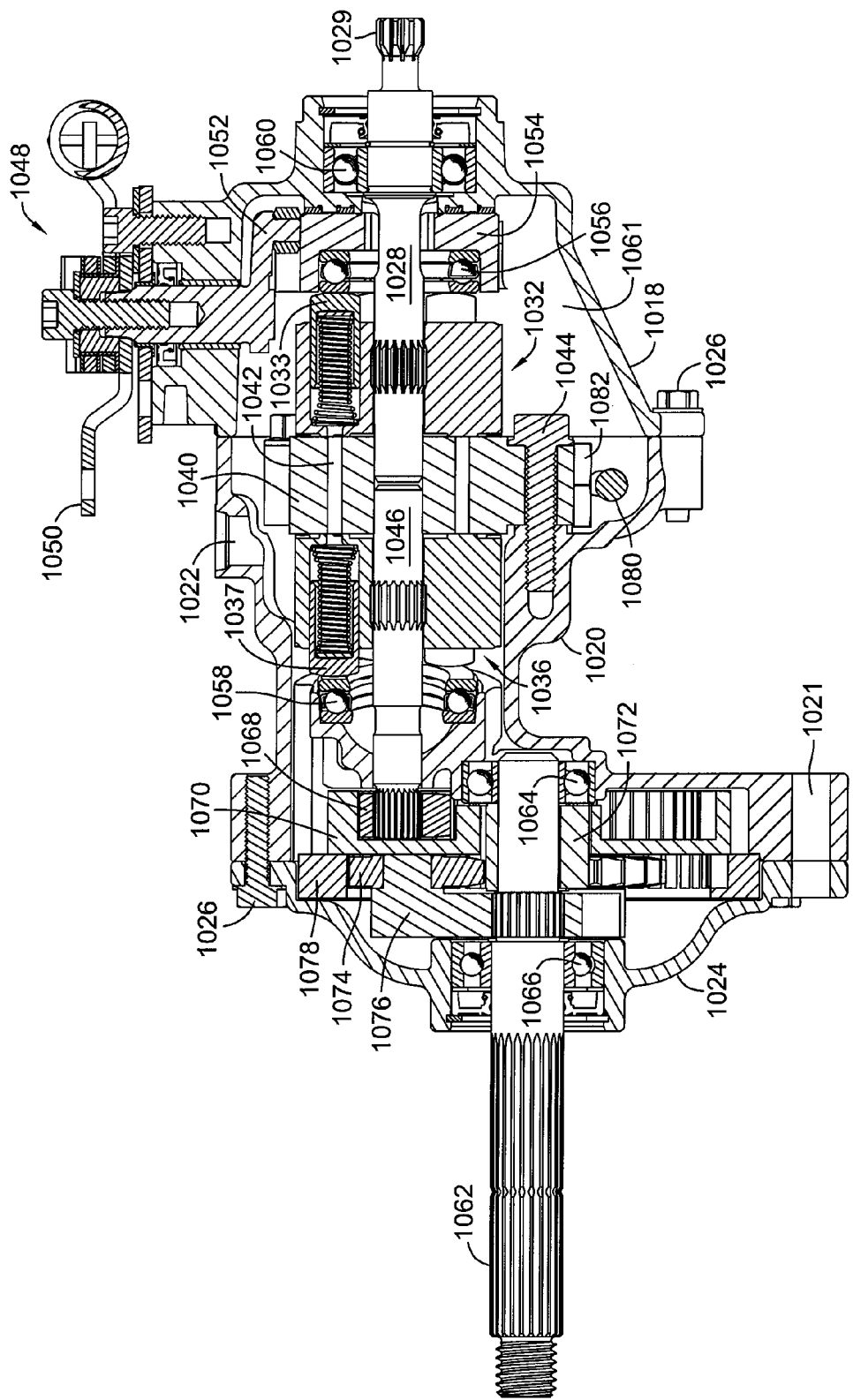
FIG. 32 is a partial section view of the hydrostatic transaxle of FIG. 31 along the lines 32-32 with some elements shown whole for clarity.
Figure 33:
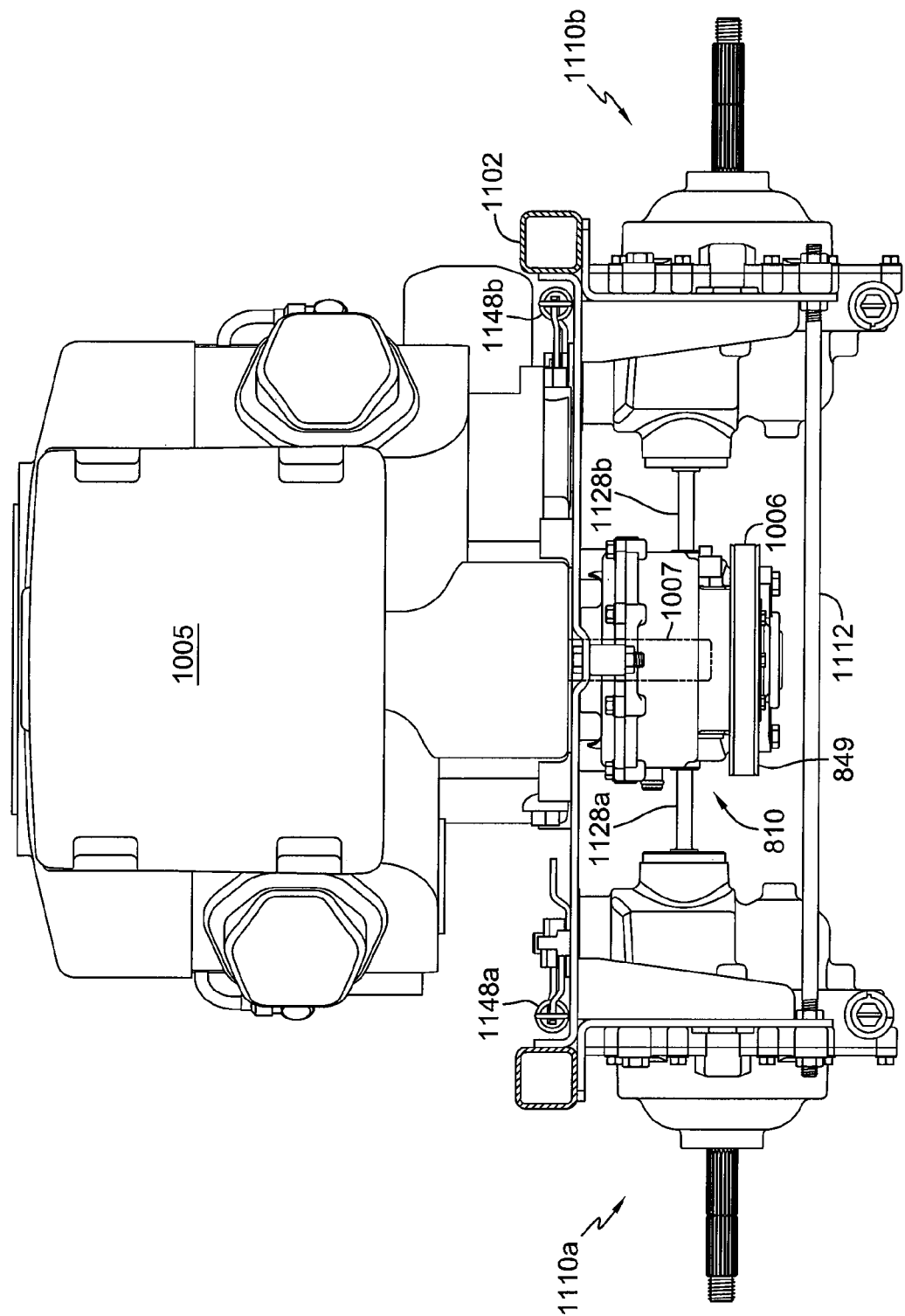
FIG. 33 is a rear elevation view of a vehicle integrating a representative modular drive system, shown here with the central gear box of FIGS. 22-27 and left and right side drive mechanisms similar to the hydrostatic transaxles of FIGS. 34-36.
Figure 34:
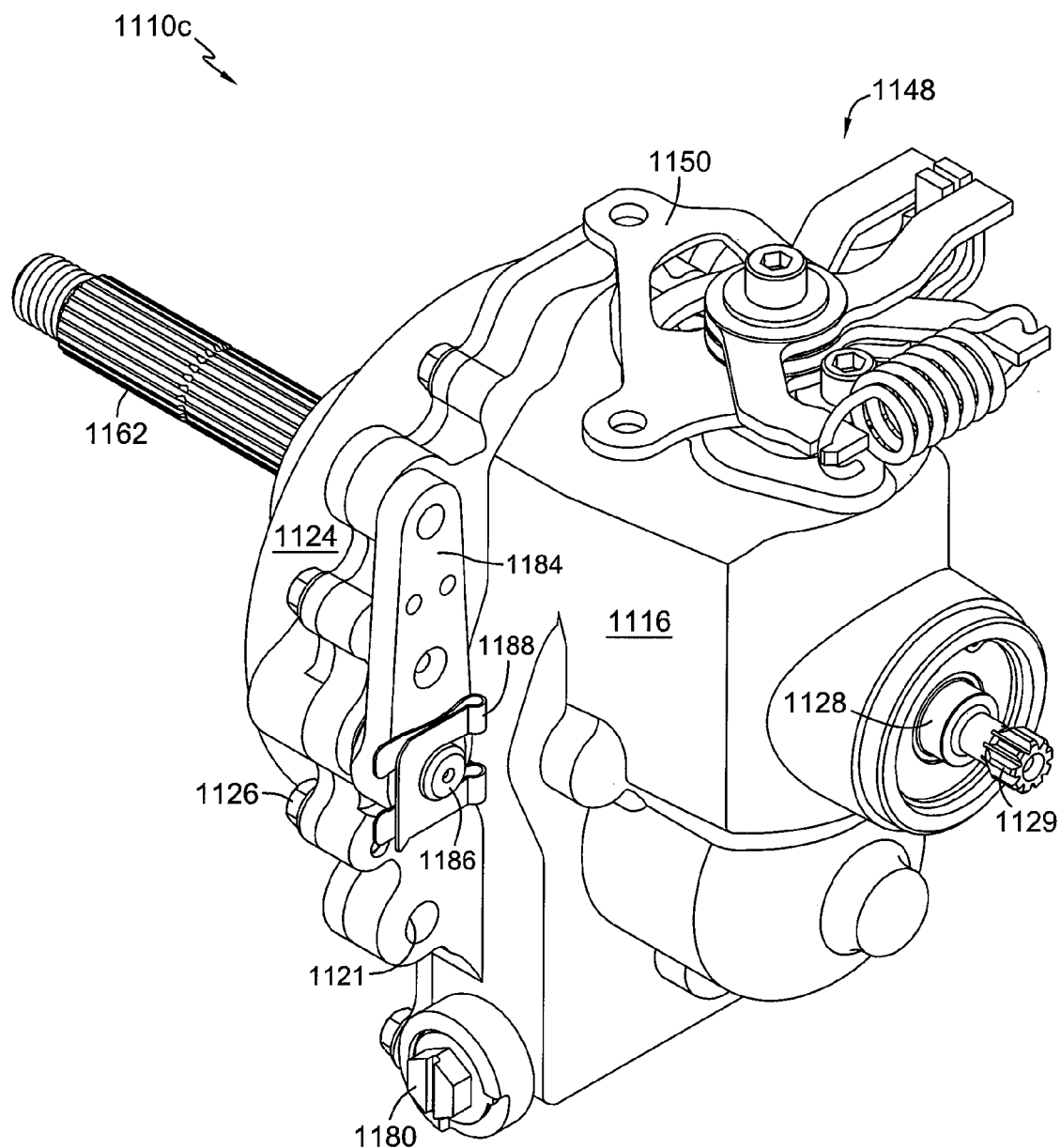
FIG. 34 is an isometric view of a hydrostatic transaxle similar to the right side drive mechanism of FIG. 33.
Figure 35:
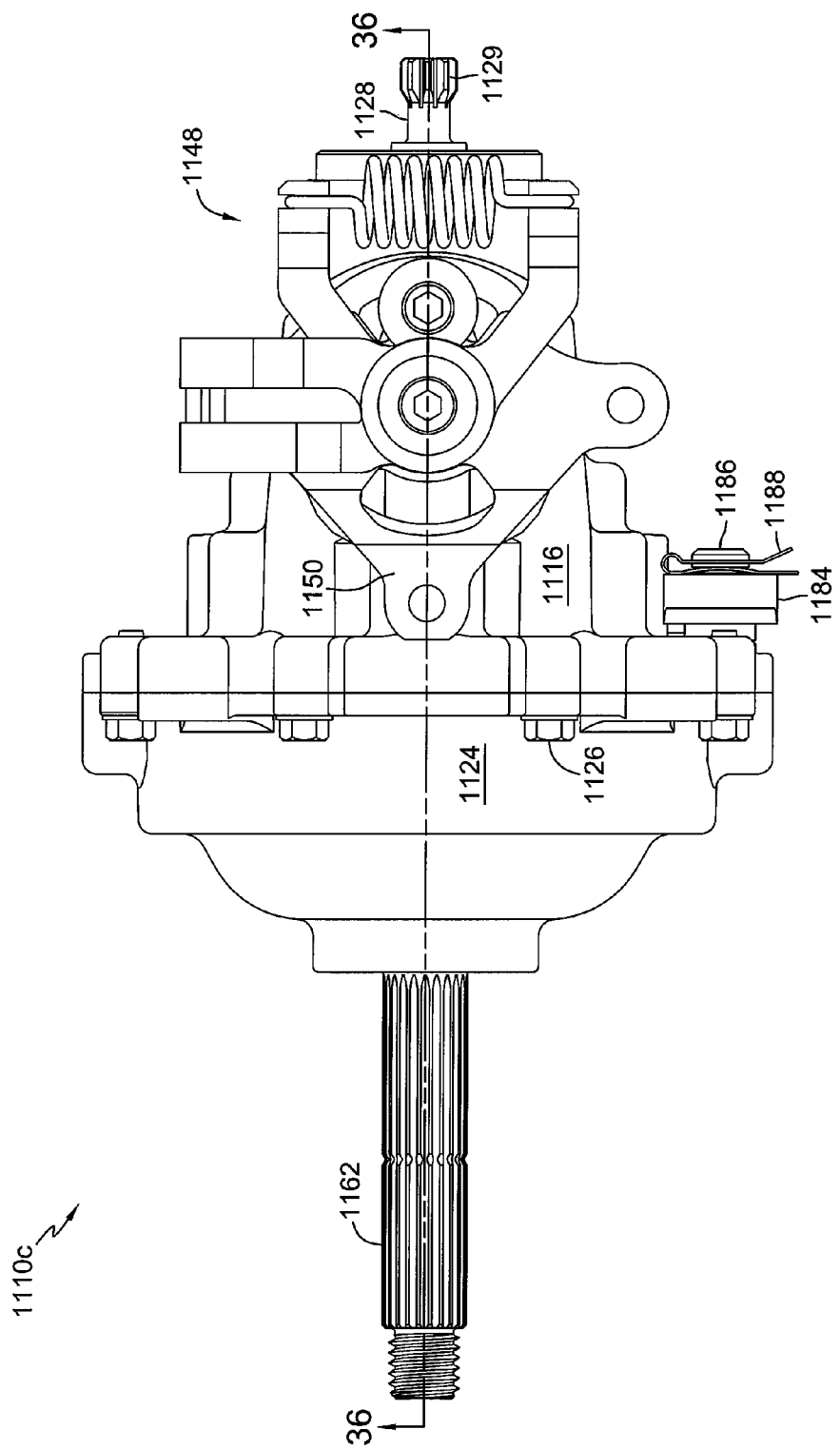
FIG. 35 is a top view of the hydrostatic transaxle of FIG. 34.
Figure 36:
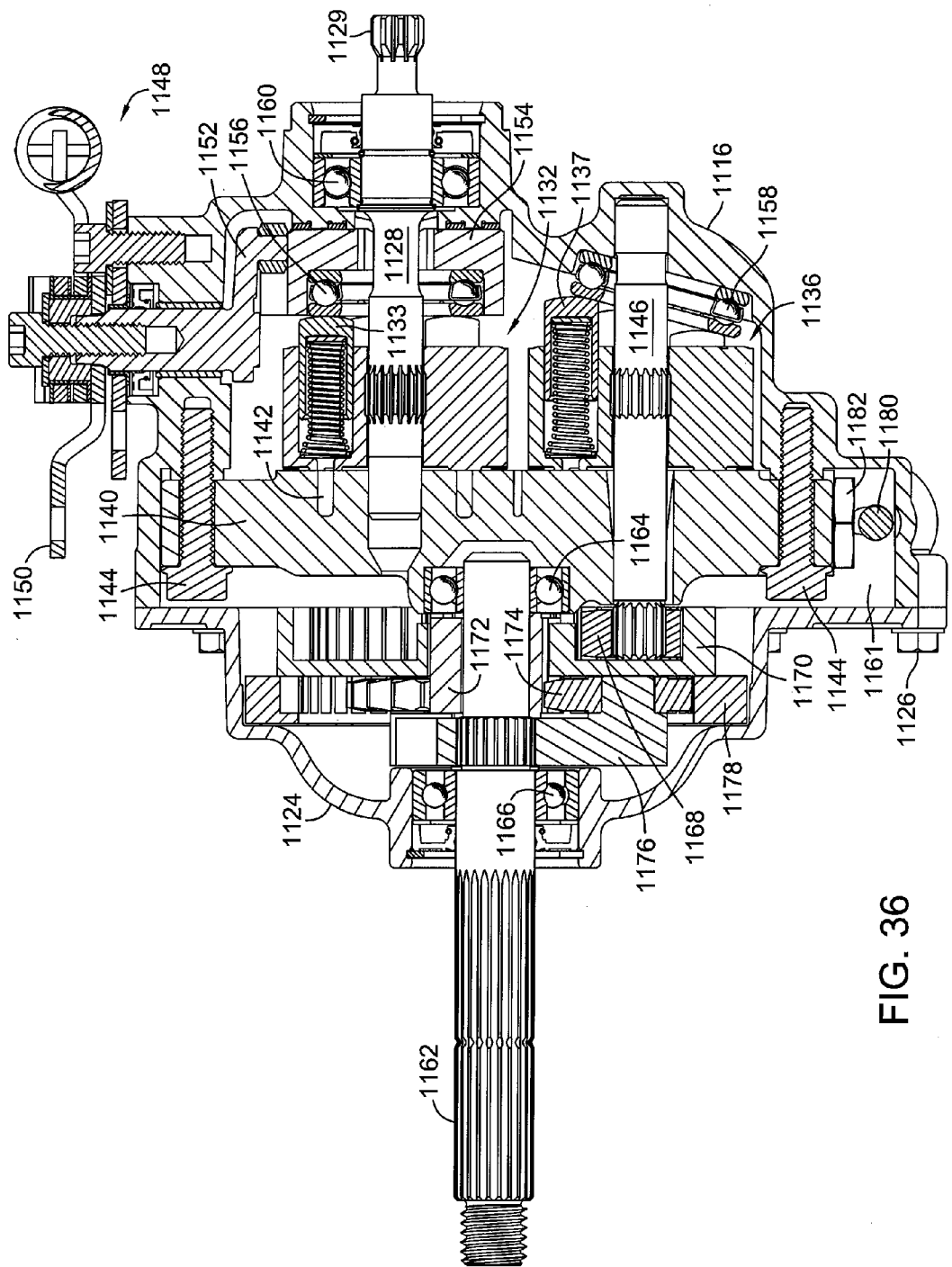
FIG. 36 is a partial section view of the transaxle of FIG. 35 along the lines 36-36 with some elements shown whole for clarity.

FIGS. 30 and 31 show a transaxle 1010c having a central housing 1020 with pump housing cover 1018 and gear housing cover 1024 fastened thereto by fasteners 1026. Transaxle 1010c varies from the previously depicted transaxles 1010a and 1010b, in that its return to neutral mechanism 1048 and control arm 1050 are rotated one hundred-eighty (180) degrees from those of transaxles 1010a and 1010b to accommodate a particular vehicle's control layout. It is understood that the length of input shaft 1028, depicted as shorter in transaxle 1010c, can vary to accommodate a host of vehicle frame widths. Central housing 1020 has a plurality of bosses 1021 by which transaxle 1010c may be fastened to vehicle frame 1002 or cross brace 1012. Brake arm 1084 is retained on brake/cam shaft 1086 by clip 1088. Rotation of brake arm 1084 rotates a brake/cam shaft 1086 to bring an internal, frictional element (not shown) into frictional engagement with a rotating ring gear 1070 (as shown in FIG. 32). Such a brake mechanism is suitable as a parking brake. Central housing 1020 also has an expansion tank port 1022 which allows connection to such an external expansion tank (not shown). Bypass rod with cam 1080 extends into central housing 1020 adjacent to pump housing cover 1018. Return to neutral assembly 1048, which acts on control arm 1050, and consequently trunnion arm 1052 (as best seen in FIG. 32), is mounted in part on trunnion arm 1052 and pump housing cover 1018. The workings of a scissor-arm return to neutral mechanism, as depicted herein, is illustrated in commonly-owned U.S. Pat. No. 6,487,857, incorporated by reference herein, and will not be discussed further. Pump input shaft 1028 has male splines 1029 with a rounded or tapered profile to provide a flexible joint that negates the effect of vehicle frame flexion.

FIG. 32 shows the internal components of transaxle 1010c comprising input shaft 1028, pump assembly 1032, center section 1040, motor assembly 1036, and motor output shaft 1046 arranged in-line. The rotation of input shaft 1028 is supported by bearing 1060. Center section 1040 is attached to central housing 1020 by fasteners 1044 and has fluid passages 1042 to allow circulation of hydraulic fluid in a closed loop from pump assembly 1032 to motor assembly 1036. A pair of check plugs 1082 and associated check balls (not shown) are disposed in fluid passages (not shown) in center section 1040 to permit fluid exchange between a sump 1061 and fluid passages 1042. The check plugs 1082 and bypass rod with cam 1080 act in concert to effect a bypass of the closed loop by opening the otherwise closed hydraulic circuit to a sump 1061. Rotation of bypass rod with cam 1080 brings the cam into displacing contact with the check balls to open the hydraulic circuit.

For adjusting the output of transaxle 1010c, there is swash plate 1054 in contact with pump thrust bearing 1056 against which pump pistons 1033 travel. The direction of rotation of pump assembly 1032 is fixed by the direction of rotation of input shaft 1028, to which pump assembly 1032 is non-rotatably joined. As will be understood by those of ordinary skill in the art, swash plate 1054 may be moved to a variety of positions to vary the displacement of pump pistons 1033, the corresponding rotational speed and direction of rotation of motor assembly 1036, and the corresponding output of motor shaft 1046. Motor pistons 1037 move against thrust bearing 1058 which is set at a fixed, non-neutral angle of displacement. Movement of the swash plate 1054 is accomplished by operator controlled movement of control arm 1050 via a control linkage (not shown) fastened to the control arm 1050. Rotation of control arm 1050 causes a corresponding rotation of trunnion arm 1052, fastened thereto, which is engaged to swash plate 1054. Thus, swash plate 1054 may be swung fore and aft through an arc to effect displacement of pump pistons 1033.

Generally, as the angle of swash plate 1054 is varied in one direction from the neutral position, the stroke of the pump pistons 1033 is varied, which then drives the motor assembly 1036 at a speed determined by the volume of the fluid displaced by the pump pistons 1033. As the angle of the swash plate 1054 is decreased to pass through the neutral position, the direction of rotation of motor assembly 1036 and its corresponding output motor shaft 1046 is reversed. The speed of the motor is again determined by the volume of fluid displaced by the pump pistons 1033.

Axle shaft 1062 is rotationally supported by inner axle bearings 1064 and outer axle bearings 1066. To drive axle shaft 1062, reduction gearing is provided to couple axle shaft 1062 to motor shaft 1046, imparting thereto an appropriate speed and torque. Thus, motor shaft 1046 is splined to pinion gear 1068 which drives ring gear 1070. Ring gear 1070 in turn drives sun gear 1072 which drives planet gears 1074. Because the planetary ring gear 1078 is held stationary, the planet gears 1074 drive planet gear carrier 1076 which is splined to axle shaft 1062. Other known reduction schemes may be employed to impart an appropriate speed and torque to axle shaft 1062.

FIGS. 33-36 depict another embodiment of a hydrostatic transaxle (shown as transaxles 1110a, 1110b and 1110c) suitable to integrate with central gear box 810 and form a modular drive system. The use of central gear box 810 is understood to be that of an exemplar central gear box in accordance with the principles of the invention. Transaxle 1110c is similar to the embodiment shown in FIGS. 28-32 in every major respect but two; first, in this embodiment the pump and motor assemblies (1132 and 1136 respectively) are arranged in a parallel configuration with the motor shaft 1146 offset from pump shaft 1128, and second, main housing 1116 replaces central housing 1020 and pump housing cover 1018. This transaxle embodiment also differs in five minor respects. First, center section 1140 is wider than center section 1040 to accommodate the adjacent running surfaces (not shown) for motor assembly 1135 from pump assembly 1132, which correspondingly creates fluid passages 1142 that are longer than fluid passages 1042. Second, fasteners 1144 are inverted as compared to fastener 1044. Third, pinion gear 1168 is located below sun gear 1172, whereas in the previous embodiment pinion gear 1068 was above sun gear 1072. Fourth, there is no expansion tank port in this embodiment, though one could be added. Fifth and finally, transaxle 1110c has a narrower and taller profile as compared to transaxle 1010c. Many of the elements in this embodiment are substantially identical to those previously described and will not be described herein.

Figure 37:
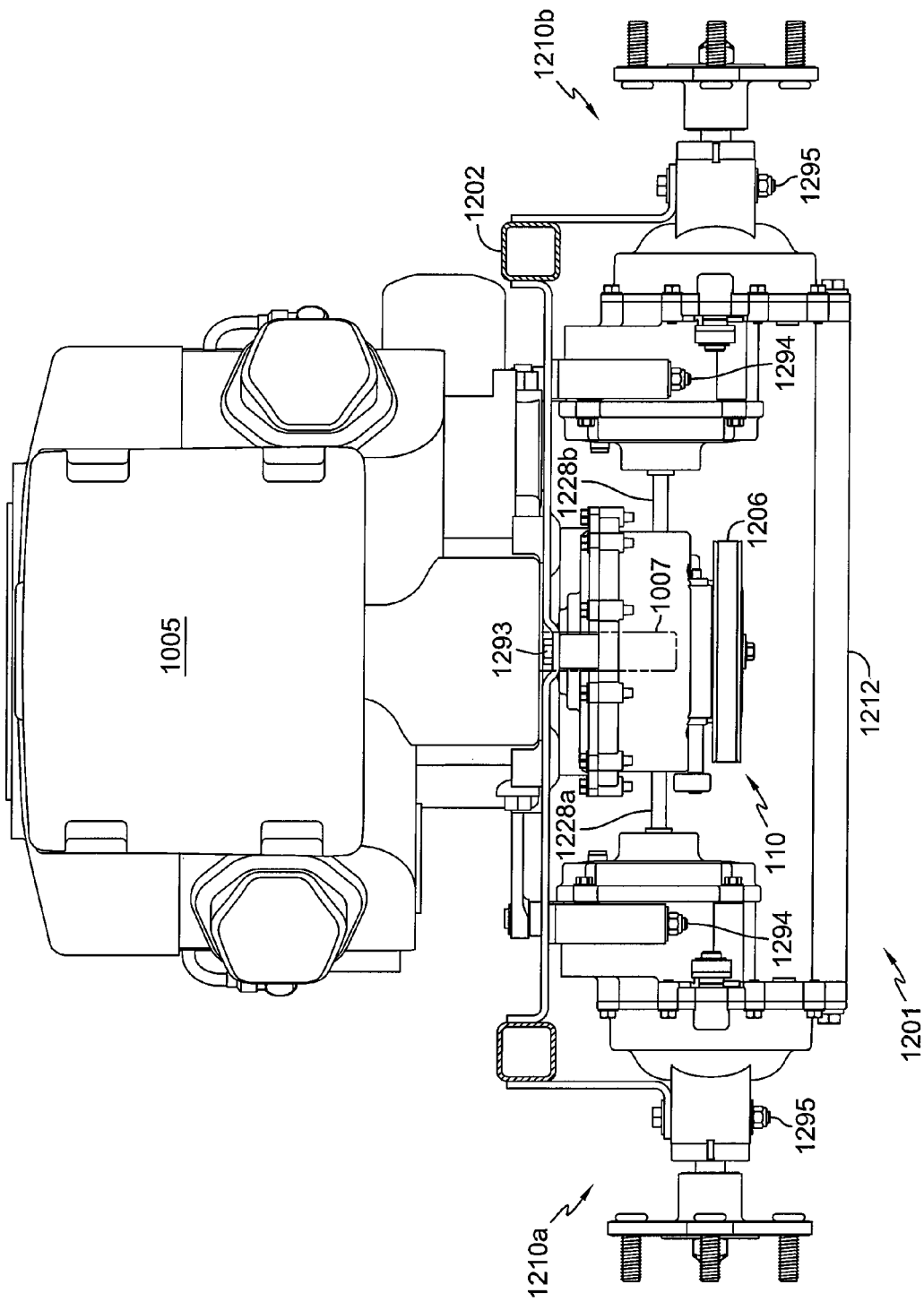
FIG. 37 is a rear elevation view of a vehicle (with its frame sectioned and elements removed for clarity) integrating a representative modular drive system, shown here with the central gear box of FIGS. 1A-1D and a pair of toroidal left and right side drive mechanisms.

FIG. 37 depicts modular drive system 1201 comprising central gear box 110 and left and right side drive mechanisms, transaxles 1210a and 1210b respectively, which in this instance are toroidal drives. The individual components of modular drive system 1201 are mounted to vehicle frame 1202 by a variety of fasteners 1293, 1294 and 1295. In addition, a cross brace 1212 is mounted between the housings of transaxles 1210a and 1210b to provide additional rigidity and limit driveline flexion. As previously mentioned, the nature of the joint between the central output shafts 133a and 133b of central gear box 110 and the input shafts 1228a and 1228b of transaxles 1210a and 1210b respectively, accommodates any remaining driveline flexion that is not arrested by the mounting method detailed above. The output shaft 1007 of the prime mover mounted to vehicle frame 1202, here internal combustion engine 1005, can be seen in its proper alignment within central gear box 110. By way of example, in a ZT mower application, v-belt 1206 may serve as the mowing deck drive belt.

Figure 38:
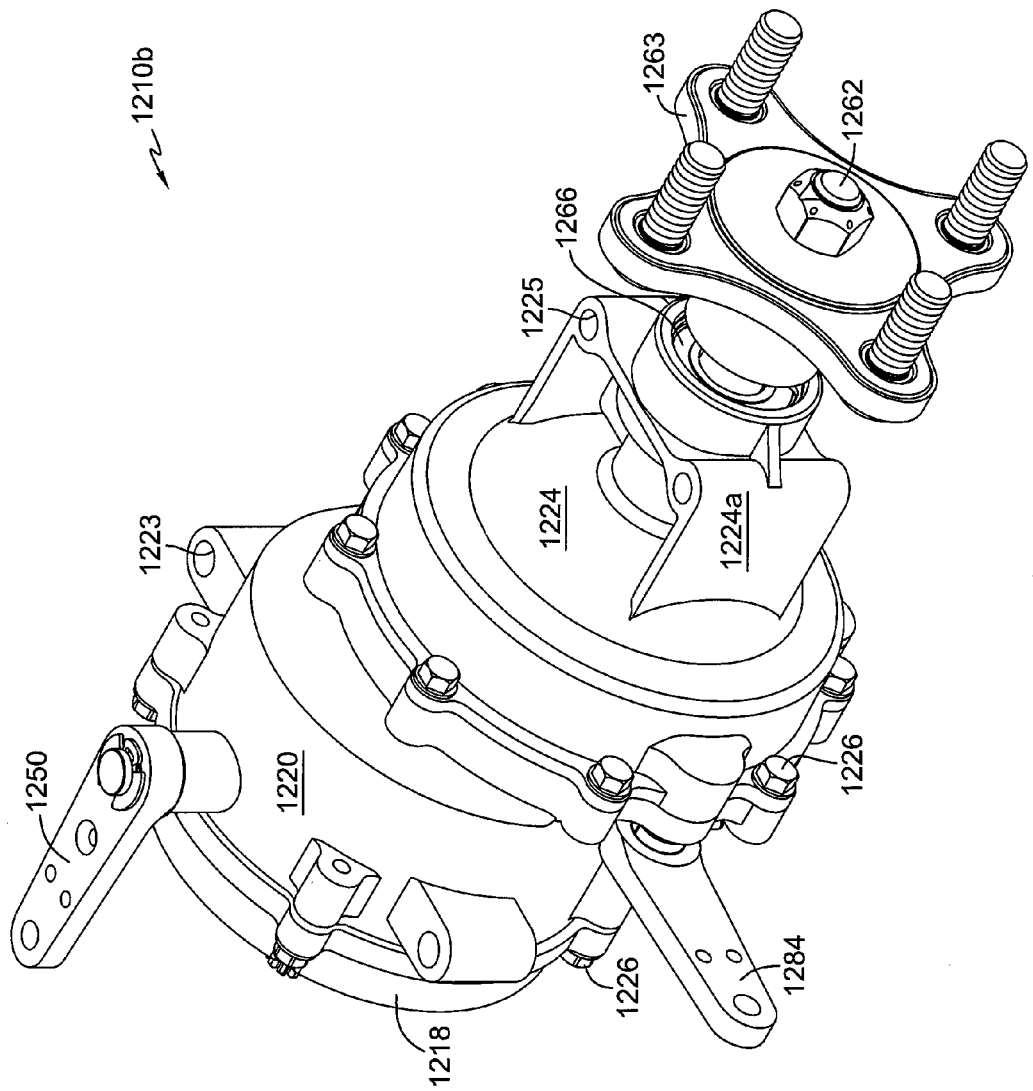
FIG. 38 is an isometric view of the right side drive mechanism of FIG. 37.
Figure 39:
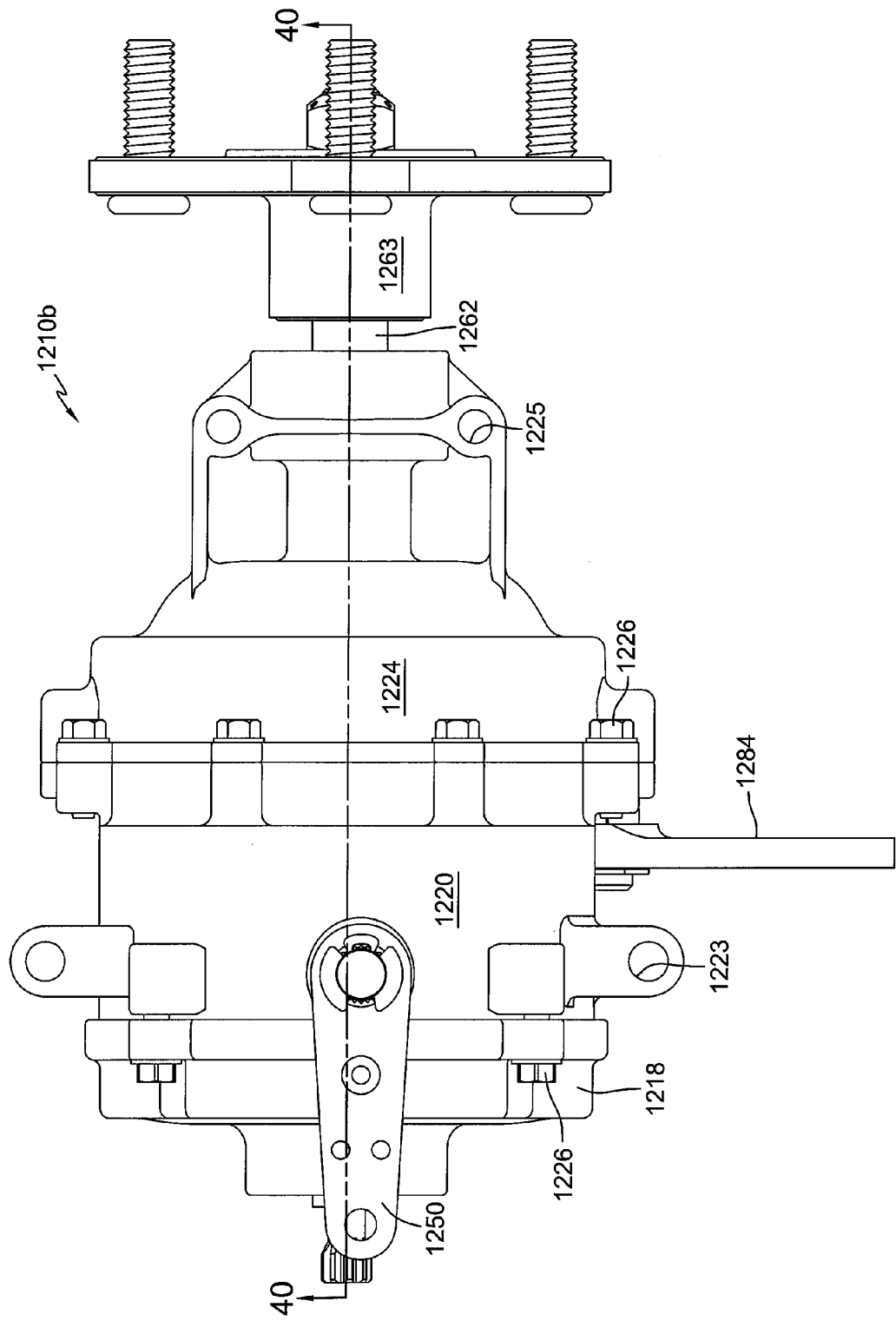
FIG. 39 is a top view of the right side drive mechanism of FIG. 38.

FIGS. 38-40 depict the right side transaxle 1210b in greater detail. It should be understood that the following discussion is equally applicable to the left side transaxle 1210a, which will not be discussed further herein. Transaxle 1210b is housed in a three-part, two-chamber housing comprising central housing 1220, central housing cover 1218 and gear housing cover 1224. The housing sections are sealingly joined by a plurality of fasteners 1226. Gear housing cover 1224 has an integral bearing support 1224a, which houses a bearing 1266 that provides rotational support for axle 1262 closer to its distal end, where wheel hub 1263 is mounted. (Axle 1262 is rotationally support at its proximal end by bearing 1264, as best seen in FIG. 40) Central housing 1220 and bearing support 1224a are both depicted with bosses having mounting holes 1223 and 1225, respectively. It should be understood that other suitable locations for such mounting points may be selected depending on the vehicle application and the expected loading.

External to central housing 1220 are control arm 1250, which regulates the output speed of the continuously variable toroidal drive mechanism 1230 located within central housing 1220, and brake arm 1284, which actuates a frictional brake mechanism that acts upon the planetary gear reduction mechanism 1267 located within gear housing cover 1224. As previously stated, right side transaxle 1210b has two chambers formed when the three housing elements are secured together. A first chamber 1298 formed between the central housing cover 1218 and the central housing 1220 accommodates the continuously variable toroidal drive mechanism 1230, and a second chamber 1299 formed between the central housing 1220 and the gear housing cover 1224 accommodates the planetary gear reduction mechanism 1267. These two chambers are sealed from one another to prevent commingling of the distinct oils used in each chamber. Shaft seal 1296 serves this purpose. Unlike the typical oils or hydraulic fluids used in planetary reduction mechanisms, a specialized traction oil is utilized in a continuously variable toroidal drive mechanism to provide the necessary frictional engagement between the internal rollers and disks that produce the drive mechanism's variable output. Fill plug 1219 permits access to first chamber 1298 for purposes of traction oil addition. Fill plug 1222 permits access to the second chamber 1299 for addition of oil or hydraulic fluid to the planetary reduction mechanism 1267.

While the mechanism 1230 depicted in FIG. 40 is depicted as a continuously variable toroidal drive mechanism it is to be understood that this is for exemplar purposes only. Any toroidal transmission mechanism capable of converting a drive input into continuously variable drive output is contemplated within the principles of the invention. Input shaft 1228b, which can be of variable length to accommodate a range of vehicle frame widths, receives its motive input from central output shaft 133b. Input shaft 1228b is rotationally supported on bearing 1260 and hollow shaft/pinion gear 1268 which runs on needle bearing 1261. Input shaft 1228b provides rotational input to drive disk 1234 of the continuously variable toroidal drive mechanism 1230. Drive disk 1234 provides rotational input to a plurality of traction rollers 1243, which run upon a slidable bearing 1255. Each traction roller 1243 rotates about an axial spindle 1245 that is supported by a roller arm 1247 at each end of the spindle 1245. The roller arms 1247 track along curved surfaces within a retaining cage 1231 and along the sides of slidable bearing 1255, permitting the traction roller 1243 to tilt on its spindle 1245. Slidable bearing 1255 is supported on and rotates about a pair of bearing supports 1257 and 1259 which travel axially along input shaft 1228b. A slider block 1253 straddles slidable bearing 1255 to act on bearing supports 1257 and 1259 under the influence of a rotatable cam shaft 1251 that engages a slot on the slider block 1253. Control arm 1250 is affixed to the external end of cam shaft 1251 to provide rotational control inputs. Rotation of control arm 1250 and cam shaft 1251 produces an axial movement of slider block 1253, bearing supports 1257 and 1259, and slidable bearing 1255. The axial movement of slidable bearing 1255 within retaining cage 1231 causes traction rollers 1243 to tilt upon their spindles 1245, changing the contact point between the traction rollers 1243, drive disk 1234, and an output disk 1238 affixed to hollow shaft/pinion gear 1268. The change in contact point effectively changes the circumference of the traction roller 1243 experienced by drive disk 1234 and output disk 1238, and thus changes the relative speeds experienced by drive disk 1234 and output disk 1238 to enable speed control. Drive disk 1234 and output disk 1238 turn at equivalent rates when traction rollers 1243 are not tilted on their spindles 1245 and track along the center of slidable bearing 1255.

To maintain manageable control or axial forces at the traction interface between drive disk 1234, traction rollers 1243, and output disk 1238 under various loads, a spring washer 1235 is inserted to act upon drive disk 1234. Correspondingly, to balance this axial loading, a thrust bearing 1239 and thrust washer 1241 are inserted between output disk 1238 and the wall of central housing 1220. It should also be noted that retaining cage 1231, which rests upon both drive disk 1234 and output disk 1238, is prevented from rotating therewith by an anti-rotation bracket 1249.

To accommodate the offset of input shaft 1228b and axle 1262, and to provide a first stage of reduction, a rotatable ring gear 1270 is driven by hollow shaft/pinion gear 1268. The rotatable ring gear 1270 is engaged to sun gear 1272 which rotates about axle 1262. Sun gear 1272 drives a plurality of planet gears 1274 retained by a carrier 1276. The planet gears 1274 run within a fixed ring gear 1278 to thereby rotate carrier 1276 affixed to axle 1262 and achieve a second stage of speed reduction. Thus, the resultant rotational speed of axle 1262 and hub 1263 is the result of continuously variable speed control and a two stage reduction.

Rotation of brake arm 1284 acts to rotate a cam shaft (not shown) which forces a brake puck (not shown) into frictional engagement with the exterior surface of rotatable ring gear 1270. The brake as configured functions as a parking brake.

While specific embodiments have been described in detail, it will be appreciated by those skilled in the art that various modifications and alternatives to those presented herein could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A modular drive assembly for a zero turn radius vehicle having a prime mover with an output shaft, the modular drive assembly comprising:
   a central gear box having a housing;
   an input shaft having at least a first end external to the housing and adapted to engage the prime mover output shaft;
   a drive train within the housing and engaged to and driven by the input shaft;
   an output drive shaft perpendicular to the input shaft and driven by the drive train, the output drive shaft having a first end extending out a first side of the housing and a second end extending out a second side of the housing opposite the first side; and
   a power take off mechanism having an auxiliary output shaft that is collinear with the input shaft and a power take off clutch to selectively couple the auxiliary output shaft to the input shaft;
   a first variable speed drive having a first drive input shaft flexibly connected to a first end of the output drive shaft; and
   a second variable speed drive having a second drive input shaft flexibly connected to a second end of the output drive shaft.

2. The modular drive assembly of claim 1, wherein the power take off mechanism further comprises a brake to arrest the rotation of the auxiliary output shaft.

3. The modular drive assembly of claim 1, wherein the output drive shaft comprises a pair of separate, coaxial shafts, and the first coaxial shaft extends out the first side of the housing, and the second coaxial shaft extends out the second side of the housing.

4. The modular drive assembly of claim 3, wherein the first and second variable speed drives are each connected to one of the coaxial shafts by an intermediate shaft.

5. The modular drive assembly of claim 1, wherein the first and second variable speed drives are selected from the group consisting of hydraulic, toroidal, friction and mechanical drives, and the first and second variable speed drives are of the same type.

6. The modular drive assembly of claim 1, wherein the drive train is selectably driven by the input shaft.

7. The modular drive assembly of claim 1, wherein the power take off clutch is an electric clutch.

8. The modular drive assembly of claim 6, wherein the drive train is selectably driven by a drive train clutch that is hydraulic in design.

9. The modular drive assembly of claim 8, wherein the drive train further comprises a gear pump to provide pressurized hydraulic fluid to actuate the drive train clutch.

10. The modular drive assembly of claim 9, wherein a filter may be utilized in conjunction with the gear pump to remove debris from the hydraulic fluid.

11. The modular drive assembly of claim 10, wherein the filter is screwed on to the housing.

12. The modular drive assembly of claim 1, wherein the power take off clutch is a hydraulic clutch, and the drive train further comprises a gear pump to provide pressurized hydraulic fluid to actuate the hydraulic power take off clutch.

13. The modular drive assembly of claim 1, wherein the power take off clutch is a hydraulic clutch, and the drive train further comprises a charge pump to provide pressurized hydraulic fluid to actuate the hydraulic power take off clutch.

14. The modular drive assembly of claim 1, wherein the input shaft is a through-shaft having a second end external to the housing opposite the first end and adapted to receive the output shaft of the prime mover.

15. The modular drive assembly of claim 1, wherein the drive train further comprises a charge pump to provide pressurized hydraulic fluid to actuate a gear train clutch.

* * * * *